US012045084B2

(12) United States Patent
Kwon et al.

(10) Patent No.: US 12,045,084 B2
(45) Date of Patent: Jul. 23, 2024

(54) DISPLAY SUPPORT APPARATUS

(71) Applicant: LG ELECTRONICS INC., Seoul (KR)

(72) Inventors: Ohkwan Kwon, Seoul (KR); Gyoungbok Kim, Seoul (KR); Eunbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 18/002,603

(22) PCT Filed: Feb. 9, 2021

(86) PCT No.: PCT/KR2021/001675
§ 371 (c)(1),
(2) Date: Dec. 20, 2022

(87) PCT Pub. No.: WO2022/010061
PCT Pub. Date: Jan. 13, 2022

(65) Prior Publication Data
US 2024/0028069 A1 Jan. 25, 2024

(30) Foreign Application Priority Data

Jul. 8, 2020 (KR) .......... 10-2020-0084011

(51) Int. Cl.
*G06F 1/16* (2006.01)
(52) U.S. Cl.
CPC .......... *G06F 1/1601* (2013.01); *G06F 1/166* (2013.01); *G06F 2200/1638* (2013.01)

(58) Field of Classification Search
CPC .. F16M 11/121; F16M 11/123; F16M 11/125; F16M 11/105; F16M 11/06;
(Continued)

(56) References Cited

U.S. PATENT DOCUMENTS 8,469,323 B1 * 6/2013 Deros ................. F16M 11/105
248/124.2
10,480,709 B1 * 11/2019 Chumakov ............ F16M 11/10
(Continued)

FOREIGN PATENT DOCUMENTS

KR 1020080076143 8/2008
KR 1020160121052 * 10/2016
(Continued)

OTHER PUBLICATIONS

PCT International Application No. PCT/KR2021/001675, International Search Report dated May 18, 2021, 2 pages.

*Primary Examiner* — Nidhi Thaker
(74) *Attorney, Agent, or Firm* — LEE, HONG, DEGERMAN, KANG & WAIMEY

(57) ABSTRACT

A display supporting apparatus according to an embodiment of the present disclosure may include a clamp unit fixed to an installation surface; a pillar unit connected to the clamp unit to rotate about a vertical axis; a neck unit connected to an end portion of the pillar unit to rotate about a vertical axis; an arm unit connected to an end portion of the neck unit to rotate about a first horizontal axis; a connection unit connected to an end portion of the arm unit to rotate about the first horizontal axis; and a display supporting unit connected to the connection unit, having a display unit mounted on a front surface thereof, and rotatable about the first horizontal axis, a second horizontal axis, and the vertical axis.

23 Claims, 52 Drawing Sheets

(58) Field of Classification Search
CPC ........ F16M 11/08; F16M 11/10; F16M 11/12; G06F 1/1601; G06F 1/166
See application file for complete search history.

(56) References Cited

U.S. PATENT DOCUMENTS

| | | | |
|---|---|---|---|
| 10,851,938 B2* | 12/2020 | Glickstein | F16M 11/26 |
| 11,287,083 B2* | 3/2022 | Lim | F16M 11/08 |
| 11,725,772 B1* | 8/2023 | Chumakov | F16M 11/2092 248/284.1 |
| 2004/0031894 A1* | 2/2004 | Smed | F16M 11/2014 248/278.1 |
| 2008/0029670 A1* | 2/2008 | Hung | F16M 11/10 248/278.1 |
| 2011/0147546 A1* | 6/2011 | Monsalve | F16M 11/2014 248/122.1 |
| 2012/0006767 A1* | 1/2012 | Bennett | F16M 11/02 211/26 |
| 2015/0053829 A1* | 2/2015 | Lu | F16M 11/12 248/123.11 |
| 2016/0305600 A1* | 10/2016 | Bowman | F16M 11/041 |
| 2017/0150817 A1 | 6/2017 | Hung | |
| 2021/0239262 A1* | 8/2021 | Lim | F16M 11/2092 |
| 2021/0388943 A1* | 12/2021 | Miura | F16M 11/24 |
| 2022/0364676 A1* | 11/2022 | Lau | F16M 11/08 |

FOREIGN PATENT DOCUMENTS

| | | |
|---|---|---|
| KR | 101717348 | 3/2017 |
| KR | 1020180121979 | 11/2018 |
| KR | 1020190084548 | 7/2019 |

\* cited by examiner

DISPLAY SUPPORT APPARATUS

CROSS-REFERENCE TO RELATED APPLICATION(S)

This application is the National Stage filing under 35 U.S.C. 371 of International Application No. PCT/KR2021/001675, filed on Feb. 9, 2021, which claims the benefit of earlier filing date and right of priority to Korean Application No. 10-2020-0084011, filed on Jul. 8, 2020, the contents of which are all incorporated by reference herein in their entirety.

TECHNICAL FIELD

The present disclosure relates to a display supporting apparatus.

BACKGROUND ART

The display supporting apparatus may be provided to install the display device on a flat installation surface such as a desk or a vertical surface such as a wall surface or may be provided in a form detachably fixed to an edge of a desk.

In the case of the display supporting apparatus disclosed in Korean Patent Publication No. 2004-0028113 (Apr. 3, 2004) (hereinafter referred to as Prior Art 1), the display device has features capable of tilting, rotating, and adjusting the height.

However, since this type of display supporting apparatus can only adjust the height through rotation of the link, there is a limit to the height adjustment range of the display device.

In addition, despite the structure that prevents the display device from descending to the bottom due to the load by the elastic force of the spring provided inside the link, since the elastic force of the spring cannot be varied, there is a limit that can support only one type of display device. In other words, since it cannot stably support display devices of different sizes and loads, there is a problem of poor compatibility.

In addition, in the case of the display supporting apparatus disclosed in Korean Utility Model Publication No. 2014-0000629 (Jan. 29, 2014) (hereinafter referred to as Prior Art 2), not only the problem of Prior Art 1, but also the height adjustment method is very inconvenient.

In detail, according to the stand of Prior Art 2, in order to adjust the height of the supporting apparatus, it is necessary to loosen the fixing portion and then manually lift the arm portion. At this time, it is not easy for the user to lift the arm portion because of the rotational moment caused by the load of the display panel as well as the load of the display panel.

In addition, since the arm portion must be lifted in a state where the fixing portion is loosened, a phenomenon in which the display panel descends downward due to the load of the display panel and the arm may occur. To do this, in the process of loosening the fixing portion, one hand holds the display panel or another person has to help.

In addition, in order to fix the display supporting apparatus to the desk, the pressure plate is in close contact with the bottom surface of the desk in a state where the bracket is in close contact with the upper surface of the desk. At this time, since the area of the pressure plate is significantly smaller than the area of the bracket, there is a problem in that the supporting apparatus is not stably fixed to the desk. For example, a phenomenon in which the supporting apparatus is shaken may occur due to an external force applied to the display panel to tilt or rotate the display panel.

In addition, in the case of the supporting apparatus disclosed in Prior Art 2, the bracket must always be coupled to the desk in a form fitted to the edge of the desk. Therefore, in a state where the two edges of the adjacent desks are installed in close contact with the corner of the wall of the indoor space, there is a problem in that the installation environment is limited in that they can only be mounted on the opposite side that is not in close contact with the wall.

DISCLOSURE

Technical Problem

The present disclosure is proposed to improve the above problems.

Technical Solution

A display supporting apparatus according to an embodiment of the present disclosure for achieving the above object may include a clamp unit fixed to an installation surface; a pillar unit connected to the clamp unit to rotate about a vertical axis; a neck unit connected to an end portion of the pillar unit to rotate about a vertical axis; an arm unit connected to an end portion of the neck unit to rotate about a first horizontal axis; a connection unit connected to an end portion of the arm unit to rotate about the first horizontal axis; and a display supporting unit connected to the connection unit, having a display unit mounted on a front surface thereof, and rotatable about the first horizontal axis, a second horizontal axis, and the vertical axis.

Advantageous Effect

According to the display supporting apparatus according to the embodiment of the present disclosure having the above configuration, the following effects are obtained.

First, since the spring force of the coil spring constituting the elastic adjustment body can be freely adjusted, various types of display panels can be mounted without being affected by the size and load of the display panel.

Second, in a state where the display supporting apparatus is mounted on an installation surface such as a desk, there is an advantage in that the height of the display panel can be easily adjusted.

Third, since the display panel can rotate primarily about a vertical axis with respect to the connection unit, the neck unit can rotate secondarily about a vertical axis with respect to the pillar unit, and the pillar unit can rotate thirdly about a vertical axis with respect to the clamp unit, there is an advantage in that the rotation range of the display panel in the left and right direction is remarkably widened.

Fourth, since the pillar unit rotates to one side (for example, clockwise direction) about a vertical axis with respect to the clamp unit, the neck unit rotates to the other side (for example, counterclockwise direction) about the vertical axis with respect to the pillar unit, and the swivel module rotates to one side (for example, clockwise direction) about a vertical axis with respect to the connection unit, there is an advantage in that a range capable of adjusting the position of the display panel in a front and rear direction is remarkably increased.

Fifth, since the display panel can primarily rotate about a second horizontal axis (x-axis) by the swivel module, the connection unit can rotate secondarily about the second horizontal axis with respect to the arm unit, and the arm unit can rotate about the second horizontal axis with respect to the neck unit, there is an advantage in that the rotation range of the display panel in the up and down direction is remarkably widened.

Sixth, since, in a state where the clamp body constituting the clamp unit is placed on the upper surface of the installation surface, the pressure plate is in close contact with the lower surface of the installation surface, in addition to fixing the clamp unit, the upper surface of the clamp cover constituting the clamp unit is in close contact with the bottom surface of the installation surface to fix the clamp unit, the clamp unit can be stably fixed.

Seventh, by the elastic force of the pressure spring constituting the clamp unit, while the bottom portion of the clamp cover is tilted slightly lower than the horizontal state, the catching end of the clamp cover is firmly inserted into the catching groove formed at the extended end of the clamp body. As a result, in a state where the clamp unit is fixed to the installation surface, shaking caused by the load of the display supporting apparatus excluding the display panel and the clamp unit can be minimized.

Eighth, the clamp unit according to the embodiment of the present disclosure has the advantage of being fitted to the cable through-hole formed in the table and mounted in addition to the conventional coupling method in which the extended end of the clamp body is in close contact with the side surface of the table.

BEST MODE

Hereinafter, a display supporting apparatus according to an embodiment of the present disclosure will be described in detail with reference to the drawings.

Figure 1:
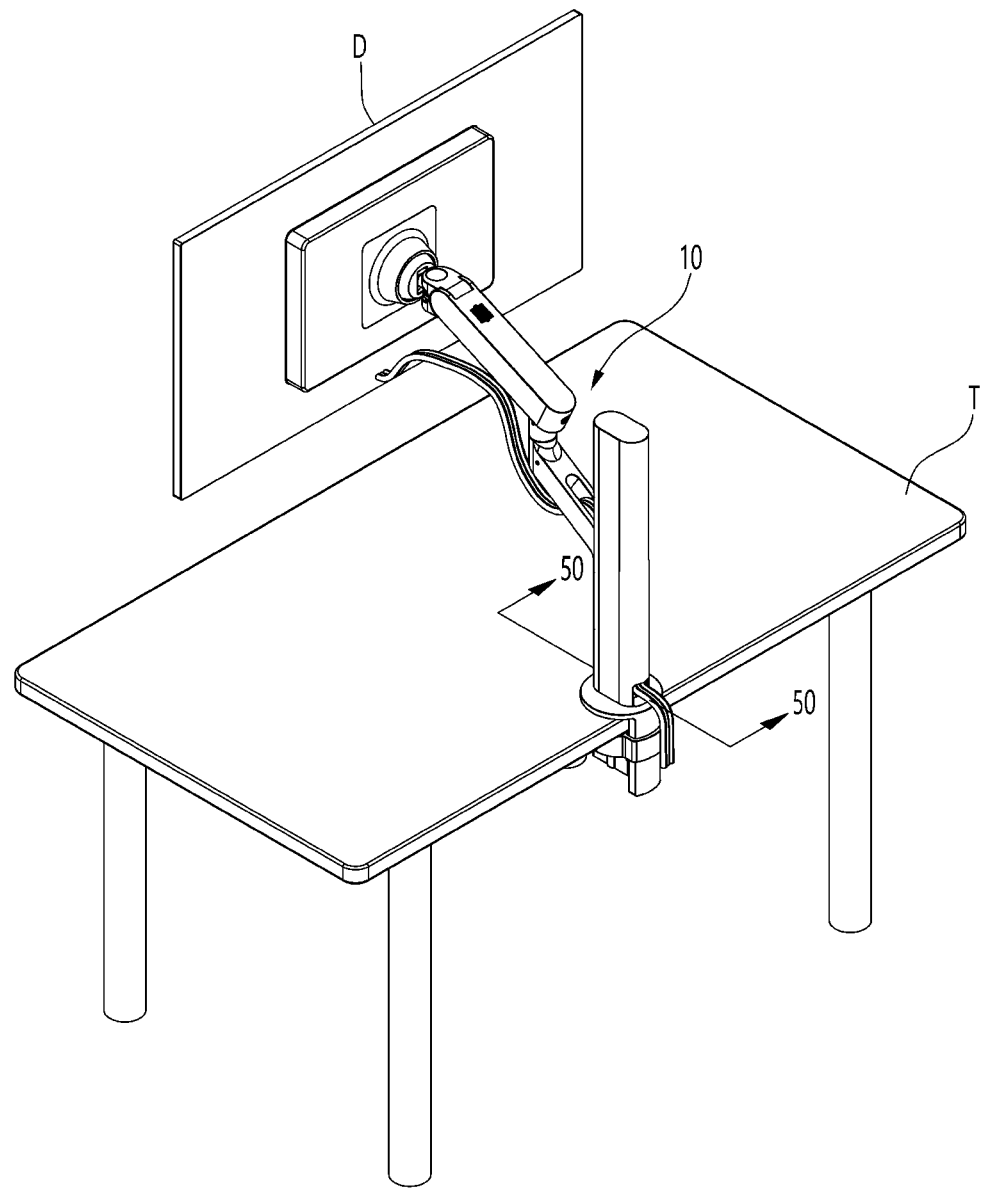
FIG. 1 is a perspective view illustrating an installation state of a display supporting apparatus according to an embodiment of the present disclosure.
Figure 2:
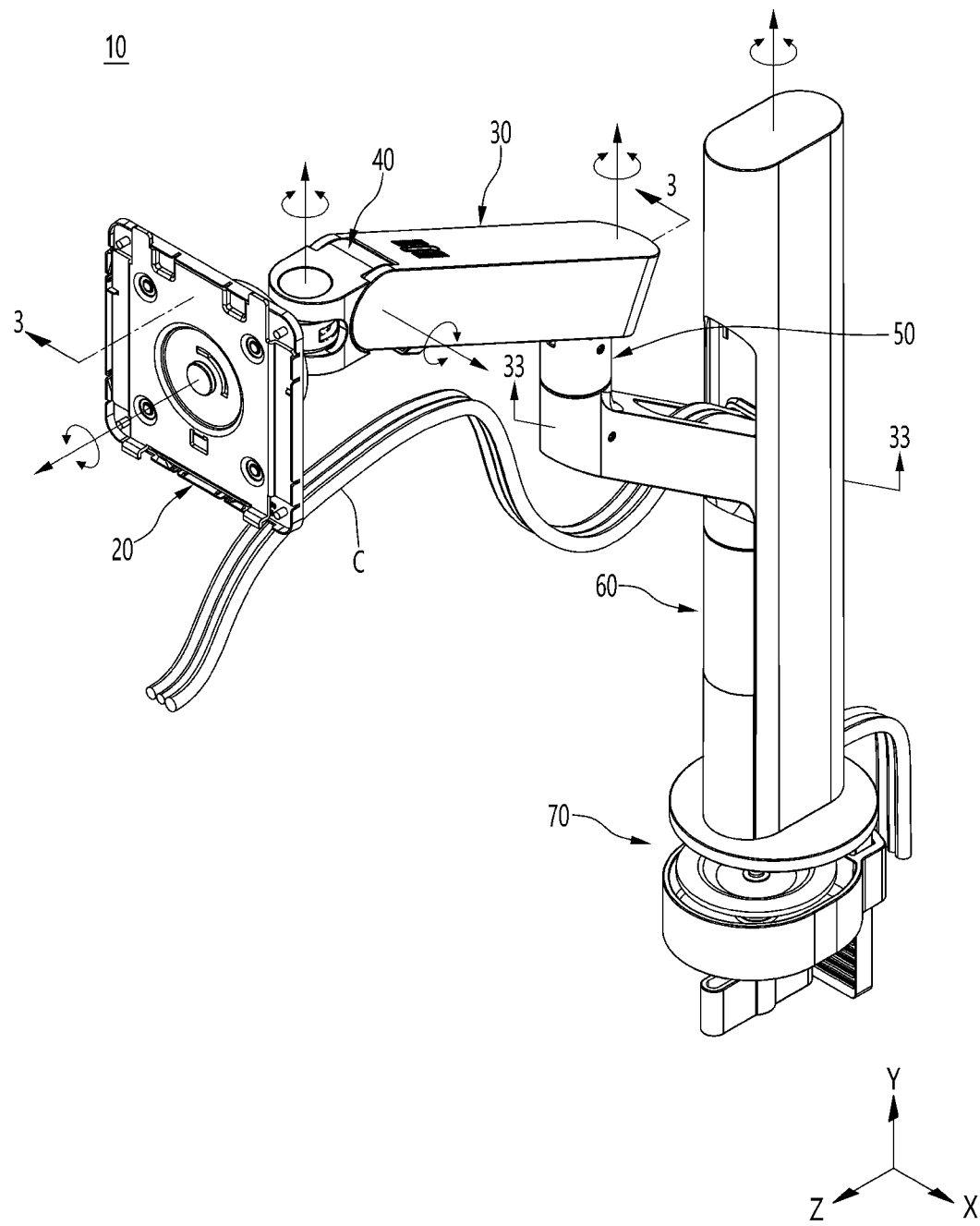
FIG. 2 is a perspective view illustrating a display supporting apparatus according to an embodiment of the present disclosure.

FIG. 1 is a perspective view illustrating an installation state of a display supporting apparatus according to an embodiment of the present disclosure, and FIG. 2 is a perspective view illustrating a display supporting apparatus according to an embodiment of the present disclosure.

Referring to FIGS. 1 and 2, a display supporting apparatus 10 according to an embodiment of the present disclosure has one end portion fixed to an edge of an installation surface including a desk and the other end portion coupled to a rear surface of a display panel D.

In detail, the display supporting apparatus 10 may include a display supporting unit 20 mounted on the rear surface of the display panel D. The display supporting unit 20 enables the display panel D to rotate about a first horizontal axis and tilt or pivot about a second horizontal axis.

In addition, the display supporting apparatus 10 may further include a connection unit 40 to which the display supporting unit 20 is rotatably connected to a front end.

In addition, the display supporting unit 20 is rotatable about a vertical axis while being connected to the connection unit 40.

Here, the first horizontal axis refers to a z-axis extending in a front and rear direction of the display panel D, and the second horizontal axis refers to an x-axis extending in a left and right direction of the display panel D, and the vertical axis refers to a y-axis extending in an up and down direction of the display panel D.

Also, the first horizontal axis may mean the x-axis, and the second horizontal axis may mean the z-axis.

In addition, the display supporting apparatus 10 may further include an arm unit 30 to which the connection unit 40 is rotatably connected about a second horizontal axis (x-axis) at a front end.

In addition, the display supporting apparatus 10 may further include a neck unit 50 connected to the rear side of the arm unit 30.

In detail, the arm unit 30 can be tilted about a second horizontal axis in the up and down direction while being connected to the neck unit 50, and singularly rotate with the neck unit 50 about a vertical axis in the left and right direction.

In addition, the display supporting apparatus 10 may further include a pillar unit 60 supporting the neck unit 50.

The pillar unit 60 enables height adjustment of the display panel D in the up and down direction, which will be described in detail with reference to the drawings below.

In addition, the display supporting apparatus 10 may further include a clamp unit 70 that supports the pillar unit 60 and is fixed to an installation surface.

The pillar unit 60 can rotate about a vertical axis in a state of being mounted on the clamp unit 70 in the left and right direction.

Reference numeral C, which is not explained, is a cable extending from the display panel and transmitting power and control signals.

Hereinafter, each of the units constituting the display supporting apparatus 10, that is, the display supporting unit 20 to the clamp unit 70, will be described in detail with reference to drawings.

Figure 3:
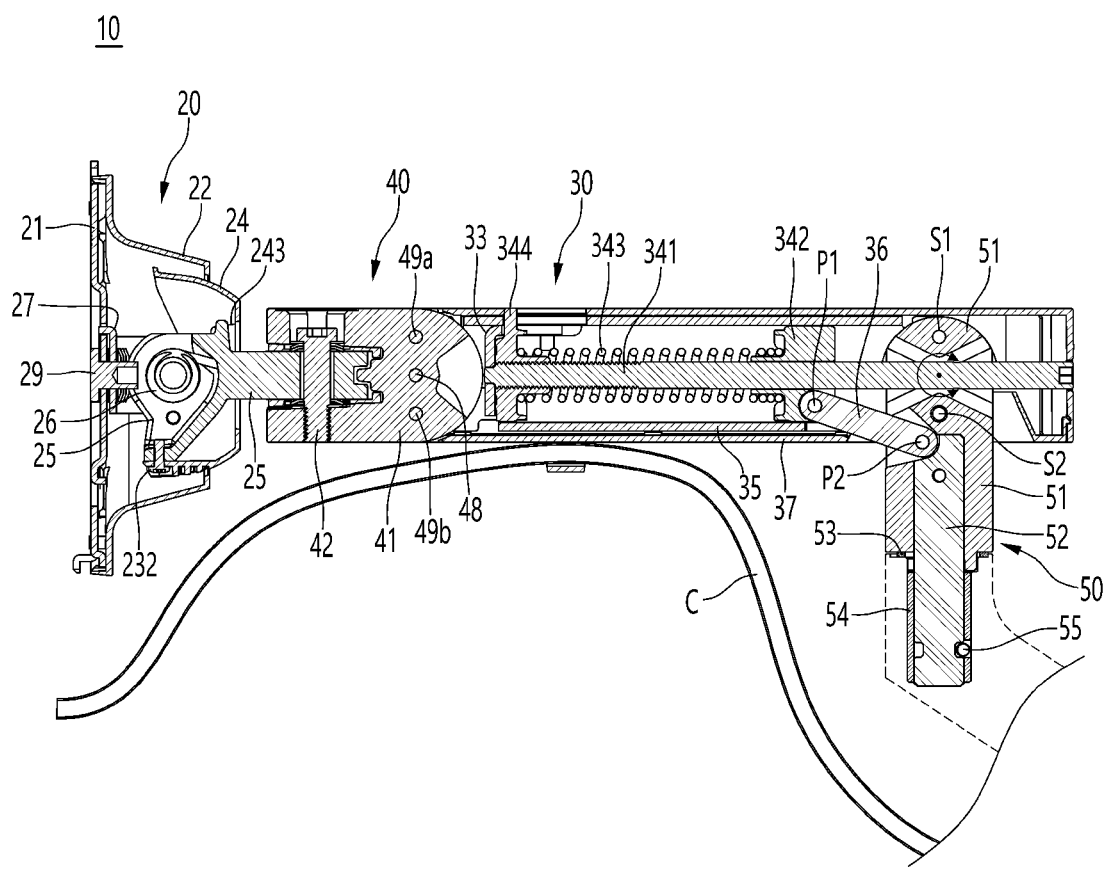
FIG. 3 is a side cross-sectional view illustrating the display supporting apparatus according to an embodiment of the present disclosure taken along line 3-3 of FIG. 2 illustrating a connection structure from the display supporting unit to the neck unit.
Figure 4:
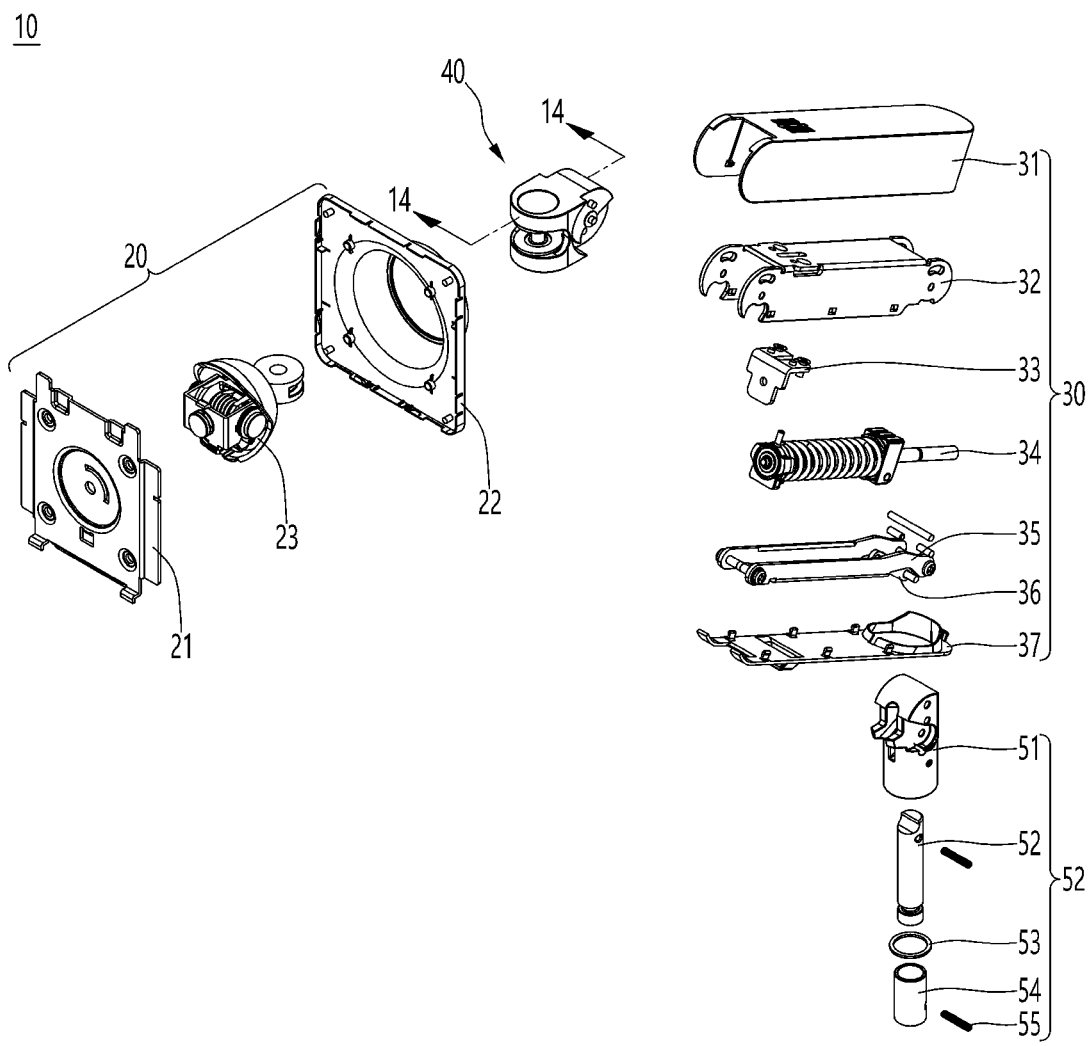
FIG. 4 is an exploded perspective view illustrating a display supporting apparatus according to an embodiment of the present disclosure illustrating a configuration from a display supporting unit to a neck unit.

FIG. 3 is a side cross-sectional view illustrating the display supporting apparatus according to an embodiment of the present disclosure taken along line 3-3 of FIG. 2 illustrating a connection structure from the display supporting unit to the neck unit, and FIG. 4 is an exploded perspective view illustrating a display supporting apparatus according to an embodiment of the present disclosure illustrating a configuration from a display supporting unit to a neck unit.

Referring to FIGS. 3 and 4, the display supporting unit 20 constituting the display supporting apparatus 10 according to the embodiment of the present disclosure may include a supporting plate 21 fixed to the rear surface of the display panel D; a swivel module 23 connected to the rear surface of the supporting plate 21; and a back cover 22 fixed to the rear surface of the supporting plate 21 and accommodating the swivel module 23 therein.

In detail, the arm unit 30 constituting the display supporting apparatus 10 may include a base cover 37 defining a bottom, an inner cover 32 coupled to an upper surface of the base cover 37, and an outer cover 31 surrounding the inner cover 32.

A coupling body of the base cover 37, the inner cover 32, and the outer cover 31 may be defined as a case.

In addition, the arm unit 30 may further include a main link 35 and an auxiliary link 36 mounted in an inner space defined by the inner cover 32 and the base cover 37. A coupling body of the main link 35 and the auxiliary link 36 may be defined as a link assembly.

In addition, the arm unit 30 may further include an elastic adjustment body 34 accommodated inside the inner cover 32 and a spring supporting bracket 33 connected to the front end of the elastic adjustment body 34. The spring supporting bracket 33 is fixed to the upper surface of the inner cover 32.

In addition, the arm unit 30 and the display supporting unit 20 may be connected by the connection unit 40 to be relatively rotatable.

Meanwhile, the neck unit 50 may include a link coupler 51 having a portion of upper side which is inserted into the arm unit 30.

In detail, the rear end of the elastic adjustment body 34 passes through the link coupler 51 and is rotatably connected to the link coupler 51.

The neck unit 50 may further include a swivel shaft 52 inserted into the link coupler 51 from the bottom surface of the link coupler 51, and a swivel bushing 54 into which about half of the lower side of the swivel shaft 52 is inserted.

In addition, the neck unit 50 may further include a swivel bushing pin 55 passing through the swivel bushing 54 and a bearing 53 coupled to a lower end of the link coupler 51.

Hereinafter, the connection structure and function of each component constituting the display supporting unit 20, connection unit 40, arm unit 30, and neck unit 50 will be described with reference to drawings.

Among the reference numerals illustrated in FIG. 3, there are unexplained numerals, but these unexplained numerals will be described in more detail in the description of individual components later.

[Display Supporting Unit]

Figure 5:
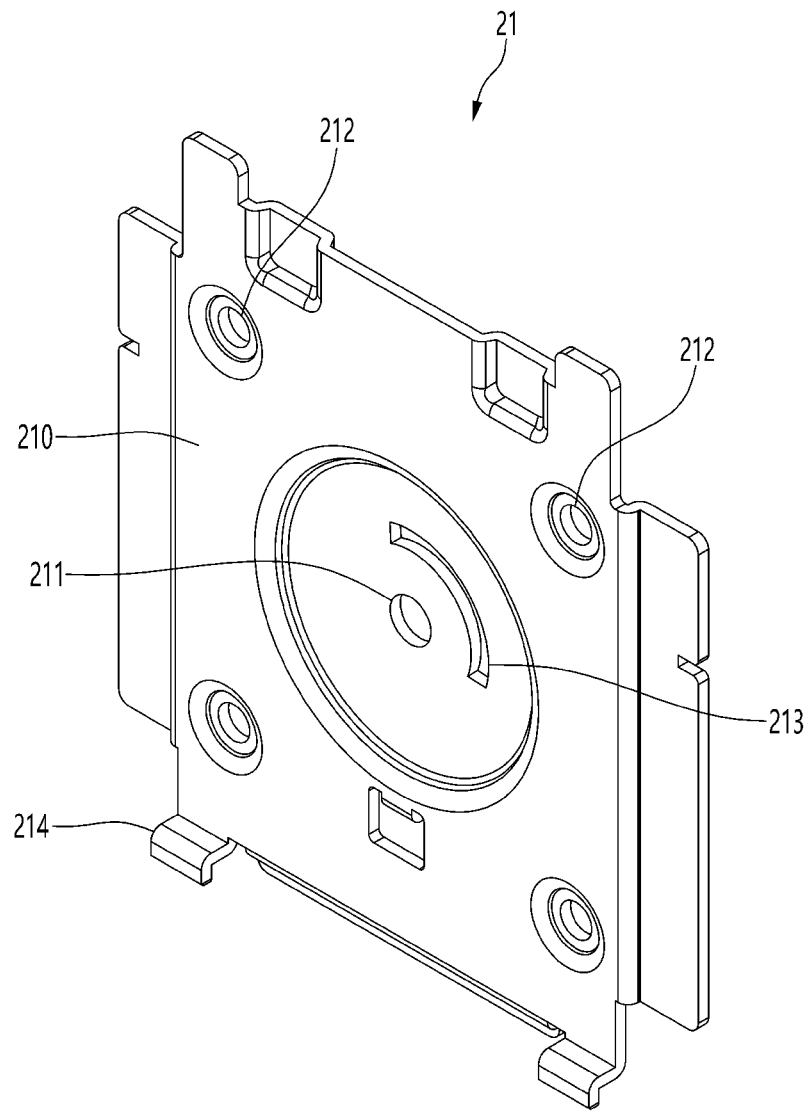
FIG. 5 is a front perspective view illustrating a supporting plate constituting a display supporting unit according to an embodiment of the present disclosure.
Figure 6:
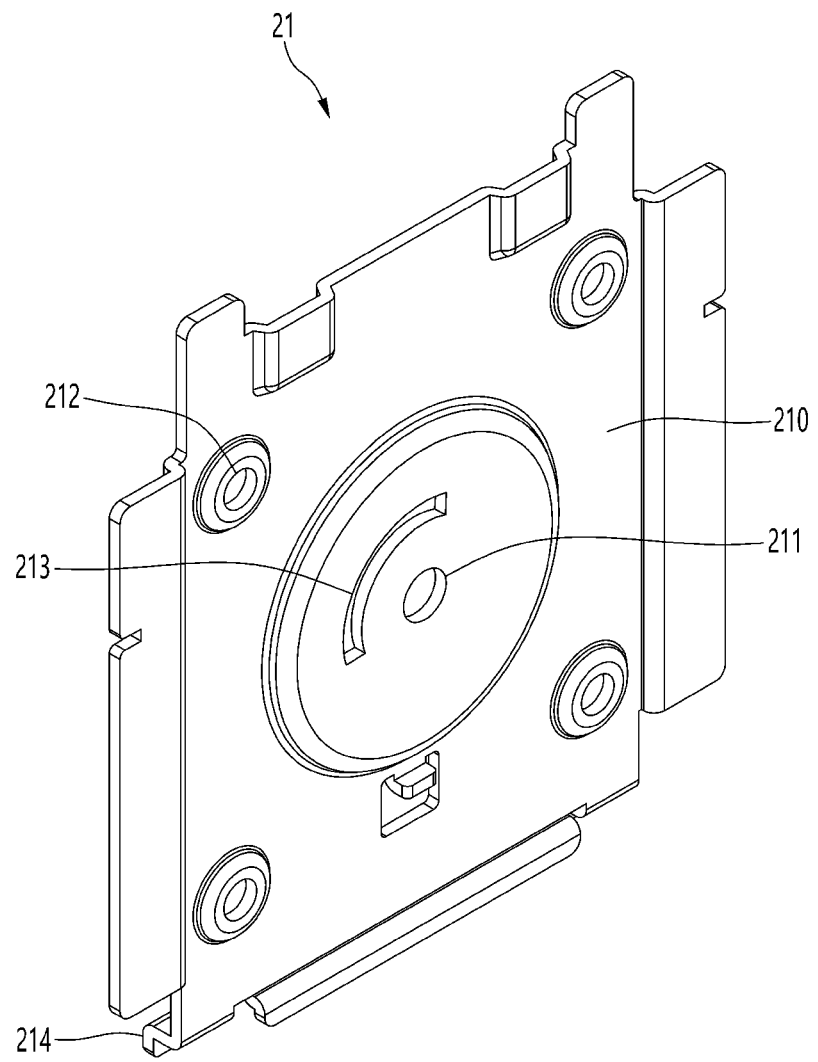
FIG. 6 is a rear perspective view illustrating the supporting plate.

FIG. 5 is a front perspective view illustrating a supporting plate constituting a display supporting unit according to an embodiment of the present disclosure, and FIG. 6 is a rear perspective view illustrating the supporting plate.

Referring to FIGS. 5 and 6, the supporting plate 21 according to the embodiment of the present disclosure may include a plate body 210.

The plate body 210 may have a rectangular shape, but is not necessarily limited thereto.

A panel supporting protrusion 214 for supporting the lower end of the display panel D may protrude forward from the lower end of the plate body 210.

A shaft hole 211 is formed at the center of the plate body 210, and a central shaft of the display panel D corresponding to a first horizontal axis (z-axis) is inserted into the shaft hole 211.

A limiting slit 213 in the form of an arc is formed at a point spaced apart from the shaft hole 211 by a predetermined distance. The length of the limiting slit 213 in the circumferential direction means the maximum amount of rotation of the display panel D.

Fastening holes 212 may be respectively formed at four corners of the plate body 210.

Figure 7:
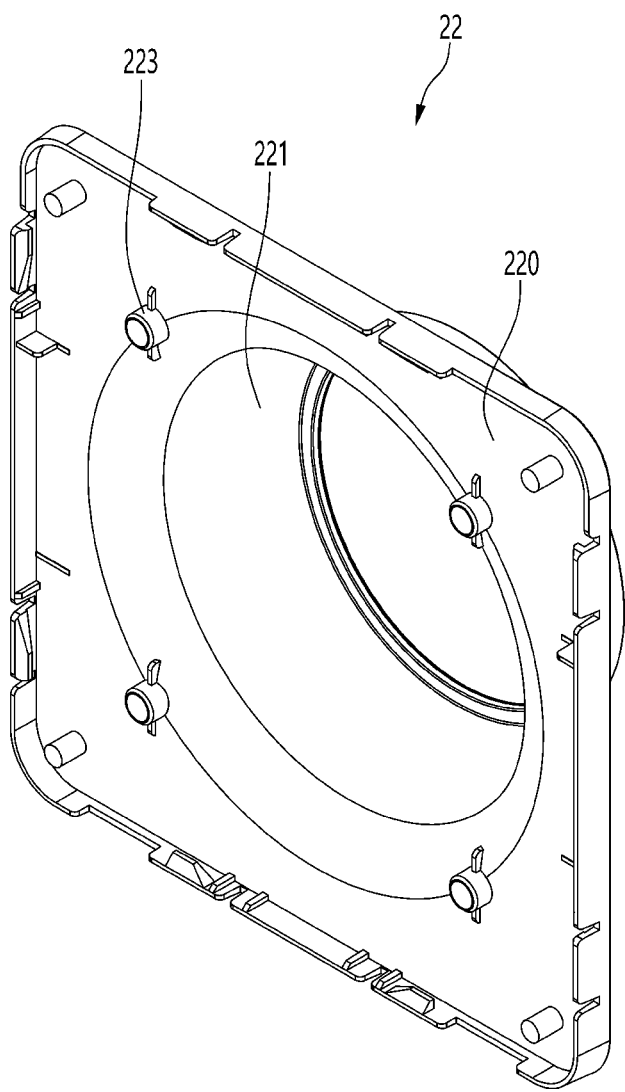
FIG. 7 is a front perspective view illustrating a back cover constituting a display supporting unit according to an embodiment of the present disclosure.
Figure 8:
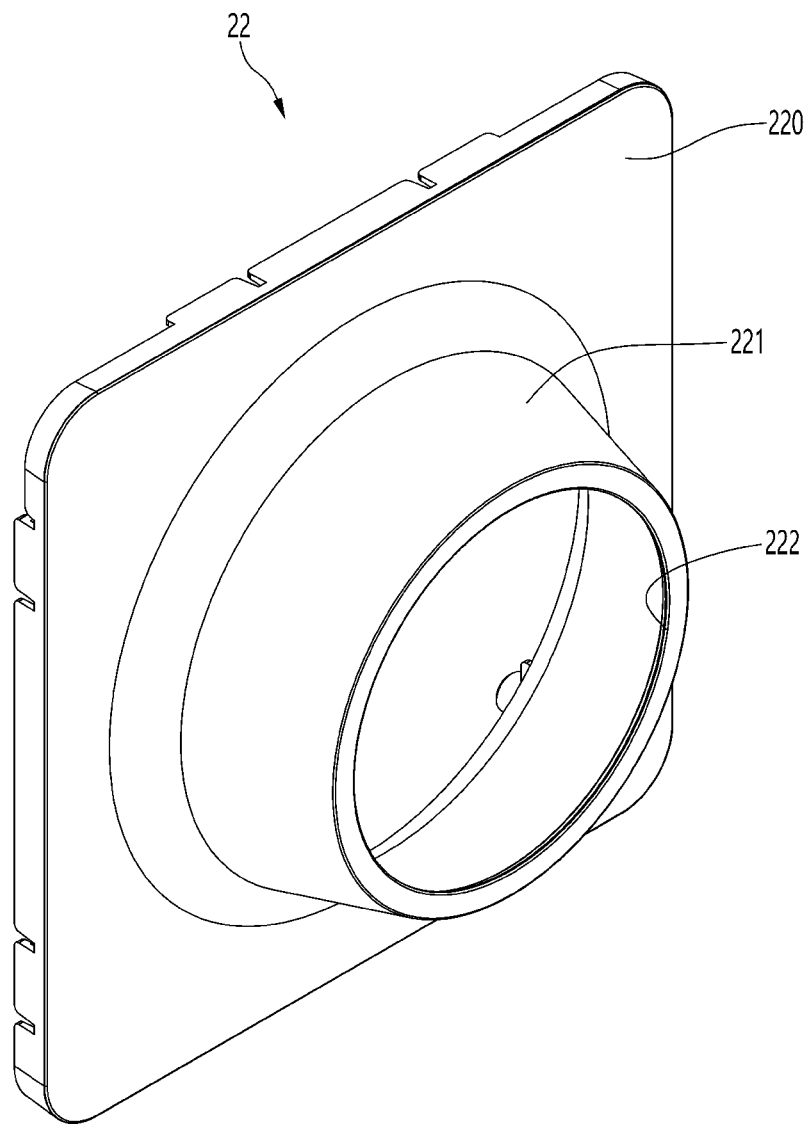
FIG. 8 is a rear perspective view illustrating the back cover.

FIG. 7 is a front perspective view illustrating a back cover constituting a display supporting unit according to an embodiment of the present disclosure, and FIG. 8 is a rear perspective view illustrating the back cover.

Referring to FIGS. 3, 7, and 8, the back cover 22 according to the embodiment of the present disclosure may include a cover body 220 and a swivel module accommodation portion 221 extending backward from the inside of the cover body 220.

In detail, the swivel module accommodation portion 221 may be formed in a cut cone shape with a diameter narrowing toward the rear, and a swivel module through-hole 222 is formed at the rear end of the swivel module accommodation portion 221.

The cover body 220 is coupled to the supporting plate 21 in a form in close contact with the rear surface of the supporting plate 21.

A plurality of fastening bosses 223 protrude from the front surface of the cover body 220, and the plurality of fastening bosses 223 are aligned with the plurality of fastening holes 212 formed in the supporting plate 21. In addition, a fastening member such as a screw may pass through the fastening hole 212 and be inserted into the fastening boss 223.

In addition, the swivel module 23 is accommodated in the swivel module accommodation portion 221, and as illustrated in FIG. 3, a portion of the swivel module 23 may protrude to the outside of the back cover 22 through the swivel module through-hole 222.

Figure 9:
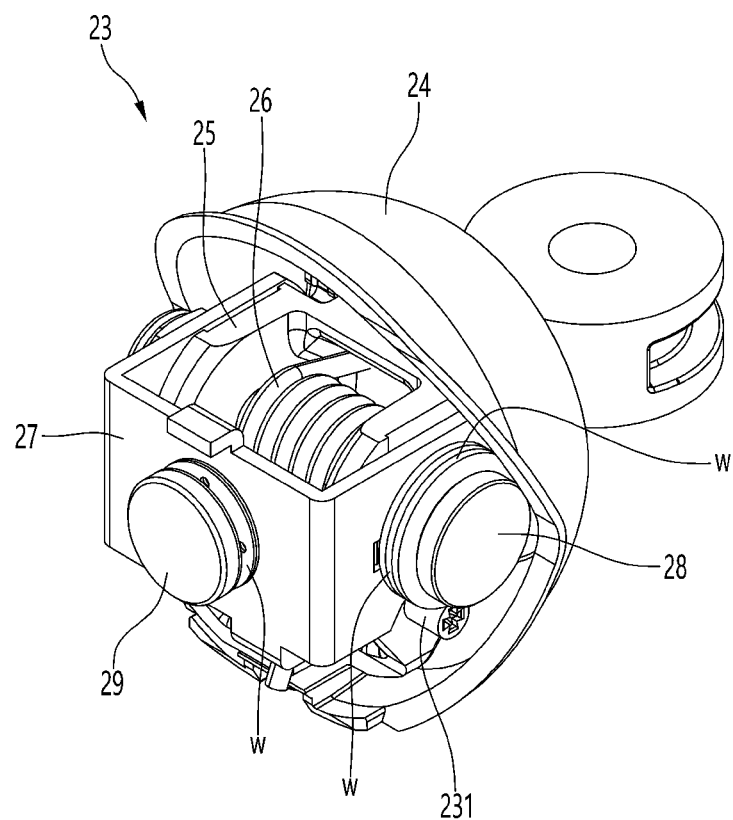
FIG. 9 is a front perspective view illustrating a swivel module constituting a display supporting unit according to an embodiment of the present disclosure.
Figure 10:
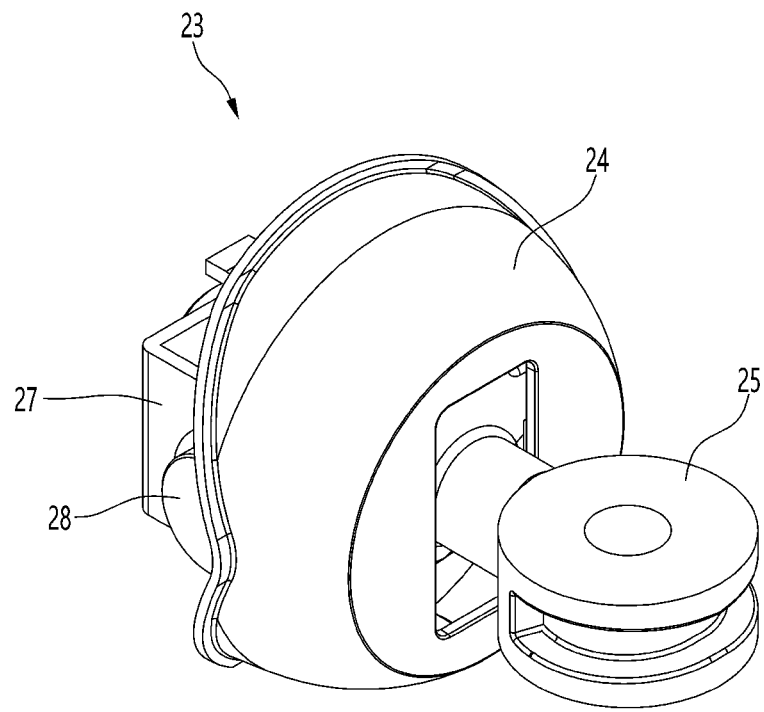
FIG. 10 is a rear perspective view illustrating the swivel module.
Figure 11:
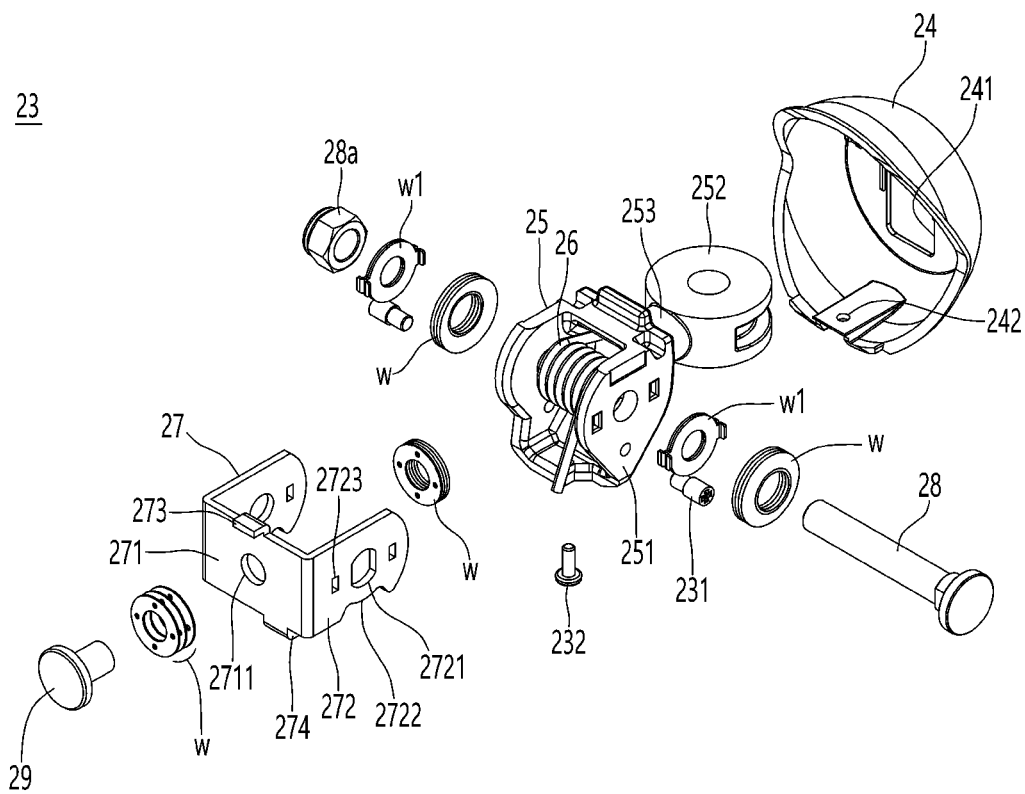
FIG. 11 is an exploded perspective view illustrating the swivel module.
Figure 12:
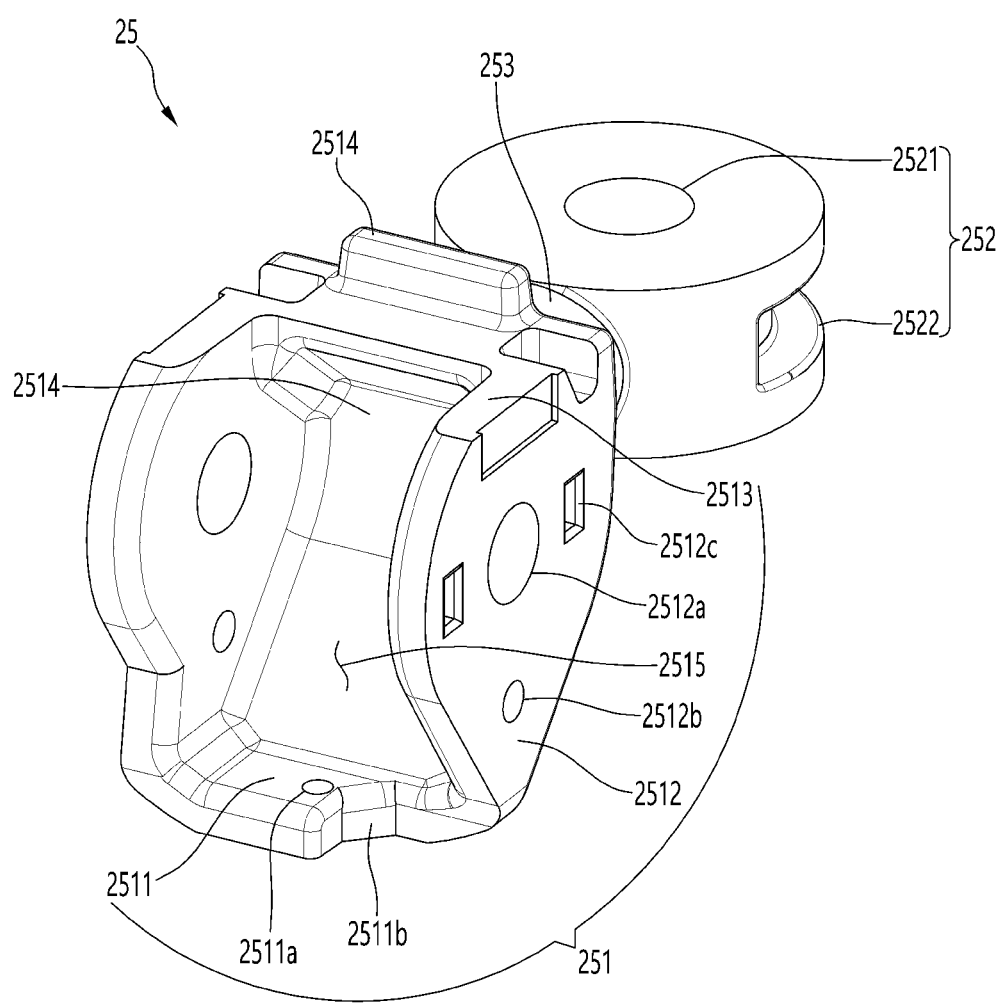
FIG. 12 is a perspective view illustrating a module body constituting a swivel module.

FIG. 9 is a front perspective view illustrating a swivel module constituting a display supporting unit according to an embodiment of the present disclosure, FIG. 10 is a rear perspective view illustrating the swivel module, FIG. 11 is an exploded perspective view illustrating the swivel module, and FIG. 12 is a perspective view illustrating a module body constituting a swivel module.

Referring to FIGS. 3 and 9 to 12, the swivel module 23 according to the embodiment of the present disclosure may include a pivot shaft 29, and a pivot bracket 27 to which the pivot shaft 29 is coupled to the front surface.

In detail, as illustrated in FIG. 3, the pivot shaft 29 passes through the shaft hole 211 of the supporting plate 21 and is inserted into the front surface of the pivot bracket 27.

The pivot bracket 27 includes a front portion 271 in close contact with the rear surface of the supporting plate 21 and side portions 272 bent backward at both side ends of the front portion 271.

A shaft hole 2711 is formed in the center of the front portion 271, the pivot shaft 29 is fitted to the shaft hole 2711, and one or a plurality of washers w may be fitted to the pivot shaft 29. Specifically, the one or a plurality of washers w may be fitted to the outer circumferential surface of the pivot shaft 29 protruding from the rear of the front portion 271.

Of course, a washer may be interposed between the front portion 271 and the rear surface of the supporting plate 21, or between the head portion of the pivot shaft 29 and the front surface of the supporting plate 21, or both.

A pivot limiter 273 protrudes forward from an upper end of the front portion 271 and is inserted into the limiting slit 213 of the supporting plate 21. When the display panel D rotates in the clockwise direction (or in the counterclockwise direction) about the first horizontal axis (z-axis), the pivot limiter 273 rotates in the counterclockwise direction (or in the clockwise direction) along the limiting slit 213 relative to each other.

A spring pressure protrusion 274 extends backward at the lower end of the front portion 271 and presses one end portion of the torsion spring 26 to be described later.

A shaft hole 2721 is formed in the side portion 272, and two washer fixing holes 2723 are formed at a point spaced apart from the edge of the shaft hole 2721. The two washer fixing holes 2723 are formed at points facing each other about the shaft hole 2721.

In addition, a tilt limiting groove 2722 is formed at the lower end of the side portion 272. The tilt limiting groove 2722 limits the rotation of the pivot bracket 27 in the up and down direction about the second horizontal axis (x-axis). A tilt limiter 232 to be described later is accommodated in the tilt limiting groove 2722 to limit the tilting range of the pivot bracket 27.

Meanwhile, the swivel module 23 may further include a module body 25, a torsion spring 26 placed in the left and right direction of the module body 25 inside the module body 25, a tilt shaft 28 passing through the side of the module body 25 and the torsion spring 26, a pivot bracket 27 coupled to both sides of the module body 25, and a module cover 24 accommodating a portion of the module body 25.

In addition, the module body 25 includes a swivel body 251, a swivel head 252, and a connecting rod 253 connecting the swivel body 251 and the swivel head 252.

In detail, the tilt shaft 28 passes through one side of the swivel body 251, is inserted into the torsion spring 26, and then passes through the other side of the swivel body 251. In addition, a nut 28a is fitted to an outer circumferential surface of the tilt shaft 28 protruding through the other side surface of the swivel body 251.

In addition, one or a plurality of washers w and a fixed washer w1 may be fitted to the outer circumferential surface of the tilt shaft 28 corresponding between one side of the swivel body 251 and the head of the tilt shaft 28 and between the nut 28a and the other side of the swivel body 251.

The washer w may be an elastic washer, and the fixed washer w1 is fixed to the side surface of the module body 25.

A tilt limiter 231 is fitted to both sides of the swivel body 251 corresponding to the lower side of the tilt shaft 28, and the head portion of the tilt limiter 231 is accommodated in the tilt limiting groove 2722 of the pivot bracket 27. Accordingly, when the pivot bracket 27 is tilted about the tilt shaft 28 in the up and down direction, the tilt limiter 231 relatively moves within the tilt limiting groove 2722.

One of the tilt limiter 273 and the tilt limiter 231 may be defined as a first tilt limiter, and the other may be defined as a second tilt limiter.

The module cover 24 may be formed in a round shape surrounding the swivel body 251, and a through-hole 241 is formed on the rear surface of the module cover 24. The swivel head 252 passes through the through-hole 241 and is connected to the connection unit 40.

A fastening hole 242 is formed at the bottom of the module cover 24, and a fastening screw 232 passes through the fastening hole 242 and is inserted into the bottom of the swivel body 251, so that the module body 25 and the module cover 24 move singularly.

Referring to FIG. 12, the swivel body 251 constituting the module body 25 may have a shape in which a portion of a front surface and an upper surface are opened.

The swivel body 251 includes a bottom portion 2511, a side portion 2512 extending upward from both side ends of the bottom portion 2511, a rear portion 2514 connecting a rear end of the bottom portion 2511 and a rear end of the side portion 2512, and an upper portion 2513 connecting the upper end of the side portion 2512 and the upper end of the rear portion 2514.

A spring accommodation portion 2515 is defined by the bottom portion 2511, the side portion 2512, the rear portion 2514, and the upper portion 2513, and the torsion spring 26 is accommodated in the spring accommodation portion 2515.

A spring catching groove 2511b is formed at one edge of the bottom portion 2511, and one end portion (lower end portion) of the torsion spring 26 is accommodated in the spring catching groove 2511b to be pressurized by the spring pressure protrusion 274. In addition, the other end portion (upper end portion) of the torsion spring is caught on the lower surface of the upper portion 2513.

In addition, when the pivot bracket 27 is mounted on the swivel body 251, the spring pressure protrusion 274 presses the lower end of the torsion spring 26. Then, the lower end of the torsion spring 26 does not deviate from the spring catching groove 2511b.

In addition, a fastening hole 2511a is formed in the bottom portion 2511. The fastening screw 232 illustrated in FIG. 11 passes through the fastening hole 242 formed at the bottom of the module cover 24 and then is inserted into the fastening hole 2511a, thereby connecting the module body 25 and the fastening screw 232 are integrally coupled to each other.

A tilting shaft hole 2512a through which the tilting shaft 28 passes is formed at approximately the center of the side portion 2512, and a washer fixing hole 2512c is formed on a position facing each other with respect to the tilting shaft hole 2512a. A fixing protrusion protruding from an edge of the fixing washer w1 is inserted into the washer fixing hole 2512c.

A fixing protrusion 2514 protrudes upward from the rear end of the upper portion 2513, and a support protrusion 243 (see a cross-sectional view of FIG. 3) supporting both side surfaces of the fixing protrusion 2514 on the rear surface of the module cover 24 protrudes forward, and thus it is possible to prevent the module body 251 from idling about the first horizontal axis (z-axis).

Meanwhile, the swivel head 252 may be formed in a cylindrical shape having a predetermined diameter and length, and a swivel shaft hole 2521 is formed in the center. The swivel shaft hole 2521 is defined as a vertical hole passing through the upper and lower surfaces of the swivel head 252.

A swivel limiting groove 2522 may be recessed to a predetermined depth on the rear surface of the swivel head 252. The swivel limiting groove 2522 may extend a predetermined length in a circumferential direction of the swivel head 252.

In addition, a swivel limiting protrusion 414 (see FIG. 13) to be described later is fitted to the swivel limiting groove 2522, so that the swivel head 252 rotates about a vertical axis by a set angle.

[Connection Unit]

Figure 13:
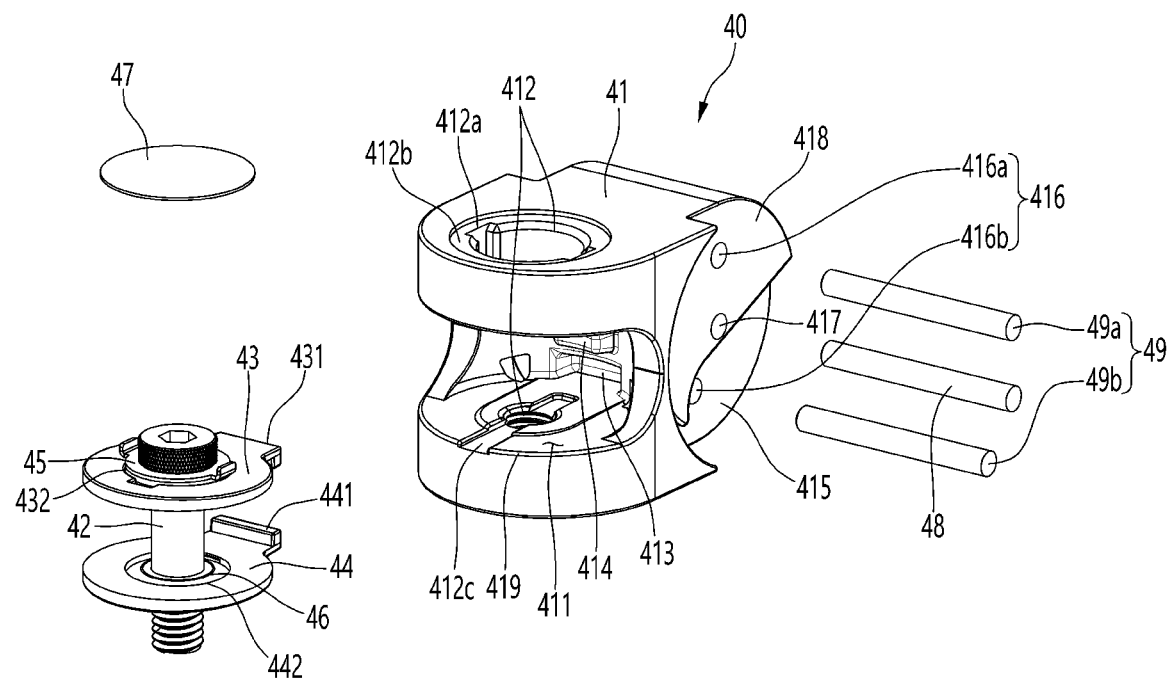
FIG. 13 is an exploded perspective view illustrating a connection unit constituting a display supporting apparatus according to an embodiment of the present disclosure.
Figure 14:
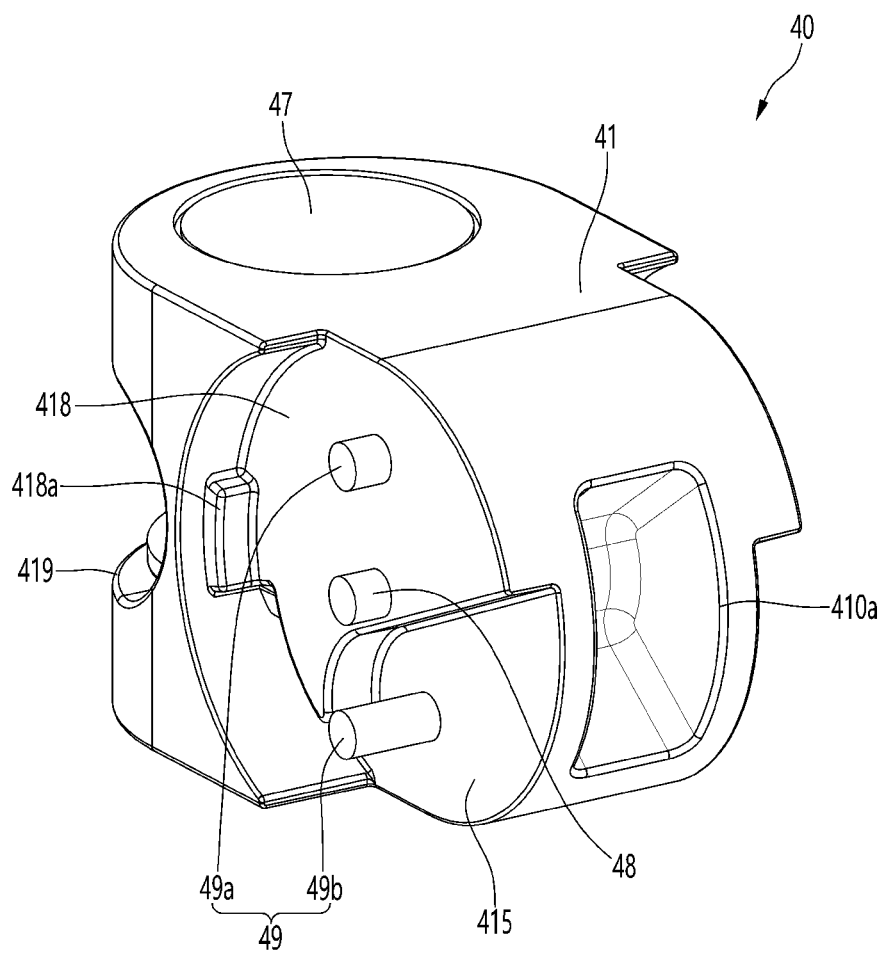
FIG. 14 is a rear perspective view illustrating the connection unit.
Figure 15:
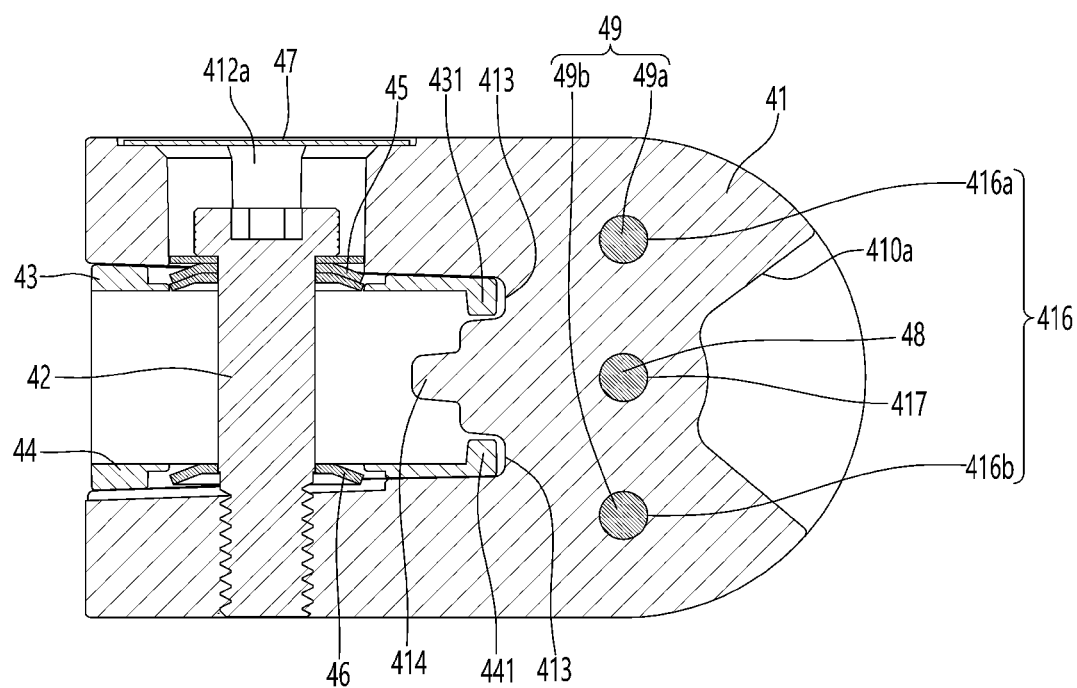
FIG. 15 is a longitudinal cross-sectional view illustrating the connection unit taken along line 14-14 in FIG. 4.

FIG. 13 is an exploded perspective view illustrating a connection unit constituting a display supporting apparatus according to an embodiment of the present disclosure, FIG. 14 is a rear perspective view illustrating the connection unit, and FIG. 15 is a longitudinal cross-sectional view illustrating the connection unit taken along line 14-14 in FIG. 4.

Referring to FIGS. 13 to 15, the connection unit 40 according to the embodiment of the present disclosure may be defined as a connection means for rotatably connecting the swivel module 23 to the arm unit 30.

In detail, the connection unit 40 may include a swivel head receiver 41 and a swivel shaft 42 passing through the swivel head receiver 41 in a vertical direction.

In addition, the connection unit 40 may further include an upper washer 45 and a lower washer 46 fitted to the swivel shaft 42.

In addition, an upper fixing plate 43 and a lower fixing plate 44 into which the upper washer 45 and the lower washer 46 are respectively fitted may be further included.

Insertion holes 432 and 442 into which the upper washer 45 and the lower washer 46 are respectively inserted are formed in the upper fixing plate 43 and the lower fixing plate 44, respectively. Fixing protrusions 431 and 441 may protrude from one edge of each of the upper fixing plate 43 and the lower fixing plate 44.

The connection unit 40 may further include a shaft cover 47 covering the swivel shaft 42.

The connection unit 40 may further include a tilting shaft 48 passing through a side surface of the swivel head receiver 412, and a tilting stopper 49.

The tilting stopper 49 may include an upper tilting stopper 49a located above the tilting shaft 48 and a lower tilting stopper 49b located below the tilting shaft 48.

A swivel head accommodation groove 411 accommodating the swivel head 252 of the swivel module 25 is formed inside the swivel head receiver 41, and a rod guide hole 419 is formed on the front surface of the swivel head receiver 41.

In a state where the swivel head 252 is accommodated in the swivel head accommodation groove 411, the connecting rod 253 of the swivel module 25 passes through the rod guide hole 419, and moves between one edge and the other edge of the rod guide hole 419.

A shaft through-hole 412 is formed on the upper surface and bottom of the swivel head receiver 41. The swivel shaft 42 is inserted into the shaft through-hole 412 at the upper side of the swivel head receiver 41, and the lower end portion of the swivel shaft 42 is screwed into the through-hole 412 formed at the bottom of the swivel head receiver 41.

In addition, a shaft cover seating groove 412b is formed on the upper surface of the swivel head receiver 41 where the shaft through-hole 412 is formed, and the shaft cover 47 is seated in the shaft cover seating groove 412b to shield the head portion of the swivel shaft 42.

In addition, a pair of anti-interference grooves 412a are formed on an inner circumferential surface of the shaft through-hole 412 formed on the upper surface of the swivel head receiver 41, so that, when the swivel shaft 42 is inserted into the shaft through-hole 412, interference with the extension end protruding from the edge of the upper washer 45 can be prevented.

A swivel limiting protrusion 414 protrudes forward from the center of the inner surface of the swivel head receiver 41 corresponding to the rear surface of the swivel head accommodation groove 411. When the swivel head 252 is completely inserted into the swivel head accommodation groove 411, the swivel limiting protrusion 414 is inserted into the swivel limiting groove 2522 formed on the rear surface of the swivel head 252, and thus sets the rotation limit of the swivel head 252.

In addition, fixing grooves 413 are recessed on the upper and lower sides of the swivel limiting protrusion 414, respectively.

A process of coupling the swivel head 252 to the connection unit 40 is as follows.

First, the lower fixing plate 44 and the lower washer 46 are positioned at the bottom of the swivel head accommodation groove 411, and the upper fixing plate 43 and the upper washer are positioned on the upper surface of the swivel head 252.

In this state, the swivel head 252 is pushed into the swivel head accommodation groove 411 so that the centers of the swivel shaft hole 2521 and the shaft through-hole 412 coincide. In addition, the fixing protrusions 431 and 441 of the upper fixing plate 43 and the lower fixing plate 44 are inserted into the fixing groove 413.

In this state, when the swivel shaft 42 is inserted into the shaft through-hole 412, the swivel shaft 42 passes through by the upper fixing plate 43, the upper washer 45, the swivel shaft hole 2521, the lower washer 46 and thus is screwed to the bottom of the swivel head accommodation groove 411. Then, the swivel head 252 becomes rotatable in the left and right direction about the swivel shaft 42.

Finally, the shaft cover 47 is seated in the shaft cover seating groove 412b to block external exposure of the swivel shaft 42.

Meanwhile, an inner cover contact surface 418 and a main link contact surface 415 may be formed on each of the left and right surfaces of the swivel head receiver 41 corresponding to the rear side of the swivel head accommodation groove 411. The inner cover contact surface 418 may be formed on an upper side of the main link contact surface 415.

As clearly illustrated in FIG. 14, the inner cover contact surface 418 may be formed to be stepped at a predetermined depth from the side surface of the swivel head receiver 41 toward the center. In addition, the main link contact surface 415 may be formed to be more stepped from the inner cover contact surface 418 toward the center of the swivel head receiver 41.

In addition, a catching protrusion 418a protrudes from the front end portion of the inner cover contact surface 418, and the front end portion of the base cover 37 to be described later is caught, and thus the downward tilting range of the swivel head receiver 41 is limited.

In addition, through-holes passing through the swivel head receiver 41 in a second horizontal axis (x-axis) direction may be formed in the swivel head receiver 41 corresponding to the rear side of the swivel head accommodation groove 411. In other words, the through-holes may be understood as horizontal holes passing through the left and right sides of the swivel head receiver 41.

The through-holes may include a tilting shaft hole 417 passing through the center of the swivel head accommodation groove 411 and tilting stopper holes 416 respectively formed on upper and lower sides of the tilting shaft hole 417.

The tilting stopper hole 416 may include an upper tilting stopper hole 416a and a lower tilting stopper hole 416b.

The upper tilting stopper 49a is inserted into the upper tilting stopper hole 416a, the lower tilting stopper 49b is inserted into the lower tilting stopper hole 416b, and the tilting shaft 48 is inserted into the tilting shaft hole 417.

In addition, the connection unit 40 may be tilted at a predetermined angle in an up and down direction about the tilting shaft 48.

In addition, a shaft groove 410a is recessed on the rear surface of the swivel head receiver 41 to prevent interference between the front end portion of the spring shaft 341 and the swivel head receiver 41, which will be described later.

[Arm Unit]

Figure 16:
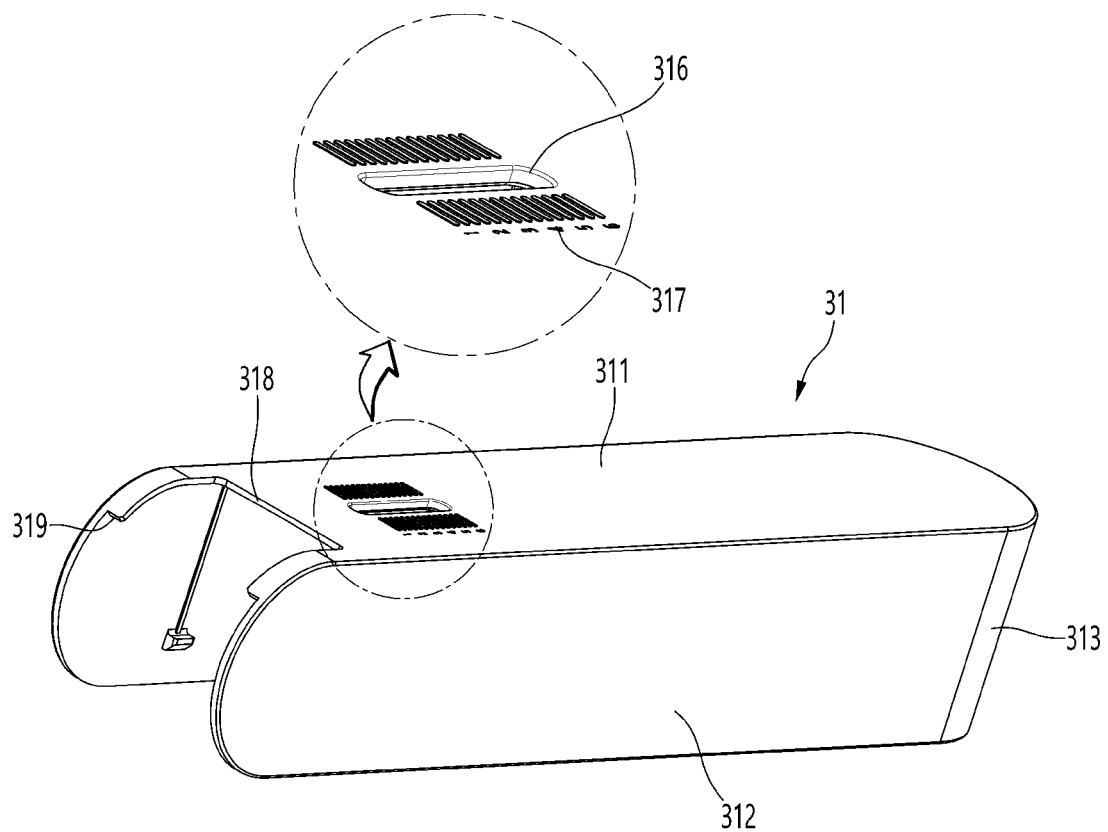
FIG. 16 is a front perspective view illustrating an outer cover constituting an arm unit according to an embodiment of the present disclosure.
Figure 17:
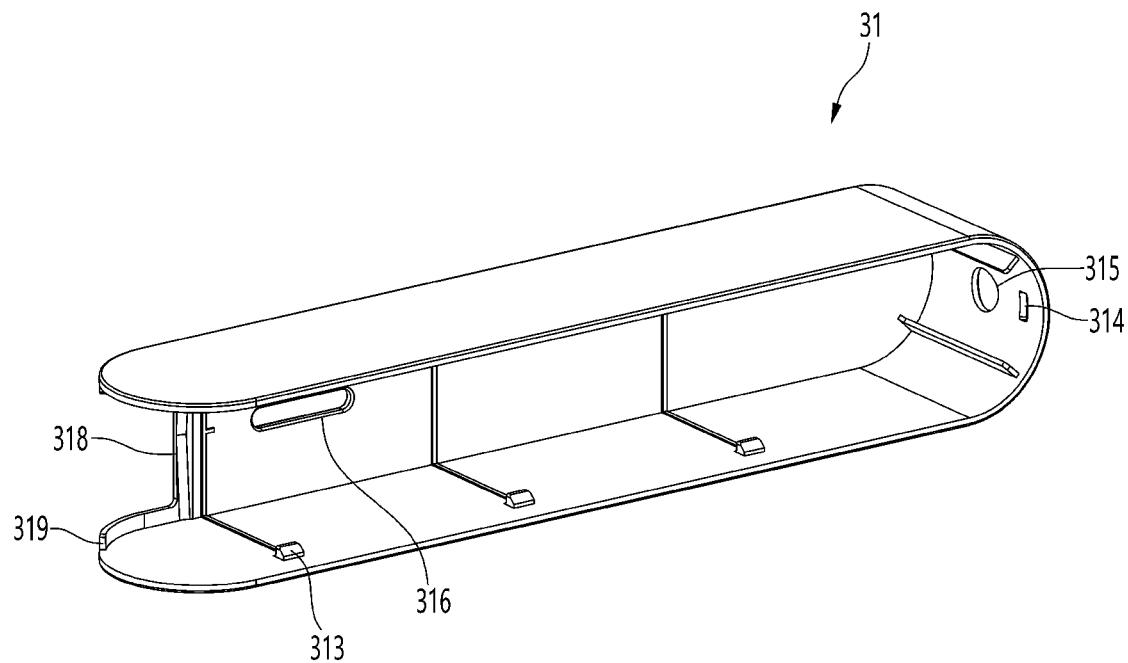
FIG. 17 is a bottom perspective view illustrating the outer cover.

FIG. 16 is a front perspective view illustrating an outer cover constituting an arm unit according to an embodiment of the present disclosure, and FIG. 17 is a bottom perspective view illustrating the outer cover.

Referring to FIGS. 16 and 17, the outer cover 31 according to the embodiment of the present disclosure may be formed in a form in which a bottom portion and a front portion are opened.

In detail, the outer cover 31 may include an upper portion 311, two side portions 312 extending downward from left and right edges of the upper portion 311, and a rear portion 313 extending downward from a rear end of the upper portion 311.

The rear portion 313 connects the rear end of one of the two side portions 312 to the rear end of the other, but may extend to be rounded with a predetermined curvature.

In addition, the front end of the side portion 312 is convexly rounded with a predetermined curvature, and as illustrated in FIG. 14, the front end portion of the inner cover contact surface 418 on which the catching protrusion 418a is formed has the same curvature. It can be formed to be rounded with the same curvature.

Therefore, when the swivel head receiver 41 is tilted in the up and down direction, the front end portion of the outer cover 31 does not interfere with the front end portion of the inner cover contact surface 418.

However, catching jaws 319 protrude from left and right edges of the front end portion of the outer cover 31 toward the center of the outer cover 31 to limit the upward tilting angle of the swivel head receiver 41.

In detail, the swivel head receiver 41 may be tilted upward until the catching jaw 319 comes into contact with the upper surface of the catching protrusion 418a.

In addition, an interference prevention groove 318 is formed at the front end of the outer cover 31 to be recessed or stepped, so that when the swivel head receiver 41 is tilted upward, a phenomenon that the swivel head receiver 41 is interfered with the outer cover 31 is prevented.

In another aspect, it can be described that the side portion 312 of the outer cover 31 further extends forward from the front end of the upper portion 311, and the front end of the side portion 312 is curved with a predetermined curvature.

In addition, it can be described as being tilted upward until the upper surface of the swivel head receiver 41 contacts the front end of the upper portion 311. When the upper surface of the swivel head receiver 41 touches the front end of the upper portion 311, the catching jaw 319 may be designed to contact the catching protrusion 418a of the swivel head receiver 41.

Meanwhile, a guide hole 316 is formed in the center of the upper portion 311 of the outer cover 31, and the guide hole 316 extends a predetermined length from the front end to the rear end of the outer cover 31.

A spring force display portion 317 displaying the degree of compression of the spring may be provided in the form of numbers on the left and/or right edges of the guide hole 316.

A plurality of side catching protrusions 313 may be formed on an inner surface of the side portion 312 of the outer cover 31, and a rear catching protrusion 314 may be formed on an inner surface of the rear portion 313.

In addition, a spring shaft hole 315 may be formed in the center of the rear surface portion 313.

Figure 18:
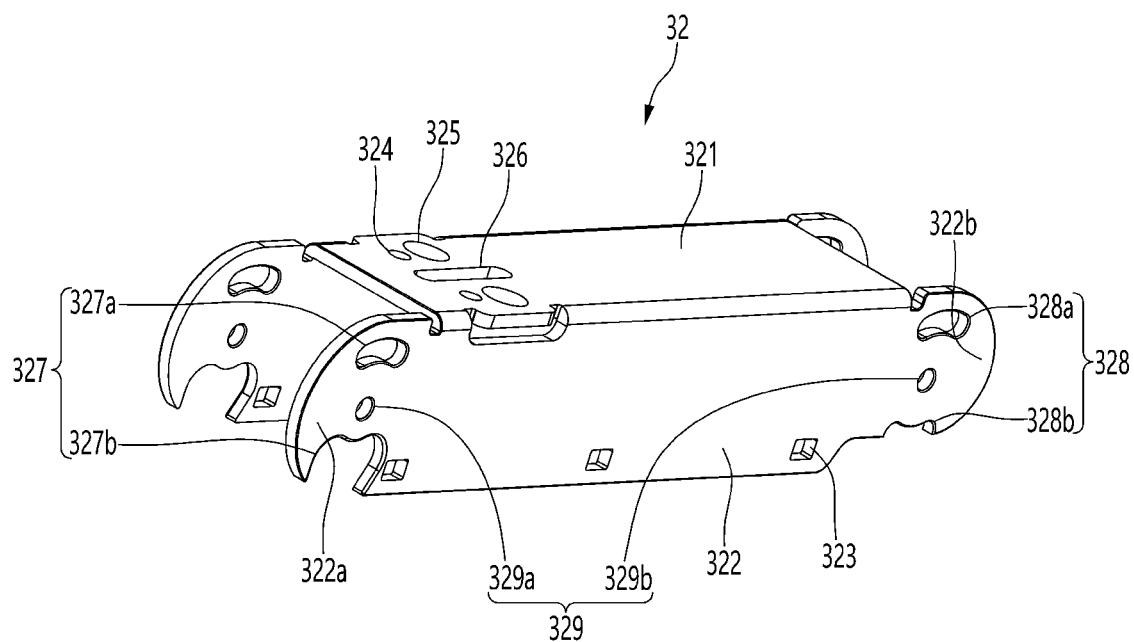
FIG. 18 is a perspective view illustrating an inner cover constituting an arm unit according to an embodiment of the present disclosure.

FIG. 18 is a perspective view illustrating an inner cover constituting an arm unit according to an embodiment of the present disclosure.

Referring to FIG. 18, the inner cover 32 constituting the arm unit according to the embodiment of the present disclosure, like the outer cover 31, may include an upper portion 321 extending to a predetermined width and length, a pair of side portions 322 extending downward from both side ends of the upper portion.

In detail, the side portion 322 may extend forward more than the front end of the upper portion 321, and the front end portion of the side portion 322 may be formed to be rounded with a predetermined curvature.

In addition, the side portion 322 may extend more backward than the rear end of the upper portion 321, and the rear end portion of the side portion 322 may also be formed to be rounded with a predetermined curvature.

Here, the portion of the side portion 322 that extends forward more than the front end of the upper portion 321 may be defined as the front extension portion 322a, and a portion of the side portion 322 that extends further backward than the rear end of the upper portion 321 may be defined as a rear extension portion 322b.

A guide hole 326 is formed at any point of the upper portion 322 corresponding to a direct lower side of the guide hole 316 formed in the outer cover 31.

A fixing protrusion hole 324 and a fastening hole 325 may be respectively formed on the left and right sides of the guide hole 326. The fixing protrusion hole 324 and the fastening hole 325 may be spaced apart from each other in the front and rear direction of the upper portion 321.

A plurality of side catching holes 323 are formed at the lower end of the side portion 322, and the side catching protrusions 313 formed on the outer cover 31 are inserted.

A tilting shaft hole 329 is formed in the front extension portion 322a and the rear extension portion 322b. The tilting shaft hole 329 may include a forward tilting shaft hole 329a formed in the front extension portion 322a and a rear tilting shaft hole 329b formed in the rear extension portion 322b. The tilting shaft 48 constituting the connection unit 40 is inserted into the front tilting shaft hole 329a.

In addition, a forward tilt limiting portion 327 and a rear tilt limiting portion 328 may be formed on the front extension portion 322a and the rear extension portion 322b, respectively.

The forward tilt limiting portion 327 may include an upper limiting hole 327a and a lower limiting groove 327b. The upper limiting hole 327a extends in an arc shape with a predetermined length from the upper side of the forward tilting shaft hole 329a. The lower limiting groove 327b is formed on the lower side of the front tilting shaft hole 329a and may be recessed upward by a predetermined depth from the lower end of the front extension portion 322a.

The upper tilting stopper 49a constituting the connection unit 40 is inserted into the upper limiting hole 327a, and the end portion of the lower tilting stopper 49b constituting the connection unit 40 is accommodated into the lower limiting groove 327b. Accordingly, the swivel head receiver 41 may be tilted up and down by the length of the upper limiting hole 327a.

Meanwhile, the rear tilt limiting portion 328 may include an upper limiting hole 328a and a lower limiting groove 328b.

The length of the upper limiting hole 327a may be set to be different from the length of the upper limiting hole 328a. Similarly, the length of the lower limiting groove 327b may be set to be different from the length of the lower limiting groove 328b.

Figure 19:
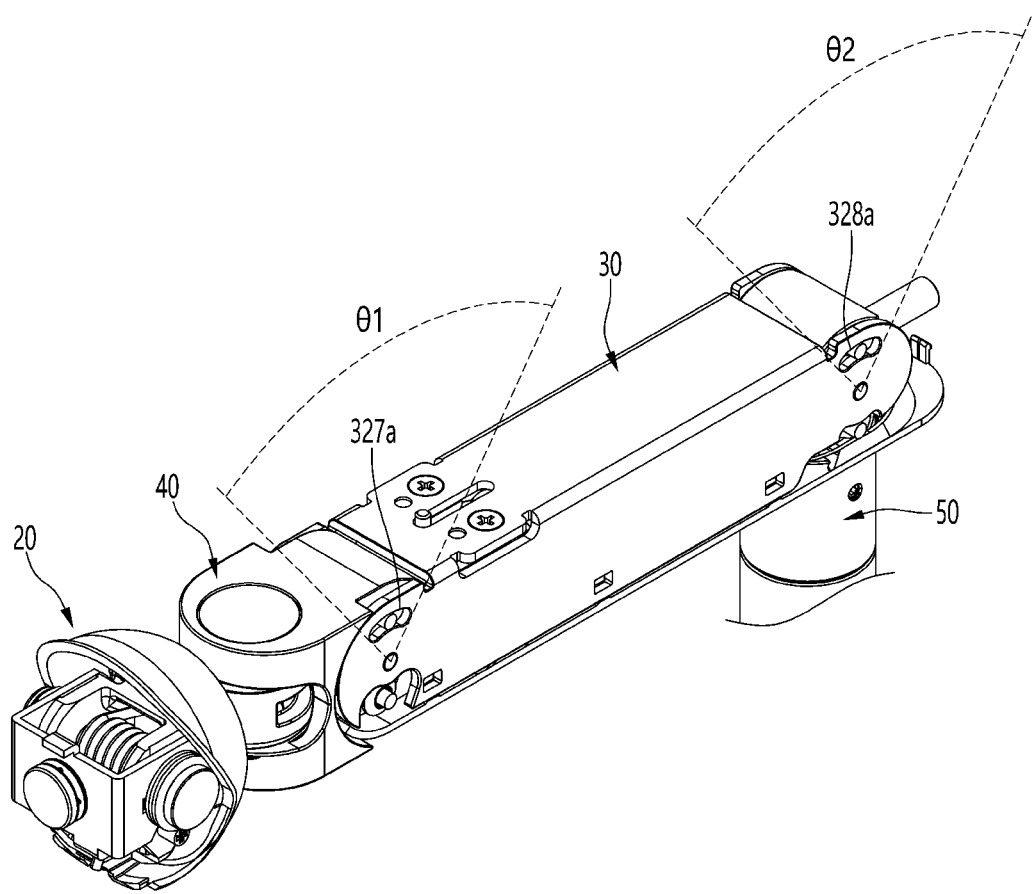
FIG. 19 is a partial perspective view illustrating a connection state between a connection unit and an arm unit.

FIG. 19 is a partial perspective view illustrating a connection state between a connection unit and an arm unit.

Referring to FIG. 19, the connection unit 40 is capable of tilting by a predetermined angle θ1 (first set angle) in the up and down direction while connected to the front end of the arm unit and the angle θ1 may be understood as an angle from the front end portion to the rear end portion of the upper limiting hole 327a with the front tilting shaft hole 329a as the center.

In addition, the arm unit 30 can be rotated or tilted by a predetermined angle θ2 (second set angle) in the up and down direction while being connected to the upper end of the neck unit 50. The angle θ2 may be understood as an angle from the front end portion to the rear end portion of the upper limiting hole 328a with the rear tilting shaft hole 329b as the center.

Figure 20:
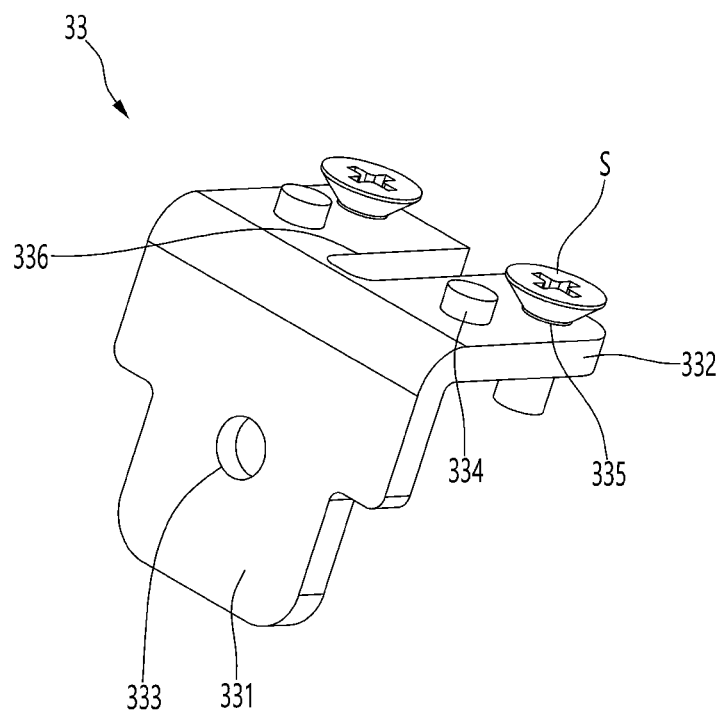
FIG. 20 is a perspective view illustrating a spring supporting bracket constituting an arm unit according to an embodiment of the present disclosure.

FIG. 20 is a perspective view illustrating a spring supporting bracket constituting an arm unit according to an embodiment of the present disclosure.

Referring to FIG. 20, a spring supporting bracket 33 according to an embodiment of the present disclosure includes a vertical portion 331 and a horizontal portion 332 bent backward from an upper end of the vertical portion 331.

A guide groove 336 is formed at the center of the horizontal portion 332 and, in detail, the guide groove 336 extends a predetermined length forward from the rear end of the horizontal portion 332.

The spring supporting bracket 33 is mounted on the upper surface of the inner cover 32, and the guide groove 336 is aligned with the guide hole 326 which is formed on the upper surface of the inner cover 32 in a state of being mounted on the upper surface of the inner cover 32. In other words, the front end portions of the guide groove 336 and the guide hole 326 are placed on the same vertical plane.

In the horizontal portion 332, a fixing protrusion 334 inserted into the fixing protrusion hole 324 of the inner cover 32 may protrude, and the fastening hole 335 aligned with the fastening hole 325 of the inner cover 32 is formed.

In a state where the fixing protrusion 334 is inserted into the fixing protrusion hole 324 and the mounting position is determined, the fastening member S passes through the fastening hole 325 of the inner cover 32 and the fastening holes 335 of the spring supporting bracket 33 in turn. Then, the spring supporting bracket 33 can be fixed to the lower surface of the upper portion 321 of the inner cover 32.

In addition, a shaft hole 333 may be formed in the vertical portion 331 of the spring supporting bracket 33. A front end portion of a spring shaft 341 to be described later is inserted into the shaft hole 333.

Figure 21:
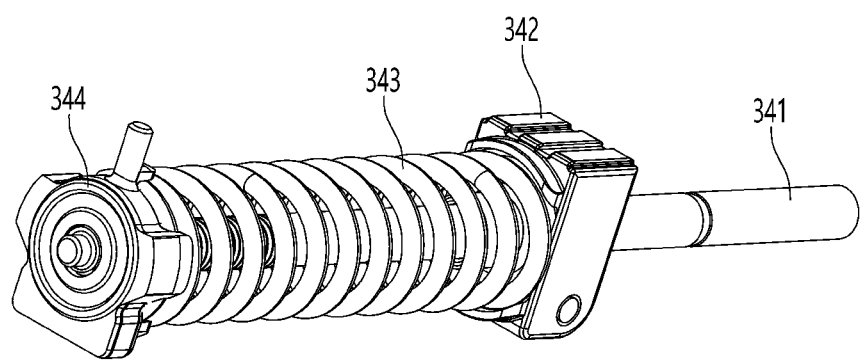
FIG. 21 is a perspective view illustrating an elastic adjustment body constituting an arm unit according to an embodiment of the present disclosure.
Figure 22:
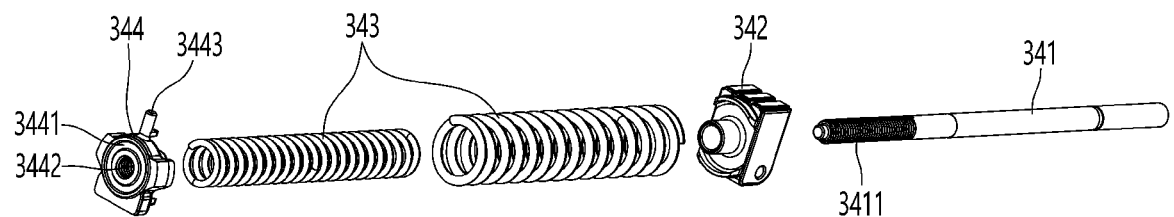
FIG. 22 is an exploded perspective view illustrating the elastic adjustment body.

FIG. 21 is a perspective view illustrating an elastic adjustment body constituting an arm unit according to an embodiment of the present disclosure, and FIG. 22 is an exploded perspective view illustrating the elastic adjustment body.

Referring to FIGS. 21 and 22, the elastic adjustment body 34 according to an embodiment of the present disclosure may include a spring shaft 341 and one or more coil springs 343 fitted to the outer circumferential surface of the spring shaft 341, a spring supporter 344 fitted to the spring shaft 341 to support the front end of the coil spring 343, and a spring pusher 342 fitting into the spring shaft 341 and supporting the rear end portion of the coil spring. The coil spring 343 includes a compression spring.

A screw thread 3411 is formed on the outer circumferential surface of the spring shaft 341, and the screw thread may start from the front end portion of the spring shaft 341 and extend toward the rear end portion by a predetermined length.

The lower end of the spring pusher 342 is connected to an auxiliary link 36 to be described later, so that when the arm unit 30 is tilted in the up and down direction, the coil spring 343 is reduced or expanded while the arm units 30 is tilting in the up and down direction.

In addition, a wrench groove is formed on the rear surface of the spring shaft 341, so that the assembler can rotate the spring shaft 341 in the clockwise direction or in the counterclockwise direction using a wrench. As the spring shaft 341 rotates in the clockwise direction or in the counterclockwise direction, the spring supporter 344 advances or retreats along the spring shaft 341 and contracts or extends the coil spring 343.

In detail, the spring force of the coil spring 343 is adjusted according to the position of the spring supporter 344. In other words, as the spring supporter 344 moves toward the rear end portion of the spring shaft 341, the coil spring 343 is compressed and the spring force increases. Accordingly, the assembler can adjust the spring force of the coil spring 343 by moving the spring supporter 344 to an appropriate position according to the size or load of the display panel D.

Figure 23:
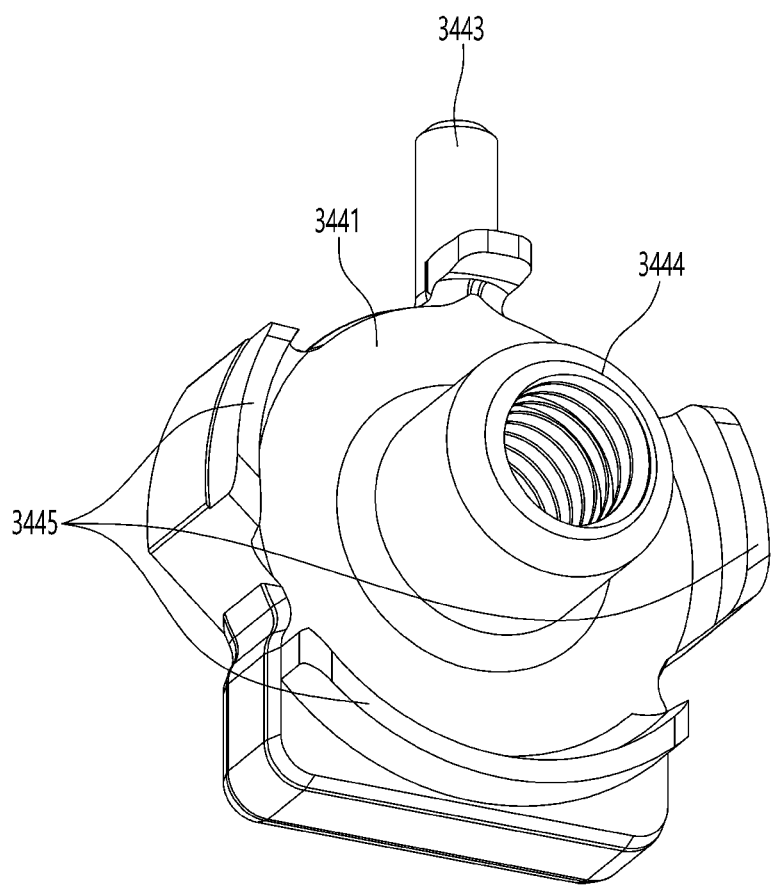
FIG. 23 is a rear perspective view illustrating the spring supporter constituting the elastic adjustment body.

FIG. 23 is a rear perspective view illustrating the spring supporter constituting the elastic adjustment body.

Referring to FIGS. 22 and 23, the spring supporter 344 may include a supporter body 3441 having a shaft hole 3442 formed in the center, and a shaft sleeve 3444 extending a predetermined length from the rear surface of the supporter body 3441.

The spring shaft 341 passes through the shaft sleeve 3444 and is fitted to the shaft hole 3442.

The spring supporter 344 may further include a guide protrusion 3443 extending a predetermined length from an upper surface of the supporter body 3441.

The guide protrusion 3443 sequentially passes through the guide groove 336 of the spring supporting bracket 33, the guide hole 326 of the inner cover 32, and the guide hole 316 of the outer cover 31. In addition, the guide protrusion 3443 moves forward or backward within the guide hole 316 to adjust the spring force, and it is possible to check how much the coil spring 343 is compressed through the spring force display portion 317.

The spring supporter 344 may further include a plurality of spring support ribs 3445 extending backward from an edge of the supporter body 3441. The spring support rib 3445 contacts an outer circumferential surface of the coil spring 343 and stably supports an end portion of the coil spring 3443.

Figure 24:
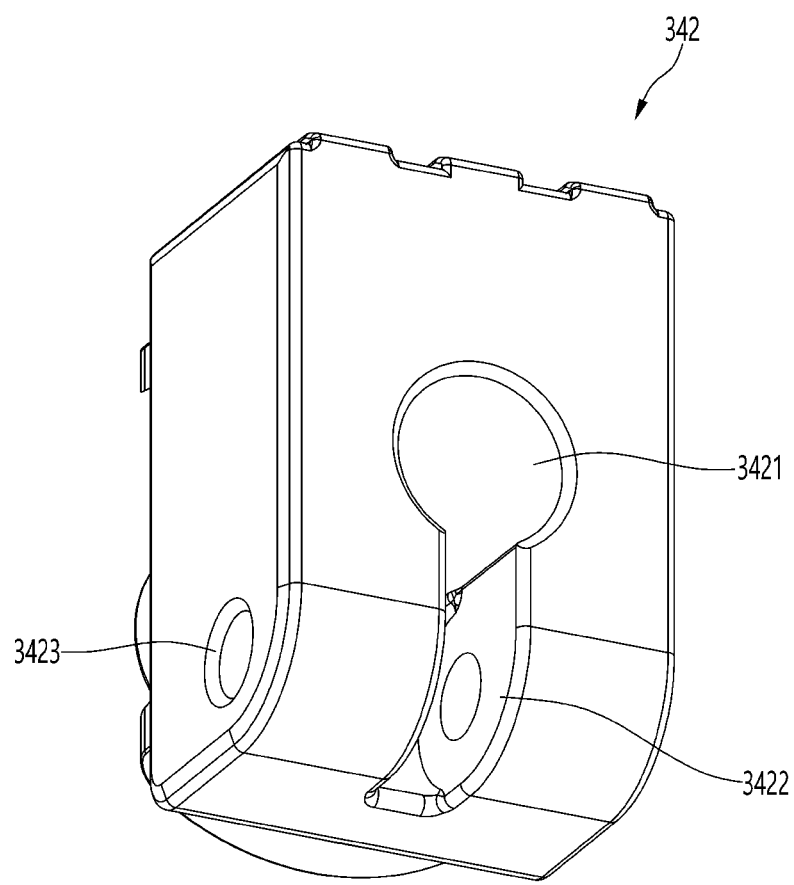
FIG. 24 is a rear perspective view illustrating a spring pusher constituting an elastic adjustment body.

FIG. 24 is a rear perspective view illustrating a spring pusher constituting an elastic adjustment body.

Referring to FIGS. 22 and 24, a shaft hole 3421 is formed at the center of the spring pusher 342, and the spring shaft 341 passes through the shaft hole 3421.

An auxiliary link insertion groove 3422 is formed in the spring pusher 342, and the auxiliary link insertion groove 3422 extends from the lower end of the spring pusher 342 to the shaft hole 3421.

A pin hole 3423 is formed on the lower side of the spring pusher 342, and the pin hole 3423 passes through both side surfaces of the spring pusher 342 and the auxiliary link insertion groove 3422.

A front connection pin (P1: see FIG. 25) to be described later passes through the pin hole 3423 and the auxiliary link 36 inserted into the auxiliary link insertion groove 3422. Thus, the spring pusher 342 and the auxiliary link 36 move singularly. In addition, when the arm unit 30 tilts in the up and down direction, the upper end of the auxiliary link 36 tilts in the vertical direction so that the spring pusher 342 moves forward or backward along the spring shaft 341.

Figure 25:
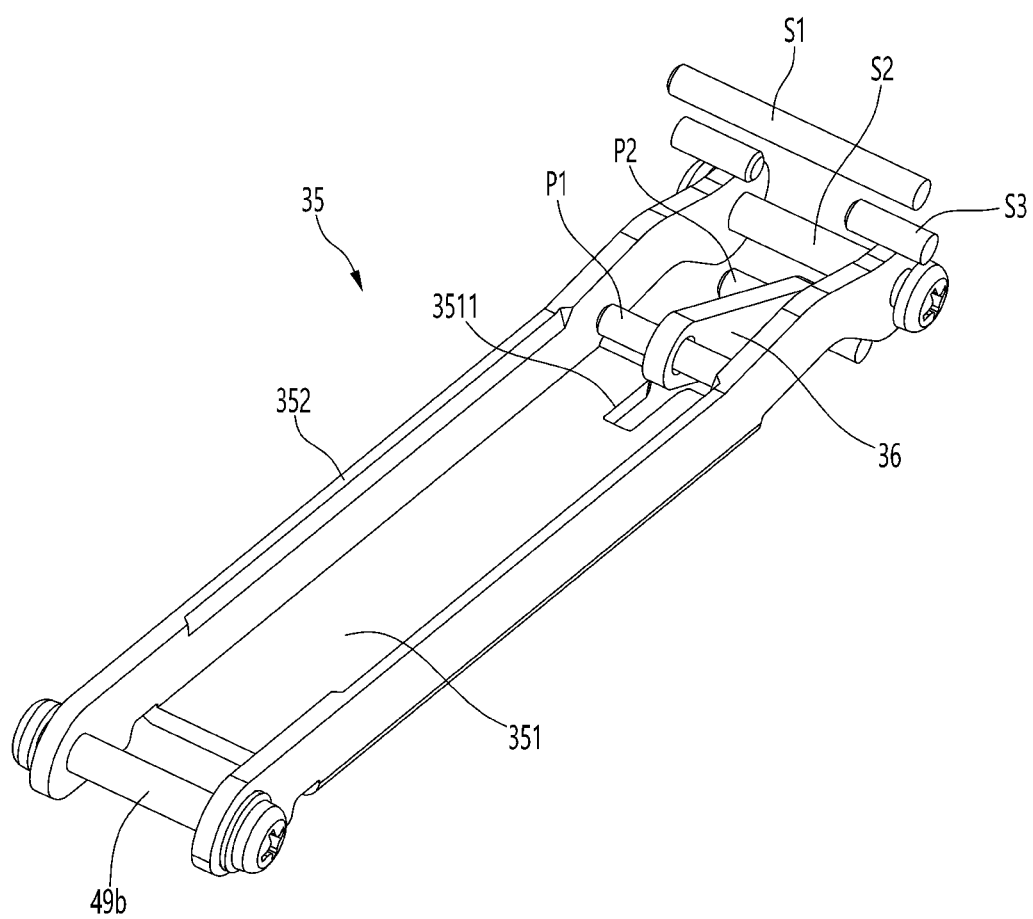
FIG. 25 is a perspective view illustrating a coupling state of a main link and an auxiliary link constituting an arm unit according to an embodiment of the present disclosure.

FIG. 25 is a perspective view illustrating a coupling state of a main link and an auxiliary link constituting an arm unit according to an embodiment of the present disclosure.

Referring to FIG. 25, the main link 35 according to an embodiment of the present disclosure may include a bottom portion 351 and side portions 352 extending upward from both side ends of the bottom portion 351.

The side portion 352 extends forward more than the front end portion of the bottom portion 351, and the front end portion of the side portion 352 is located at a point farther forward than the front end portion of the bottom portion 351.

In addition, the side portion 352 extends further backward than the rear end portion of the bottom portion 351, and the rear end portion of the side portion 352 is located at a point spaced apart from the rear end portion of the bottom portion 351.

The lower tilting stopper (49b: see FIG. 13) sequentially passes through one of the pair of side portions 352 and the other of the swivel head receiver 41 and the pair of side portions 352 to connect the swivel head receiver 41 and the front end portion of the main link 35.

A lower tilting stopper S2 is inserted through the rear end of the side portion 352. In addition, the upper tilting stopper S1 passes through the upper limiting hole 328a of the inner cover and the link coupler 51 to be described later.

In addition, the pair of tilting shafts S3 are inserted into the link coupler 51 through the rear tilting shaft hole 329b formed in the rear extension portion 322b of the inner cover 32. In detail, one of the pair of tilting shafts S3 is inserted into the link coupler 51 through the rear tilting shaft hole 329b formed in the left side portion 322 of the inner cover 32, and the other one is inserted into the link coupler 51 through the rear tilting shaft hole 329b formed in the right side portion 322 of the inner cover 32.

Meanwhile, the front connecting pin (P1) passes through the front end portion of the auxiliary link 36, and both end portions are inserted into the two side portions 352. A point where the front connection pin P1 is connected to the side portion 352 may be a point spaced upward from the vicinity of the rear end portion of the bottom portion 351.

In addition, an auxiliary link avoidance groove 3511 may be formed at the center of the rear end portion of the bottom portion 351. The auxiliary link avoidance groove 3511 extends forward by a predetermined length from the rear end of the bottom portion 351, so that when the arm unit 30 is tilted in the up and down direction, the auxiliary link 36 and the bottom portion 351 is prevented from being interfered with each other.

Figure 26:
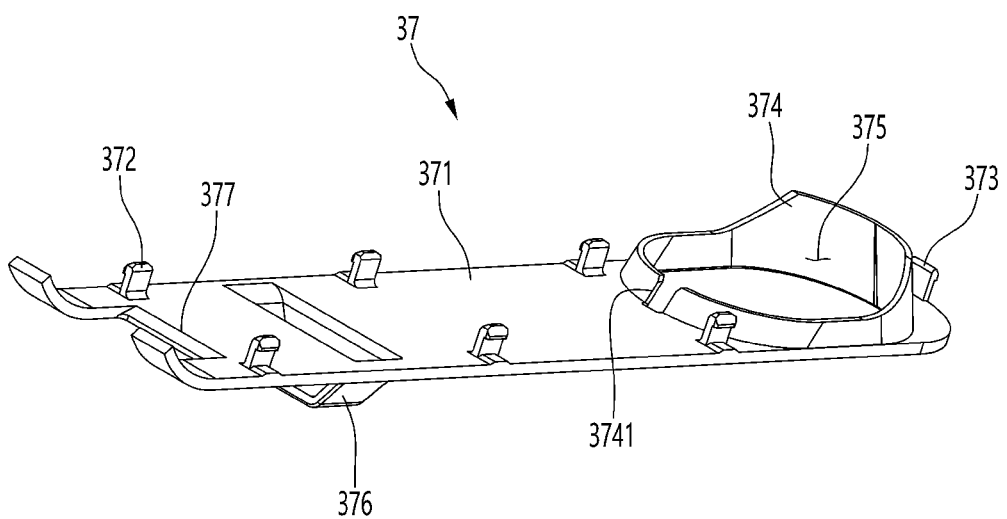
FIG. 26 is a perspective view illustrating a base cover constituting an arm unit according to an embodiment of the present disclosure.

FIG. 26 is a perspective view illustrating a base cover constituting an arm unit according to an embodiment of the present disclosure.

Referring to FIG. 26, a base cover 37 according to an embodiment of the present disclosure includes a cover body 371, side hooks 372 protruding from left and right edges of the cover body 371, and a rear hook 373 protruding from the rear end portion of the cover body 371.

The side hook 372 passes through the side catching hole 323 formed on the side surface of the inner cover 32 and is caught on the side catching protrusion 313 formed on the side surface of the outer cover 31.

A link coupler through-hole 375 is formed on the rear side of the cover body 371, and a guide sleeve 374 extends upward from an edge of the link coupler through-hole 375.

The guide sleeve 374 may extend obliquely in a form in which an inner diameter thereof decreases toward the upper side.

An auxiliary link avoidance groove 3741 may be formed in the guide sleeve 374, and a line bisecting the width of the cover body 371 may coincide with a line bisecting the auxiliary link avoidance groove 3741.

In addition, an interference prevention groove 377 may be recessed to a predetermined depth in the cover body 371. The interference prevention groove 377 has a width smaller than the width of the cover body 371 and is recessed to a predetermined depth, so that when the connection unit 40 is tilted in the vertical direction, the connection unit prevents interference with the swivel head receiver 41.

The front end portion of the cover body 371 is rounded upward, and the swivel head receiver 411 may be tilted downward until the front end portion of the cover body 371 is caught on the catching protrusion 418a (see FIG. 14).

A cable guide rib 376 may be formed at any point of the cover body 371. The cable guide rib 376 may be formed by cutting a portion of the cover body 371 in the form of 11 in the width direction of the cover body 371 and then bending it downward.

In addition, by allowing the cable to pass through the space formed inside the cable guide rib 376, it is possible to minimize a phenomenon in which the cable extending from the display panel D droops downward due to its own weight.

[Neck Unit]

Figure 27:
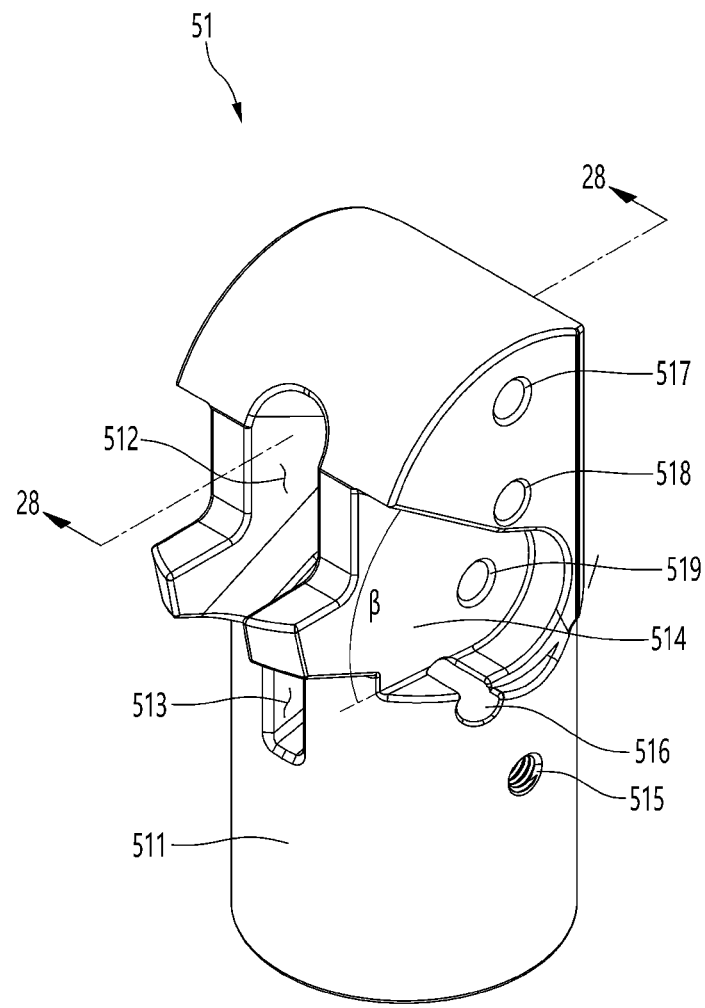
FIG. 27 is a perspective view illustrating a link coupler constituting a neck unit according to an embodiment of the present disclosure.
Figure 28:
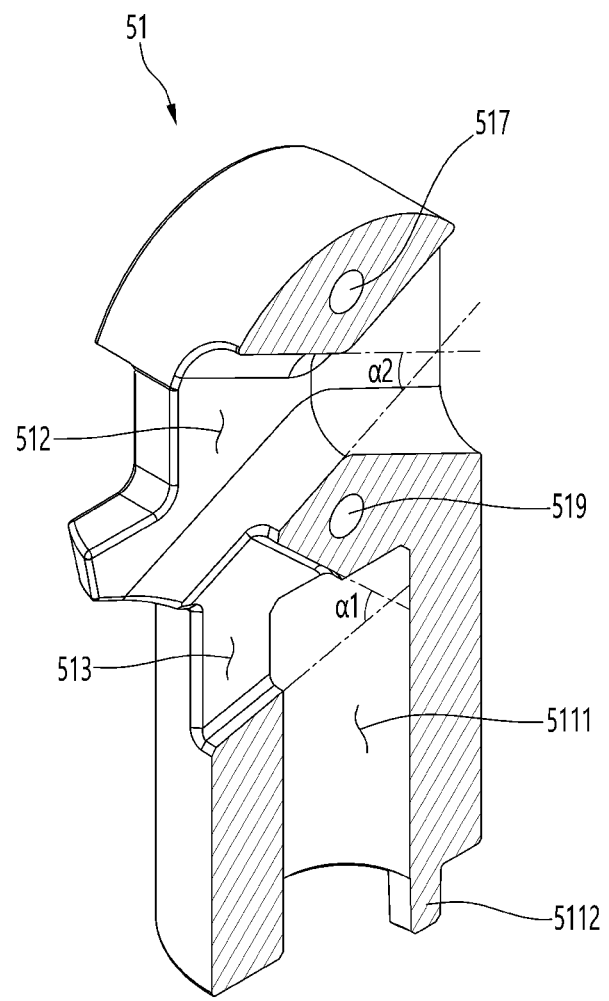
FIG. 28 is a longitudinal cross-sectional view illustrating the link coupler taken along line 28-28 of FIG. 27.

FIG. 27 is a perspective view illustrating a link coupler constituting a neck unit according to an embodiment of the present disclosure, and FIG. 28 is a longitudinal cross-sectional view illustrating the link coupler taken along line 28-28 of FIG. 27.

Referring to FIGS. 27 and 28 together with FIG. 3, the link coupler 51 constituting the neck unit 50 according to the embodiment of the present disclosure may be understood as a means for rotatably supporting the rear end portion of the arm unit 30.

In detail, the link coupler 51 includes a cylindrical coupler body 511, and a swivel shaft accommodation groove 5111 is formed inside the coupler body 511.

The swivel shaft accommodation groove 5111 extends a predetermined length upward from the bottom of the coupler body 511 and has a diameter corresponding to the outer diameter of the swivel shaft 52 to be described later.

A fastening hole 515 extends in a horizontal direction at a point spaced apart by a predetermined length upward from the bottom of the coupler body 511. A fastening member inserted into the fastening hole 515 passes through the swivel shaft 52 and fixes the swivel shaft 52 to the link coupler 51.

In addition, an auxiliary link insertion port 513 is formed in the coupler body 511. In detail, the auxiliary link insertion port 513 extends a predetermined length backward from the outer circumferential surface of the coupler body 511 and communicates with the upper end portion of the swivel shaft accommodation groove 5111.

The auxiliary link insertion port 513 is inclined in a form in which the width thereof becomes narrower toward the rear end. Specifically, the longitudinal section of the auxiliary link insertion port 513 may be formed in a vertically symmetrical shape based on a horizontal plane bisecting the inlet of the auxiliary link insertion port 513. Accordingly, the auxiliary link 36 can rotate in the up and down direction within the auxiliary link insertion hole 36 by an angle α1 between the upper and lower surfaces of the auxiliary link insertion port 513.

A spring shaft insertion port 512 is formed in the link coupler 51 corresponding to the upper side of the auxiliary link insertion port 513.

The spring shaft insertion port 512 is formed to a length from the front surface to the rear surface of the link coupler 51 and completely passes through the link coupler 51 in the transverse direction.

In addition, the spring shaft 341 of the elastic adjustment body 34 is inserted into the spring shaft insertion port 512 and tilted in the up and down direction by a predetermined angle. Thus, the tilting center of the spring shaft 341 is formed inside the spring shaft insertion port 512.

The spring shaft insertion port 512 has a shape whose cross-sectional area changes based on the tilting center.

In detail, from the outer circumferential surface of one side of the link coupler 51 to the center of the tilting, the longitudinal cross-sectional area is formed inclined in a decreasing form, and from the center of the tilting to the outer circumferential surface of the other side of the link coupler 51, the longitudinal cross-sectional area is formed to be inclined in an increasing form.

In other words, the spring shaft insertion port 512 has a longitudinal cross-sectional shape when two truncated cones lying down meet at the center of the tilting. Accordingly, the spring shaft 341 can be tilted in the up and down direction within the spring shaft insertion port 512 within a range reaching the upper and lower surfaces of the spring shaft insertion port 512.

A pair of main link seating surfaces 514 are recessed on the outer circumferential surface of the link coupler 51. In detail, the pair of main link seating surfaces 514 may be formed to be stepped at a predetermined depth in a direction where they face each other and become closer to each other.

The main link seating surface 514 is a surface on which the rear end portion of the side portion 352 of the main link 35 is rotatably seated, and may be formed to be stepped by the thickness of the rear end portion of the side portion 352.

In addition, a plurality of holes extending in a horizontal direction intersecting the extension direction of the spring shaft insertion port 512 or the auxiliary link insertion port 513 are formed in the link coupler 51.

The plurality of holes may include a lower tilting stopper hole 519 formed on the main link seating surface 514, a rear connection pin hole 516 formed at a point corresponding to the lower side of the lower tilting stopper hole 519, a tilting shaft hole 518 formed at a point corresponding to the upper side of the lower tilting stopper hole 519, an upper tilting stopper hole 517 formed on the upper side of the tilting shaft hole 518, and a fastening hole 515 formed at any point corresponding to the lower side of the rear connection pin hole 516.

The rear connection pin P2 illustrated in FIG. 25 is inserted into the rear connection pin hole 516 and functions as a rotation center of the auxiliary link 36. In addition, the lower tilting stopper S2 is inserted into the lower tilting stopper hole 519 and functions as a rotation center of the main link 35.

In a state where the rear end of the side portion 352 of the main link 35 is seated on the main link seating surface 514, the side portion 352 can be tilted by a predetermined angle β between the upper and lower surfaces of the main link seating surface 514 in the up and down direction.

In addition, referring to FIG. 19, the tilting shaft S3 is inserted into the tilting shaft hole 518 and functions as a rotation center of the inner cover 32. The upper tilting stopper S1 is inserted into the upper tilting stopper hole 517 to set the tilting limit θ2 of the arm unit 30.

Figure 29:
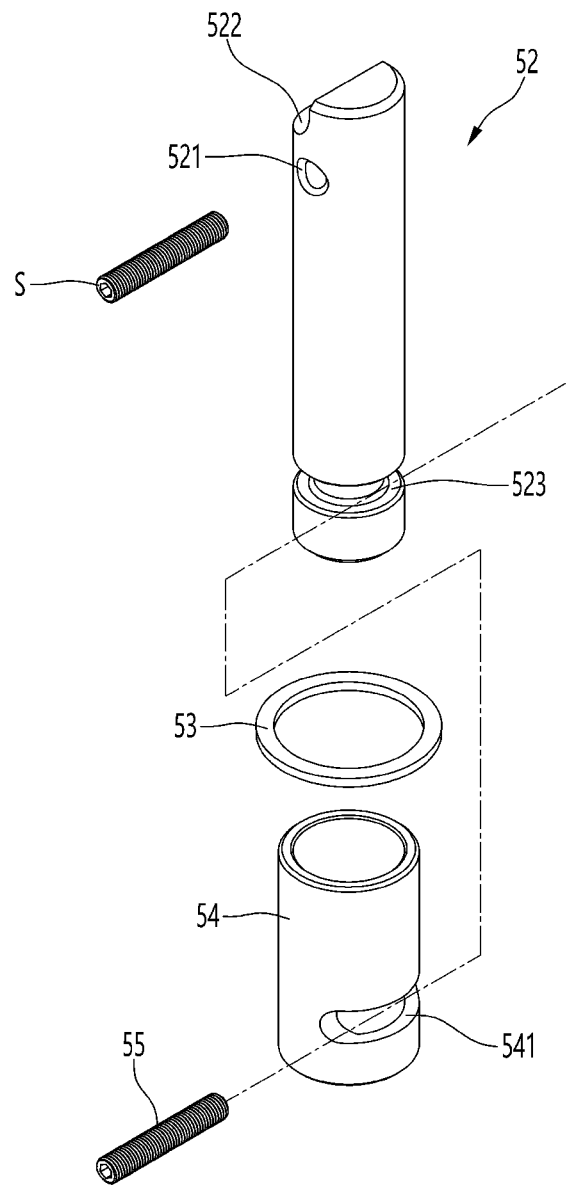
FIG. 29 is an exploded perspective view illustrating a swivel shaft and a swivel bushing constituting a neck unit according to an embodiment of the present disclosure.

In addition, a fastening pin S to be described in FIG. 29 is inserted into the fastening hole to singularly connect the swivel shaft 52 and the link coupler 51.

Meanwhile, a limiting protrusion 5112 protrudes from the lower end portion of the link coupler 51 to limit the amount of rotation of the link coupler 51 in the left and right direction. In detail, the link coupler 51 is provided to be rotatable about a vertical axis (y axis), but the amount of rotation in the left and right direction about the vertical axis is limited by the limiting protrusion 5112.

FIG. 29 is an exploded perspective view illustrating a swivel shaft and a swivel bushing constituting a neck unit according to an embodiment of the present disclosure.

Referring to FIG. 29, the neck unit 50 according to an embodiment of the present disclosure may include a swivel shaft 52, a swivel bushing 54 fitted to the outer circumferential surface of the lower end portion of the swivel shaft 52, and a swivel bushing pin 55 passing through the swivel bushing 54 in a tangential direction.

The lower end of the link coupler 51 and the upper end of the upper pillar 62 to be described later are assembled by contacting each other, and a bearing 53 may be interposed at the contacting portion. By being provided in the bearing 53, when the link coupler 51 rotates about a vertical axis, frictional force due to contact with the upper pillar 62 can be minimized.

An auxiliary link seating end 522 may be formed at an upper end of the swivel shaft 52. The auxiliary link seating end 522 is a portion where the rear end of the auxiliary link 36 is seated, and it is necessary to minimize interference and friction with the auxiliary link 36. Therefore, the auxiliary link seating end 522 may be formed to be rounded in a shape corresponding to a trajectory generated when the rear end of the auxiliary link 36 rotates.

In addition, a fastening hole 521 is formed at a point spaced downward from the upper end of the swivel shaft 52. The fastening hole 521 is a hole into which a fastening pin S for connecting the link coupler 51 and the swivel shaft 52 is inserted. Therefore, the fastening pin S passes through the fastening hole 515 of the link coupler 51 and is inserted into the fastening hole 521. By the fastening pin S, the link coupler 51 and the swivel shaft 52 rotate singularly.

At a point spaced upward from the lower end portion of the swivel shaft 52, a bushing pin catching groove 523 is recessed to a predetermined depth. The bushing pin catching groove 523 is formed in the circumferential direction of the swivel shaft 52.

A pin insertion hole 541 is formed at a point spaced apart from the lower end of the swivel bushing 52 upward. The pin insertion hole 541 extends a predetermined length in the circumferential direction of the swivel bushing 54 so that the swivel bushing pin 55 can be inserted into the swivel bushing 54 in a tangential direction.

The formation height of the pin insertion hole 541 is formed at the same point as the formation height of the bushing pin catching groove 523, so that when the swivel bushing pin 55 is inserted into the pin insertion hole 541, the swivel bushing pin 55 is also fitted to the bushing pin catching groove 523 at the same time.

Therefore, the swivel bushing 54 is singularly combined with the swivel shaft 52 by the swivel bushing pin 55. In addition, in a state where the swivel bushing 54 is fixed, the swivel shaft 52 is rotatable about a vertical axis with respect to the swivel bushing 54.

In addition, the swivel bushing pin 55 is inserted into the pin insertion hole 541 through the bushing pin insertion hole 6222 (see FIG. 34) formed in the upper pillar 62. Therefore, the swivel shaft 52 and the swivel bushing 54 are not separated from the upper pillar 62 by the swivel bushing pin 55. In addition, the swivel shaft 52 is rotatable about a vertical axis with respect to the upper pillar 62.

Figure 30:
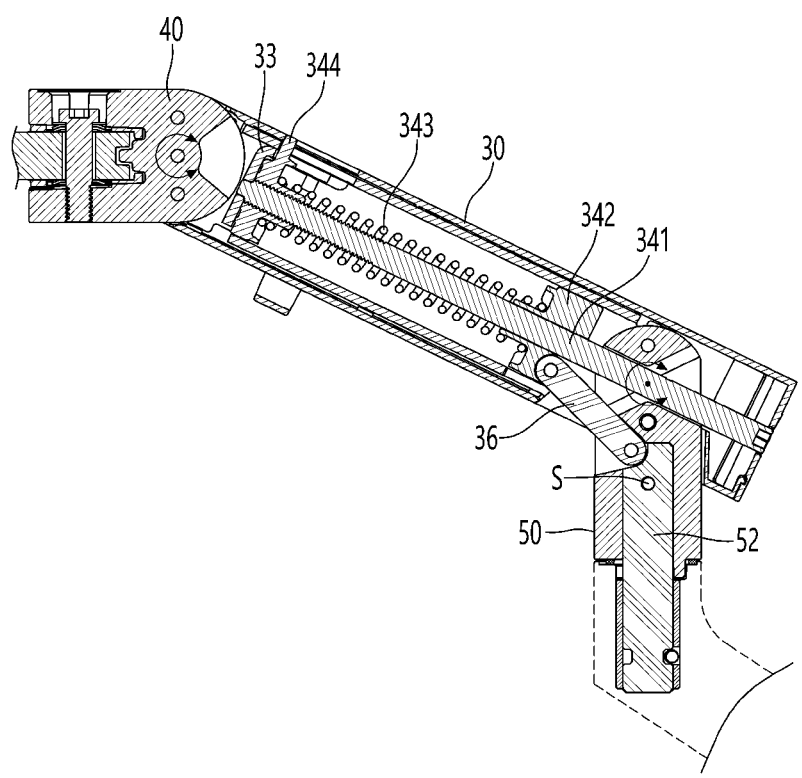
FIGS. 30 and 31 are cross-sectional views illustrating an operating state of an arm unit constituting a display supporting apparatus according to an embodiment of the present disclosure.
Figure 31:
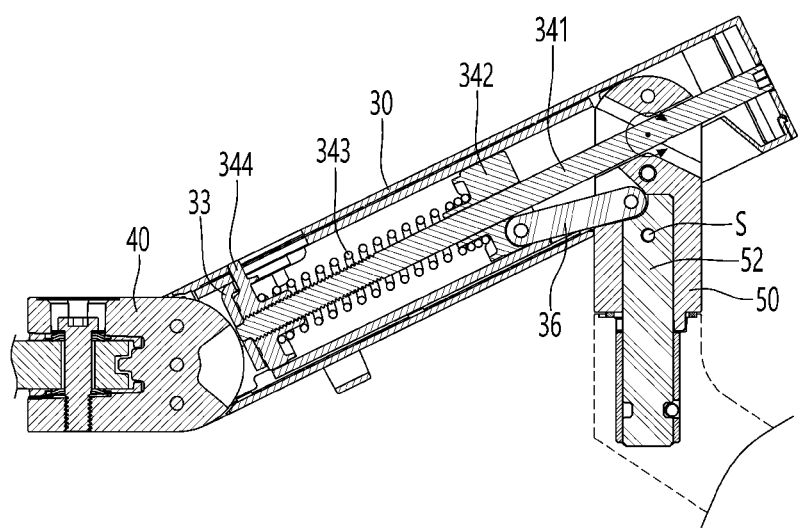

FIGS. 30 and 31 are cross-sectional views illustrating an operating state of an arm unit constituting a display supporting apparatus according to an embodiment of the present disclosure.

Referring to FIGS. 30 and 31, the arm unit 30 can tilt in the up and down direction about a second horizontal axis (x-axis) in a state of being connected to the neck unit 50, and the neck unit 50 is rotatable about a vertical axis with respect to the pillar unit 60.

In detail, when the arm unit 30 is tilted upward, the spring pusher 342 connected to the auxiliary link 36 moves backward to the rear end of the spring shaft 341 and tensions the coil spring 343.

Conversely, when the arm unit 30 tilts downward, the spring pusher 342 compresses the coil spring 343 while moving forward to the front end of the spring shaft 341.

At this time, when an assembler mounts a wrench 63 (to be described later) on the rear surface of the spring shaft 341 to rotate the spring shaft 341, the spring supporter 344 moves forward or backward along the spring shaft 341.

If the size and load of the display panel D are large, the spring supporter 344 may rotate the spring shaft 341 in a direction in which the spring shaft 341 moves backward to the rear end of the spring shaft 341. Then, the coil spring 343 is compressed to increase the spring force, and the increased spring force can prevent the display panel D from drooping downward due to own weight thereof.

While only one type of display panel can be mounted on a conventional display supporting apparatus in which the spring force of the coil spring 343 cannot be adjusted, the display supporting apparatus according to the present disclosure capable of adjusting the spring force of the coil spring 343 has the advantage of being able to support display panels of various sizes.

For example, when the spring supporter 344 moves backward and the coil spring 343 is compressed more than the basic state, the restoring force to return to the basic state increases, and the spring force corresponding to the force required to compress the spring increases. Here, the basic state means a state where the arm unit 30 maintains a horizontal state.

Accordingly, when the display panel is lifted to a higher position than the horizontal state as illustrated in FIG. 30, the coil spring 343 extends, so the display panel can be lifted upward with relatively little force.

In addition, when the display panel D descends to a horizontal position, since frictional force acts between the upper surface of the spring pusher 342 and the upper surface of the inner cover 32, it is possible to prevent the display panel D from rapidly descending.

In addition, when the display panel d descends from the horizontal position to a lower power, little frictional force acts between the spring pusher 342 and the inner cover 32, and only the restoring force of the coil spring 343 acts.

In addition, since the coil spring 343 is a compression spring, even if the load of the display panel D acts downward, the restoring force of the coil spring 343 acts as resistance, and thus rapid descent of the display panel D may be prevented.

In addition, by increasing the amount of compression of the coil spring 343 in proportion to the load of the display panel D mounted on the display supporting apparatus 10, even if the display panel D having a heavy load is mounted, the present disclosure has the advantage of minimizing the rapid drop of the display panel D.

[Pillar Unit]

Figure 32:
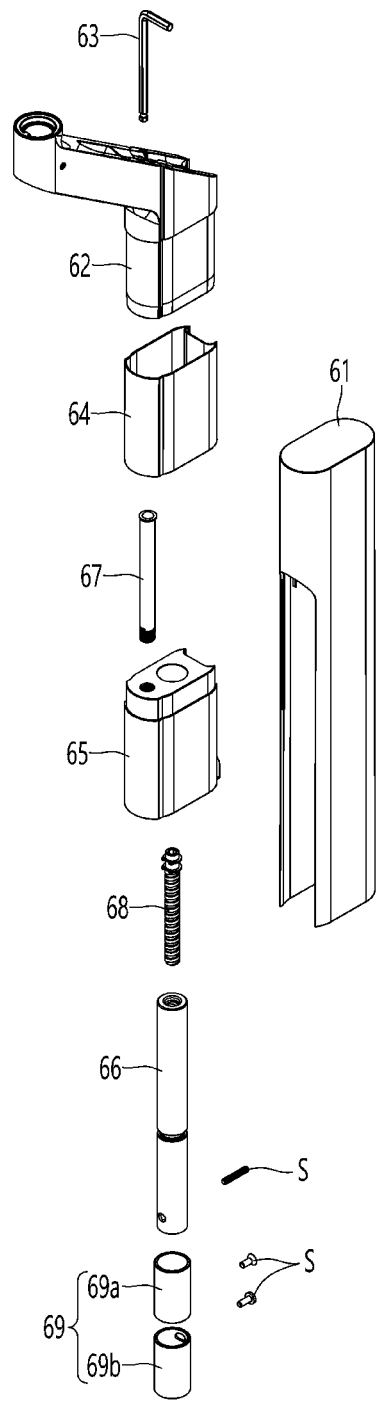
FIG. 32 is an exploded perspective view illustrating a pillar unit constituting a display supporting apparatus according to an embodiment of the present disclosure.
Figure 33:
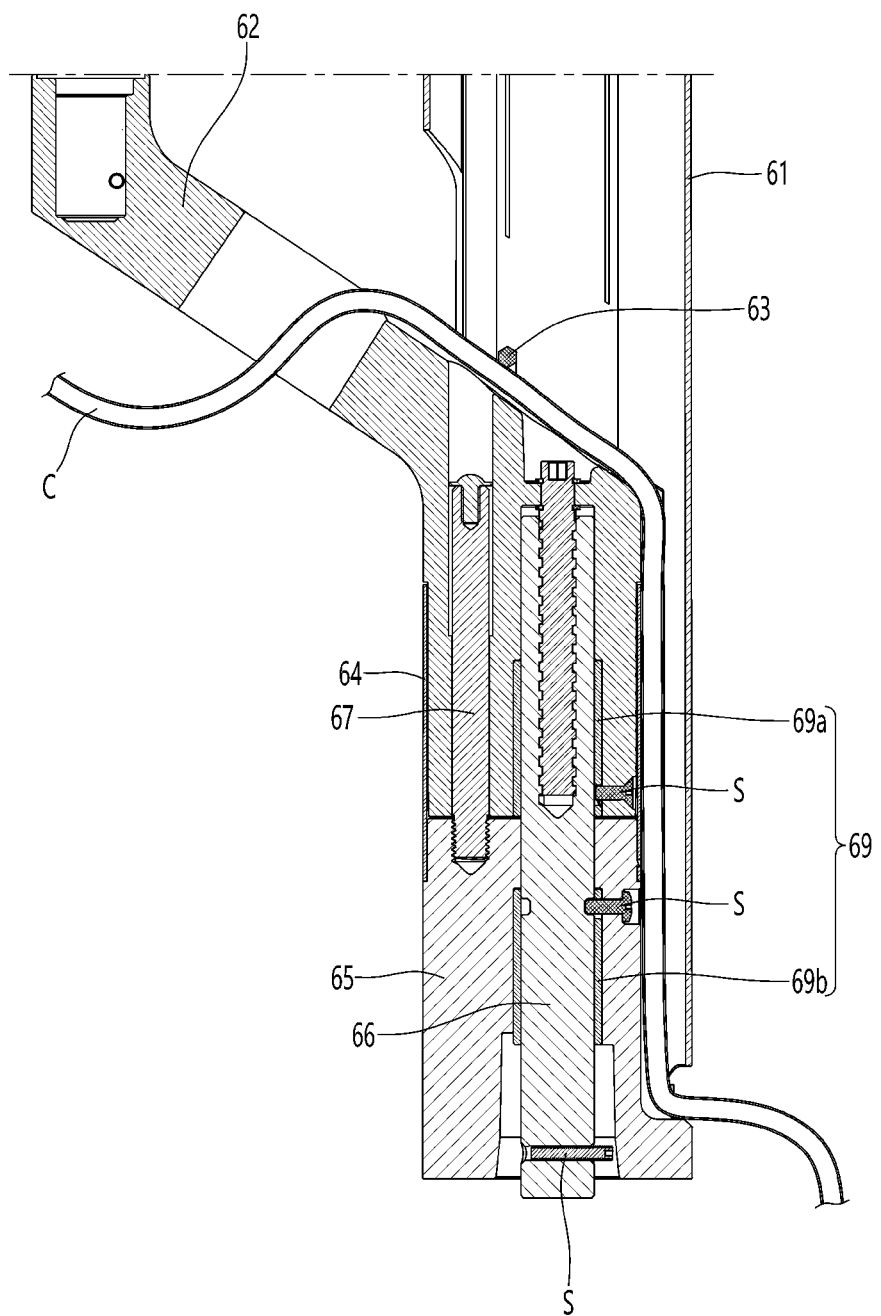
FIG. 33 is a longitudinal cross-sectional view illustrating the pillar unit taken along line 33-33 of FIG. 2.

FIG. 32 is an exploded perspective view illustrating a pillar unit constituting a display supporting apparatus according to an embodiment of the present disclosure, and FIG. 33 is a longitudinal cross-sectional view illustrating the pillar unit taken along line 33-33 of FIG. 2.

Referring to FIGS. 32 and 33, the pillar unit 60 constituting the display supporting apparatus 10 according to the embodiment of the present disclosure may include an upper pillar 62 and a lower pillar 65 supporting the upper pillar 62.

In detail, the pillar unit 60 may further include a center shaft 66. Approximately the lower half of the center shaft 66 is inserted into the lower pillar 65 and the upper half is inserted into the upper pillar 62.

The pillar unit 60 may further include a bushing 69 fitted to an outer circumferential surface of the center shaft 66. The bushing 69 includes an upper bushing 69a and a lower bushing 69b. The upper bushing 69a can move up and down along the outer circumferential surface of the center shaft 66 together with the upper pillar 62, and the lower bushing 69b is fixed at the center shaft 66 together with the lower pillar 65.

The upper bushing 69a is accommodated in a hole formed inside the upper pillar 62, and the lower bushing 69b is accommodated in a hole formed inside the lower pillar 65.

As illustrated in FIG. 33, the fastening member S including a screw is inserted only up to the upper pillar 62 and the upper bushing 69a, and only the upper pillar 62 and the upper bushing 69a are singularly coupled.

On the other hand, another fastening member S passes through the lower pillar 65 and the lower bushing 69b and is inserted into the center shaft 66, so that the center shaft 66, the lower bushing 69b, and the lower pillar 65 are singularly combined.

The pillar unit 60 may further include a height adjustment screw 68 inserted into an upper surface of the center shaft 66. The height adjustment screw 68 passes through the upper surface of the upper pillar 62 and is inserted into the center shaft 66. And, the height adjustment screw 68 is screwed to the center shaft 66, and the height adjustment screw 68 is inserted into the center shaft 66 according to the rotation direction of the height adjustment screw 68. or comes out to the outside of the center shaft 66.

The pillar unit 60 may further include an rotation prevention shaft 67 that vertically penetrates the upper pillar 62 and is inserted into the lower pillar 65. The rotation prevention shaft 67 couples the upper pillar 62 and the lower pillar 65, so that in a state where the upper pillar 62 is seated on the lower pillar 65, the rotation prevention shaft 67 is prevented from rotating in the left and right directions with the center shaft 66 as a central axis.

The pillar unit 60 may further include a pillar cover 64 covering a portion of the upper pillar 61 and the lower pillar 65.

The upper pillar 62 is singularly combined with the height adjustment screw 68 and ascends upward from the lower pillar 65 according to the rotation direction of the height adjustment screw 68, or may be descended toward the lower pillar 65. At this time, the pillar cover 64 serves to block external exposure by shielding the separation space between the upper pillar 62 and the lower pillar 65. In addition, when the upper pillar 62 ascends or descends, the pillar cover 64 serves to guide the upper pillar so that it does not shake.

The pillar unit 60 may further include a wrench 63 detachably mounted to the upper pillar 62. The wrench 63 is used not only to rotate the spring shaft 341 of the elastic adjustment body 34 or to rotate the height adjustment screw 68, but also as illustrated in FIG. 33, and functions to press the cable C extending along the upper surface of the upper filler 62.

The pillar unit 60 may further include a housing cover 61 covering a vertical portion of the upper pillar 62, the pillar cover 64, and the lower pillar 65 from top to bottom.

Figure 34:
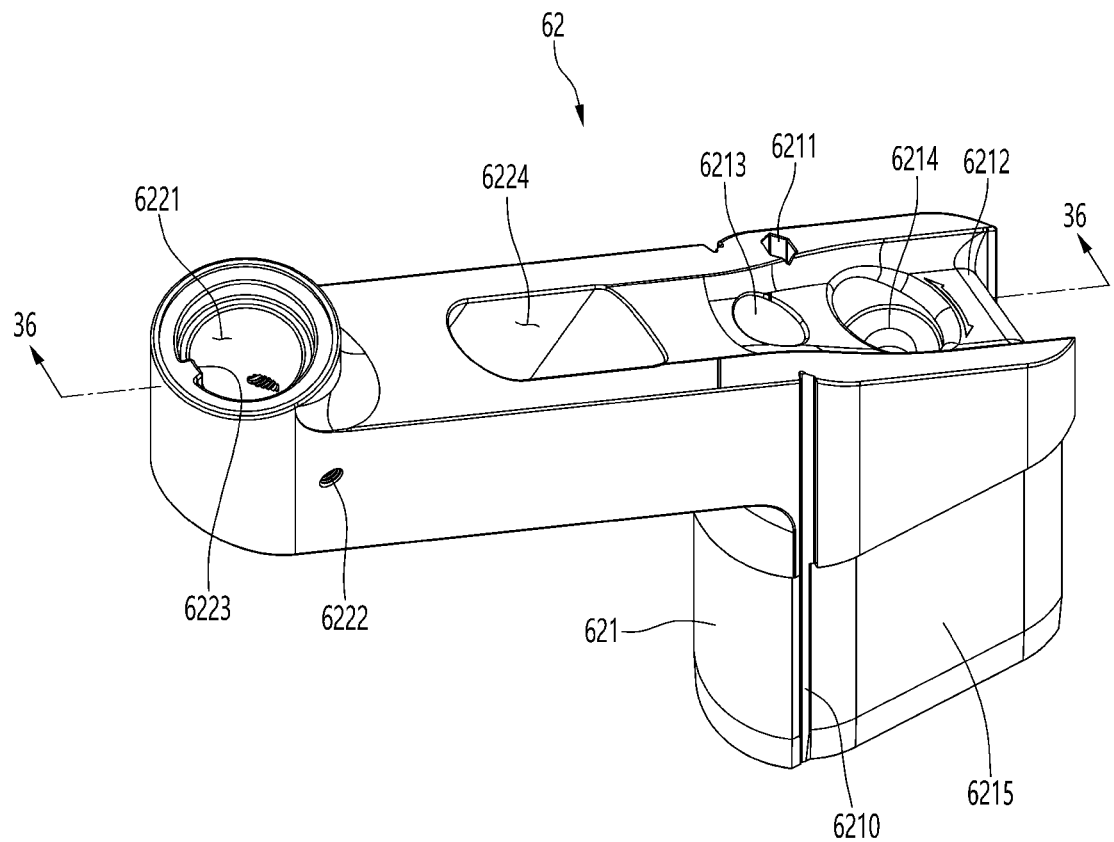
FIG. 34 is a front perspective view illustrating an upper pillar constituting a pillar unit according to an embodiment of the present disclosure.
Figure 35:
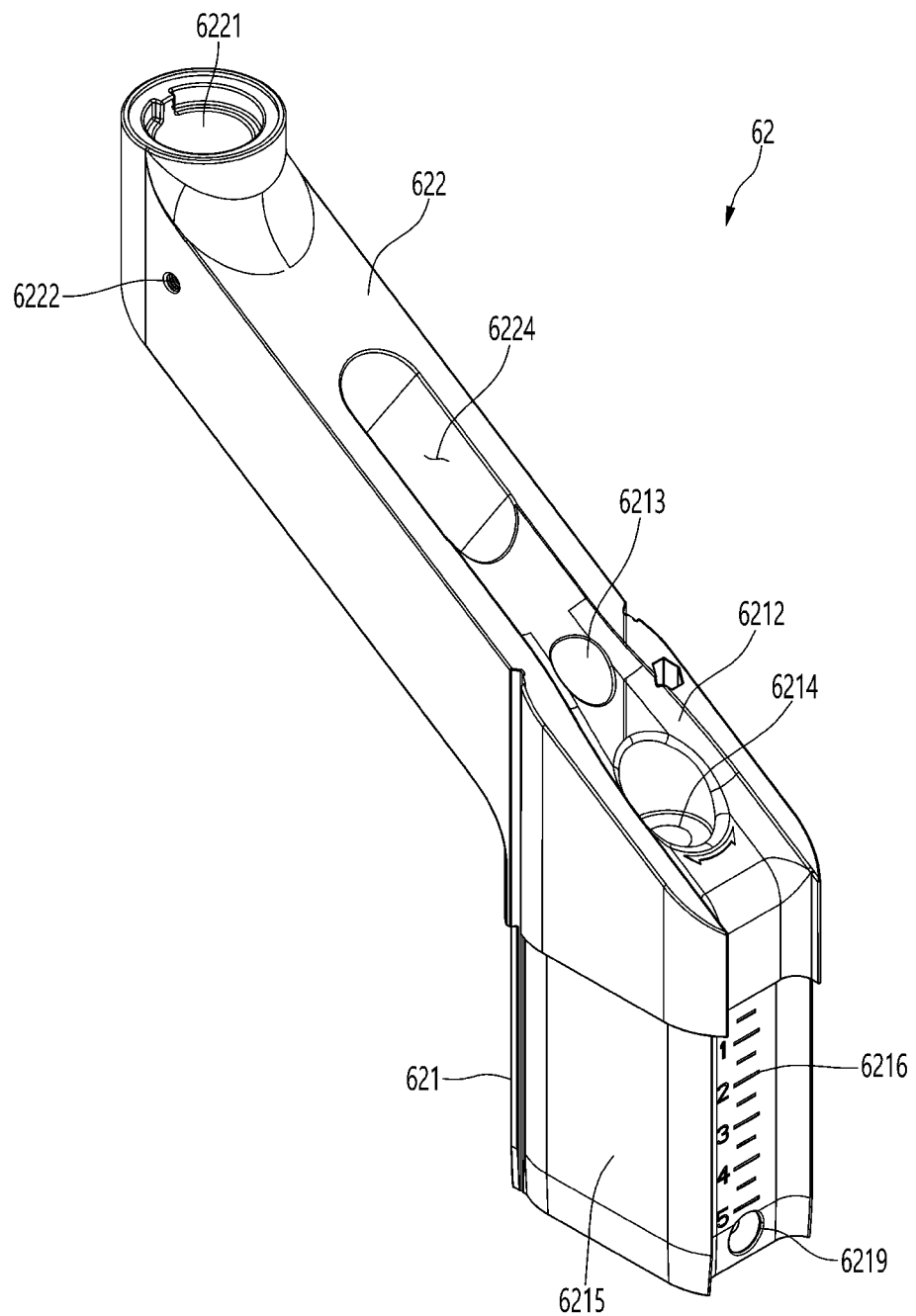
FIG. 35 is a rear perspective view illustrating the upper pillar.
Figure 36:
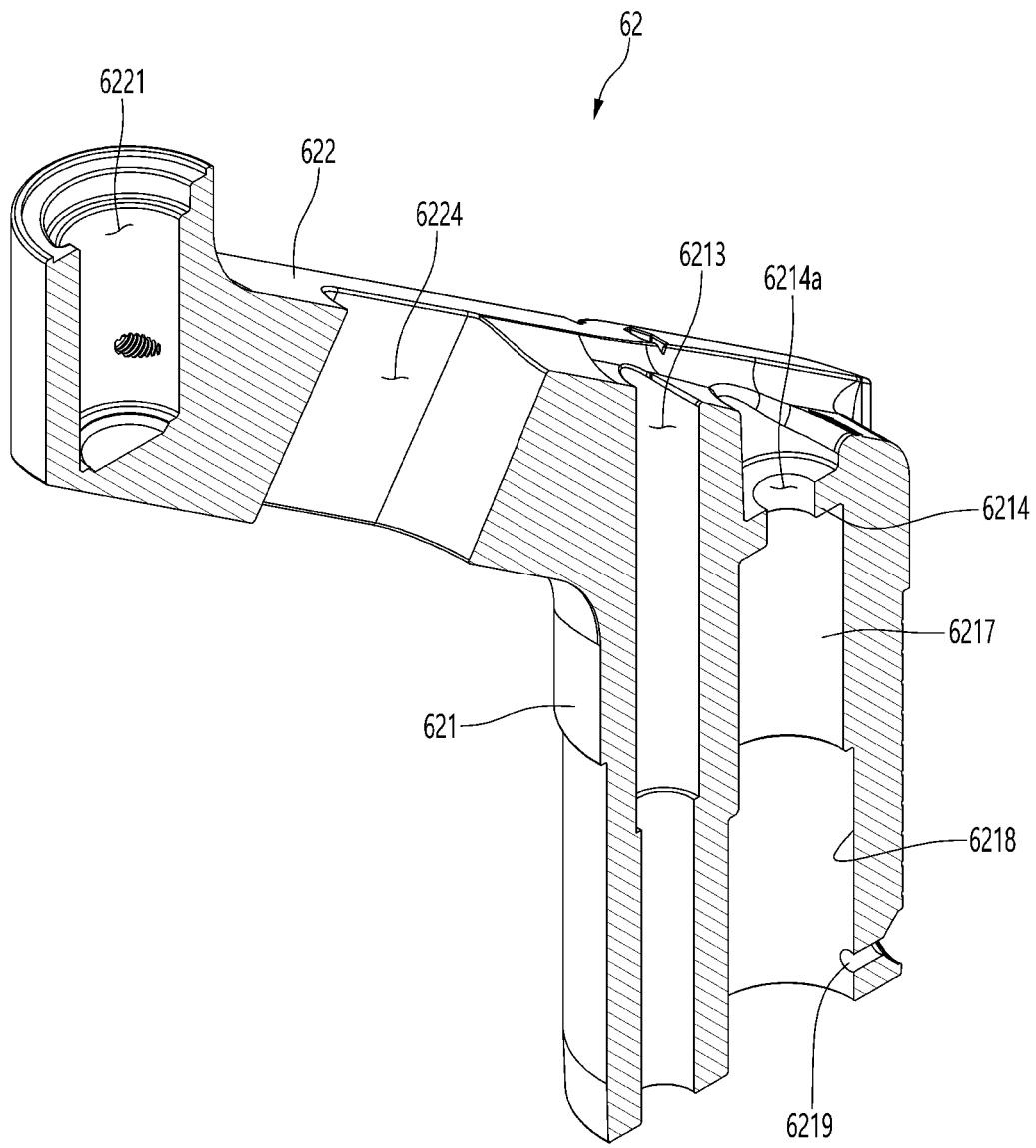
FIG. 36 is a longitudinal cross-sectional view illustrating the upper pillar taken along line 36-36 of FIG. 34.

FIG. 34 is a front perspective view illustrating an upper pillar constituting a pillar unit according to an embodiment of the present disclosure, FIG. 35 is a rear perspective view illustrating the upper pillar, and FIG. 36 is a longitudinal cross-sectional view illustrating the upper pillar taken along line 36-36 of FIG. 34.

Referring to FIGS. 34 to 36, the upper pillar 62 according to the embodiment of the present disclosure may include a vertical portion 621 and an extension portion 622 extending obliquely upward from the upper end of the vertical portion 621.

In detail, the extension portion 622 may extend upward at an interior angle smaller than 90 degrees from a horizontal plane passing through the upper end of the vertical portion 621. Here, a side edge of an upper end portion of the vertical portion 621 may be defined as a starting point of the extension portion 622. In addition, the upper surface of the vertical portion 621 may be inclined at an angle corresponding to the inclination angle of the extension portion 622.

The vertical portion 621 can be defined as consisting of a front surface that is convexly rounded with a predetermined curvature, a rear surface formed on the opposite side of the front surface and recessed to a predetermined depth, a pair of side surfaces connecting the front surface and the rear surface, and an inclined upper surface at a predetermined angle.

The rear surface of the vertical portion 621 is concavely recessed, so that a passage through which the cable C extending from the display panel D passes is formed between the rear portion and the rear surface of the housing cover 61.

An upper surface of the vertical portion 621 may also be concavely rounded downward to form a cable guide groove 6212 through which the cable C passes.

In addition, a height adjustment indicator 6216 may be displayed on the rear surface of the vertical portion 621 in the form of scales and/or numbers.

A pillar cover seating portion 6215 may be formed on a side surface of the vertical portion 621 to be stepped as much as the thickness of the pillar cover 64.

A guide groove 6210 is formed at a corner portion of the vertical portion 621 where the front and side surfaces meet to guide the sliding movement of the housing cover 61 in the up and down direction.

Inside the vertical portion, a shaft insertion hole 6213 into which the rotation prevention shaft 67 is inserted, a center shaft insertion groove 6217 into which the center shaft 66 is inserted, and a wrench accommodation groove 6211 into which the wrench 63 is inserted are formed.

The shaft insertion hole 6213 is formed with a length extending from the upper surface to the lower end of the vertical portion 621.

The center shaft insertion groove 6217 is formed at a point spaced apart from the shaft insertion hole 6213 to the rear side and extends a predetermined length upward from the lower end of the vertical portion 621.

An upper surface of the center shaft insertion groove 6217 is defined by a partition plate 6214, and a screw insertion hole 6214a is formed in the partition plate 6214. Accordingly, the upper pillar 62 may descend until the upper surface of the center shaft 66 touches the partition plate 6214. The height adjustment screw 68 is inserted into the center shaft 66 through the screw insertion hole 6214a.

Arrows and guide letters indicating the loosening direction or tightening direction of the screw may be displayed on the upper surface of the vertical portion 621 corresponding to the outer edge of the screw insertion hole 6214.

An upper bushing seating surface 6218 may be formed to be stepped on an inner circumferential surface of the center shaft insertion groove 6217. The upper bushing seating surface 6218 may extend upward from the lower end of the vertical portion 621 by the length of the upper bushing 69a.

In addition, a fastening hole 6219 is formed horizontally at a point spaced upward from the lower end of the vertical portion 621, and the fastening hole 6219 extends from the outer circumferential surface of the vertical portion 621 to the upper bushing seating surface 6218. Accordingly, the fastening member S passing through the fastening hole 6219 is inserted into the upper bushing 69a.

The shaft insertion hole 6213 may be formed with a length extending from the upper surface to the lower end of the vertical portion 621. When the rotation prevention shaft 67 is inserted into the shaft insertion hole 6213, a portion of the lower end of the rotation prevention shaft 67 protrudes further from the lower end portion of the vertical portion 621 and is inserted into the upper surface of the lower pillar 65.

Meanwhile, a cable through-hole 6224 may be formed in the extension portion 622. As illustrated, the cable through-hole 6224 passes through the extension portion 622, wherein the cable through-hole may be formed to be inclined backward from the lower surface of the extension portion 622 to the upper surface. According to this structure, the cable extending from the display panel D may extend along the cable guide groove 6212 of the vertical portion 621 and the rear surface of the vertical portion 621 while a bending phenomenon of the cable is minimized.

A swivel shaft insertion hole 6221 is formed at the front end of the extension portion 622.

The swivel shaft insertion hole 6221 may be recessed to a predetermined depth from the upper surface to the lower side of the extension portion 622. A portion where the swivel shaft insertion hole 6221 is formed may further protrude upward by a predetermined length from the upper surface of the extension portion 622.

The link coupler 51 constituting the neck unit 50 is inserted into the swivel shaft insertion hole 6221.

A rotation limiting protrusion 6223 protrudes from the inner circumferential surface of the swivel shaft insertion hole 6221.

Referring to FIG. 28 together, when the link coupler 51 is seated on the edge of the upper surface of the swivel shaft insertion hole 6221, the limiting protrusion 5112 protruding from the lower end of the link coupler 51 interferes with the rotation limiting protrusion 6223.

In other words, the link coupler 51 may rotate in the clockwise direction or in the counterclockwise direction about a vertical axis until the limiting protrusion 5112 is caught on the rotation limiting protrusion 6223.

In addition, a bushing pin insertion hole 6222 into which a swivel bushing pin 55 (see FIG. 29) is inserted is formed on the side of the extension portion 622. The swivel bushing pin 55 passes through the bushing pin insertion hole 6222 and is inserted into the pin insertion hole 541 of the swivel bushing 54. In addition, a portion of the swivel bushing pin 55 is caught in the bushing pin catching groove 523 formed in the swivel shaft 52.

Figure 37:
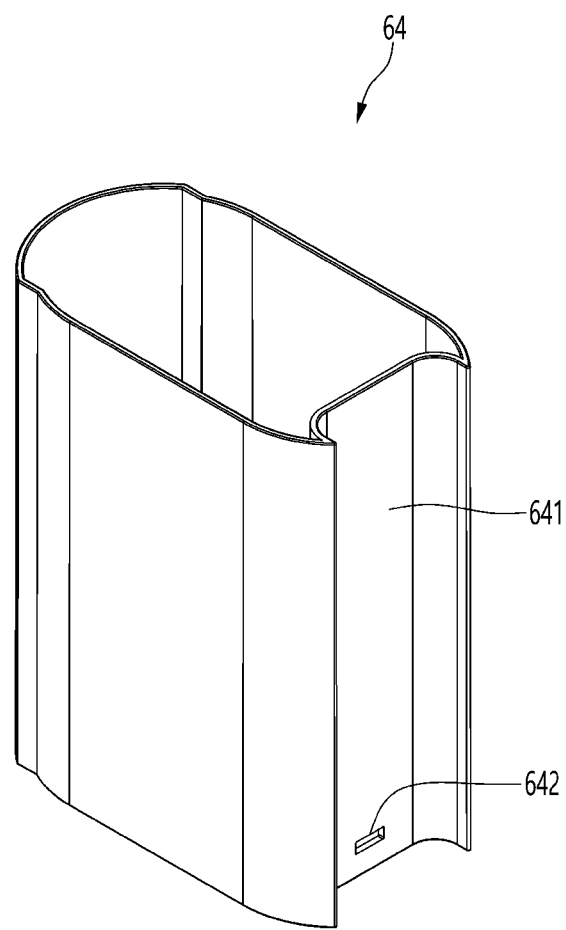
FIG. 37 is a rear perspective view illustrating a pillar cover constituting a pillar unit according to an embodiment of the present disclosure.

FIG. 37 is a rear perspective view illustrating a pillar cover constituting a pillar unit according to an embodiment of the present disclosure.

Referring to FIG. 37, the pillar cover 64 according to the embodiment of the present disclosure may be formed in the shape of a rectangular cylinder with an empty inside.

In detail, the pillar cover 64 surrounds the vertical portion 621 of the upper pillar 62 and the upper portion of the lower pillar 65, so that a separation space formed between the lower end portion of the upper pillar 62 and the upper end portion of the lower pillar 65 is shielded.

The front surface of the pillar cover 64 may be convexly rounded with a predetermined curvature, and the cable guide surface 641 may be recessed on the rear surface thereof.

A catching hole 642 may be formed at a point spaced upward from a lower end portion of the rear surface of the pillar cover 64.

Figure 38:
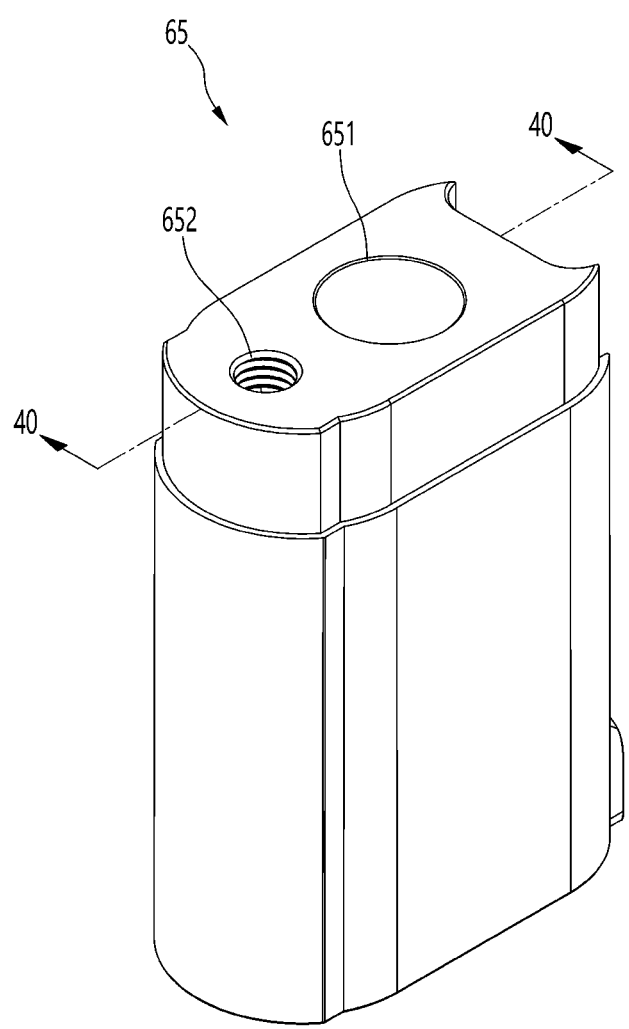
FIG. 38 is a front perspective view illustrating a lower pillar constituting a pillar unit according to an embodiment of the present disclosure.
Figure 39:
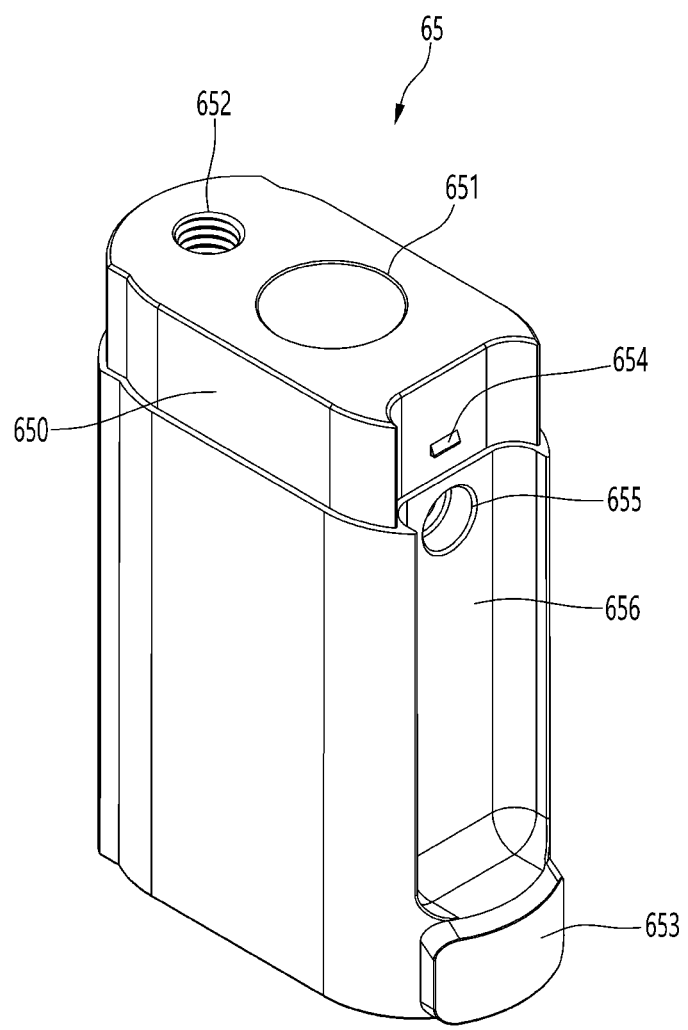
FIG. 39 is a rear perspective view illustrating the lower pillar.
Figure 40:
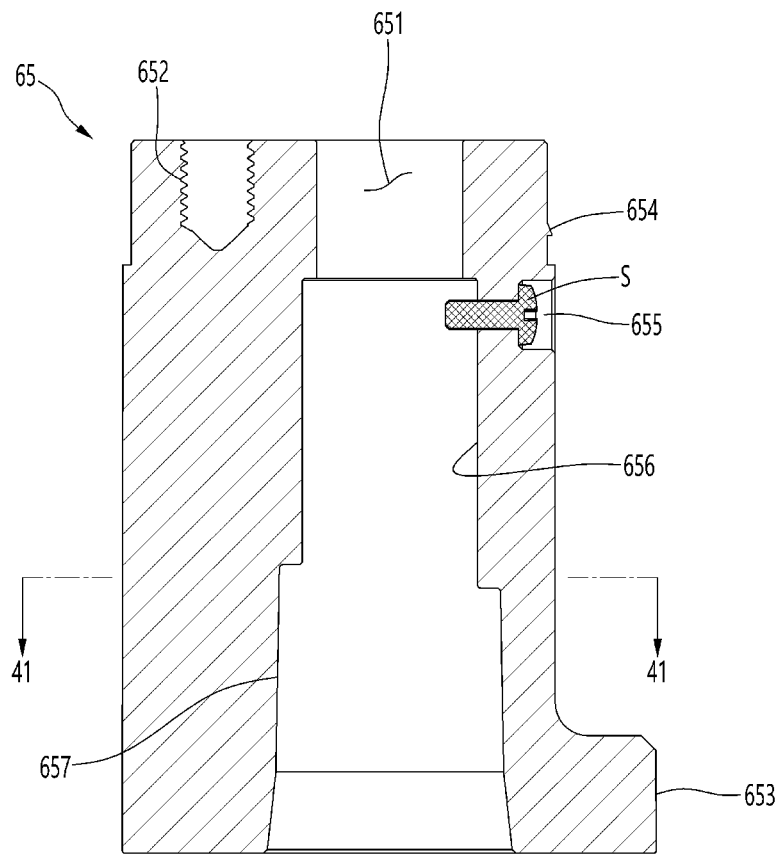
FIG. 40 is a longitudinal cross-sectional view illustrating the lower pillar taken along line in FIG. 38.
Figure 41:
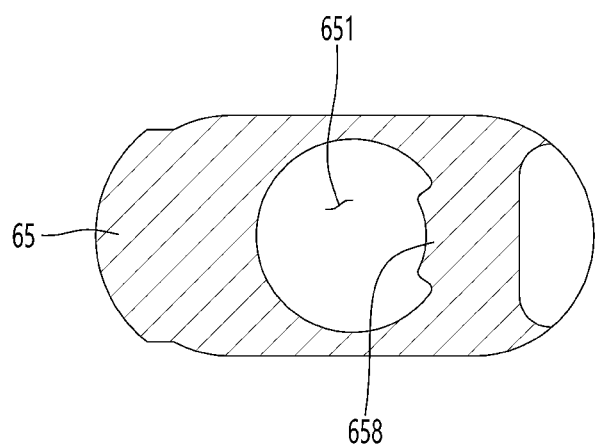
FIG. 41 is a cross-sectional view illustrating the lower pillar taken along line 41-41 in FIG. 40.

FIG. 38 is a front perspective view illustrating a lower pillar constituting a pillar unit according to an embodiment of the present disclosure, FIG. 39 is a rear perspective view illustrating the lower pillar, FIG. 40 is a longitudinal cross-sectional view illustrating the lower pillar taken along line 40-40 in FIG. 38, and FIG. 41 is a cross-sectional view illustrating the lower pillar taken along line 41-41 in FIG. 40.

Referring to FIGS. 38 to 41, the front surface of the lower pillar 65 according to the embodiment of the present disclosure may be convexly rounded with a predetermined curvature, and the cable guide groove 656 may be recessed to a predetermined depth on the rear surface.

A protrusion portion 653 protrudes from a lower end of the rear surface of the lower pillar 65, and the cable guide surface 656 may extend from an upper surface of the lower pillar 65 to an upper surface of the protrusion portion 653.

A center shaft insertion hole 651 and a shaft insertion groove 652 may be formed inside the lower pillar 65.

The center shaft insertion hole 651 is formed to a length from the upper surface to the lower surface of the lower pillar 65 and passes through the lower pillar 65.

The shaft insertion groove 652 is recessed to a predetermined depth at a point spaced forward from the center shaft insertion hole 651, and a screw thread may be formed on an inner circumferential surface thereof. In addition, an end portion of the rotation prevention shaft 67 inserted into the upper pillar 62 is screwed into the shaft insertion groove 652.

A pillar cover seating surface 650 may be formed to be stepped on an outer circumferential surface of the lower pillar 65 to a depth corresponding to the thickness of the pillar cover 64.

The pillar cover seating surface 650 has a predetermined width at the upper end of the lower pillar 65 and is surrounded by an outer circumferential surface of the lower pillar 65. The lower portion of the pillar cover 64 is fitted to the pillar cover seating surface 650.

A catching protrusion 654 protrudes from the rear surface of the lower pillar 65, and the catching protrusion 654 is inserted into the locking hole 642 of the pillar cover 64.

A fastening hole 655 is formed on the rear surface of the lower pillar 65 corresponding to a point spaced downward from the catching protrusion 654 toward the center of the lower pillar 65.

A lower bushing seating surface 659 stepped at a predetermined depth in the radial direction from the inner circumferential surface of the center shaft insertion hole 651 and extended to a length corresponding to the length of the lower bushing 69b is formed inside the lower pillar 65. The fastening hole 655 is formed through the lower bushing seating surface 659.

In addition, a support boss seating surface 657 is formed from the lower end of the lower bushing seating surface 659 to a predetermined depth in the radial direction and extends to the lower end portion of the lower pillar 65.

The support boss seating surface 657 has the same shape as the outer shape of the support boss 713 (see FIG. 49) of the clamp body 71 to be described later.

In addition, a rotation limiting protrusion 658 protrudes from a lower end of the lower bushing seating surface 659 to limit rotation amount of the pillar unit 60 about a vertical axis. The operation of the rotation limiting protrusion 658 will be described again together with the contents of the clamp unit 70.

Figure 42:
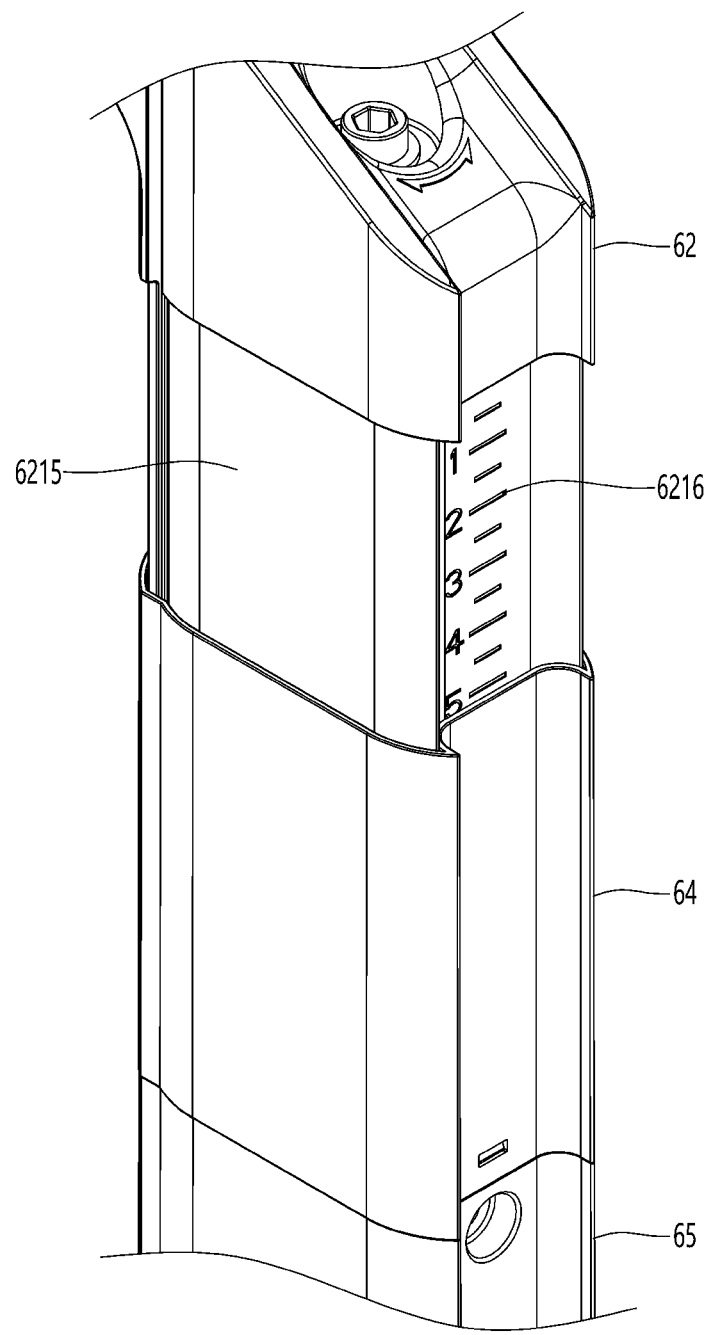
FIG. 42 is a partially enlarged perspective view of the pillar unit illustrating a state of adjusting the height of the upper pillar.

FIG. 42 is a partially enlarged perspective view of the pillar unit illustrating a state of adjusting the height of the upper pillar.

Referring to FIG. 42, as described above, as the height adjustment screw 68 is rotated in one direction, the upper pillar 62 ascends or descends along with the height adjustment screw 68, and the height of the display panel D is adjustable.

As the upper pillar 62 ascends, the height adjustment indicator 6216 covered by the pillar cover 64 is exposed to the outside. In addition, the housing cover 61 may be mounted in a state where the upper pillar 62 ascends to a desired height, so that the height adjustment indicator 6216 may be shielded.

Figure 43:
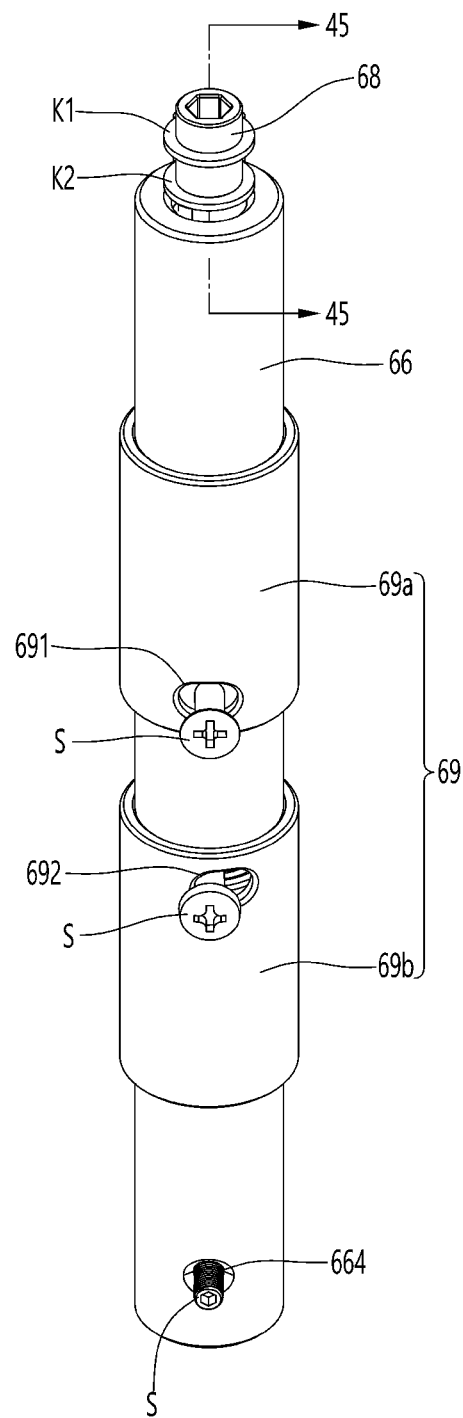
FIG. 43 is a perspective view illustrating a height adjustment module constituting a pillar unit according to an embodiment of the present disclosure.
Figure 44:
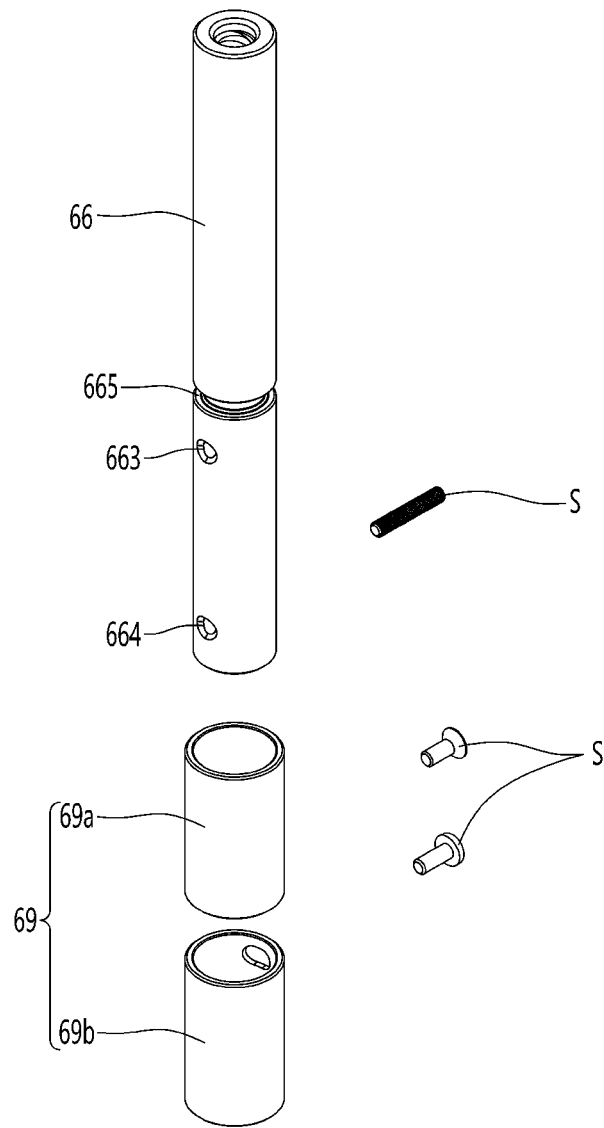
FIG. 44 is an exploded perspective view illustrating the height adjustment module.
Figure 45:
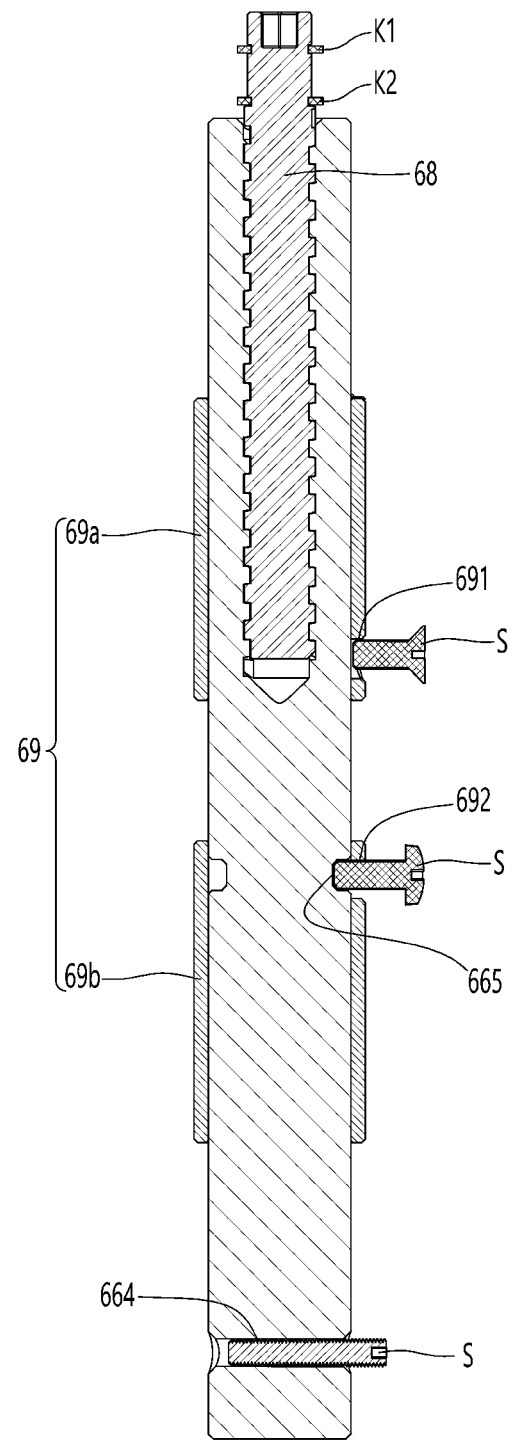
FIG. 45 is a longitudinal cross-sectional view illustrating the height adjustment module taken along line 45-45 of FIG. 43.

FIG. 43 is a perspective view illustrating a height adjustment module constituting a pillar unit according to an embodiment of the present disclosure, FIG. 44 is an exploded perspective view illustrating the height adjustment module, and FIG. 45 is a longitudinal cross-sectional view illustrating the height adjustment module taken along line 45-45 of FIG. 43.

Referring to FIGS. 43 to 45, the height adjustment module constituting the pillar unit 60 according to the embodiment of the present disclosure may include a center shaft 66, a bushing 69 fitted to the outer circumferential surface of the center shaft 66, and a height adjustment screw 68 inserted downward from the upper surface of the center shaft 66.

An upper bracket K1 and a lower bracket K2 may be mounted on the outer circumferential surface of the height adjustment screw 68.

The upper bracket K1 is placed on the upper surface of the partition plate 6214 (see FIG. 36) of the upper pillar 62, and the lower bracket K2 is located on the lower surface of the partition plate 6214, and thus the height adjustment screw 68 is configured to be rotatable only in a state of being connected to the upper pillar 62. Instead, when the height adjustment screw 68 rotates, the height adjustment screw 68 and the upper pillar 62 singularly ascend or descend.

In summary, the upper bracket K1 and the lower bracket K2 can be understood as a configuration according to an embodiment provided to allow the height adjustment screw 68 to singularly ascend or descend with the upper pillar 62.

At a point spaced upward from the lower end of the center shaft 66, a rotation guide groove 665 is surrounded in the circumferential direction of the center shaft 66. Further, the fastening hole 692 formed in the lower bushing 69b is aligned with the rotation guide groove 665. In addition, the fastening member S inserted into the fastening hole 655 formed on the rear surface of the lower pillar 65 passes through the fastening hole 692 of the lower bushing 69b, and then is inserted into the rotation guide groove 665.

According to this configuration, when an external force in the horizontal direction is applied to the upper pillar 62, the upper pillar 62, the lower pillar 65, the upper bushing 69a, and the lower bushing 69b rotates about the center shaft 66.

In addition, a fastening hole 664 is formed at a point spaced upward from the lower end of the center shaft 66, and the fastening boss passing through the support boss 713 (see FIG. 49) of the clamp body 71 is inserted into the fastening hole 664. Therefore, the center shaft 66 is fixed to the clamp body 71 and does not rotate.

In addition, while the upper bushing 69*a* is fitted to the center shaft 66, it ascends or descends together with the upper pillar 62 without being constrained by the center shaft 66.

In detail, the fastening member S passing through the fastening hole 6219 formed on the rear surface of the upper pillar 62 is inserted into the fastening hole 691 formed at the lower end of the upper bushing 69*a*, and thus the upper bushing 69*a* is singularly combined with the upper pillar 62.

Accordingly, when the upper pillar 62 ascends or descends by rotating the height adjustment screw 68, the upper bushing 69*a* is also moved up or down along the center shaft 66.

Figure 46:
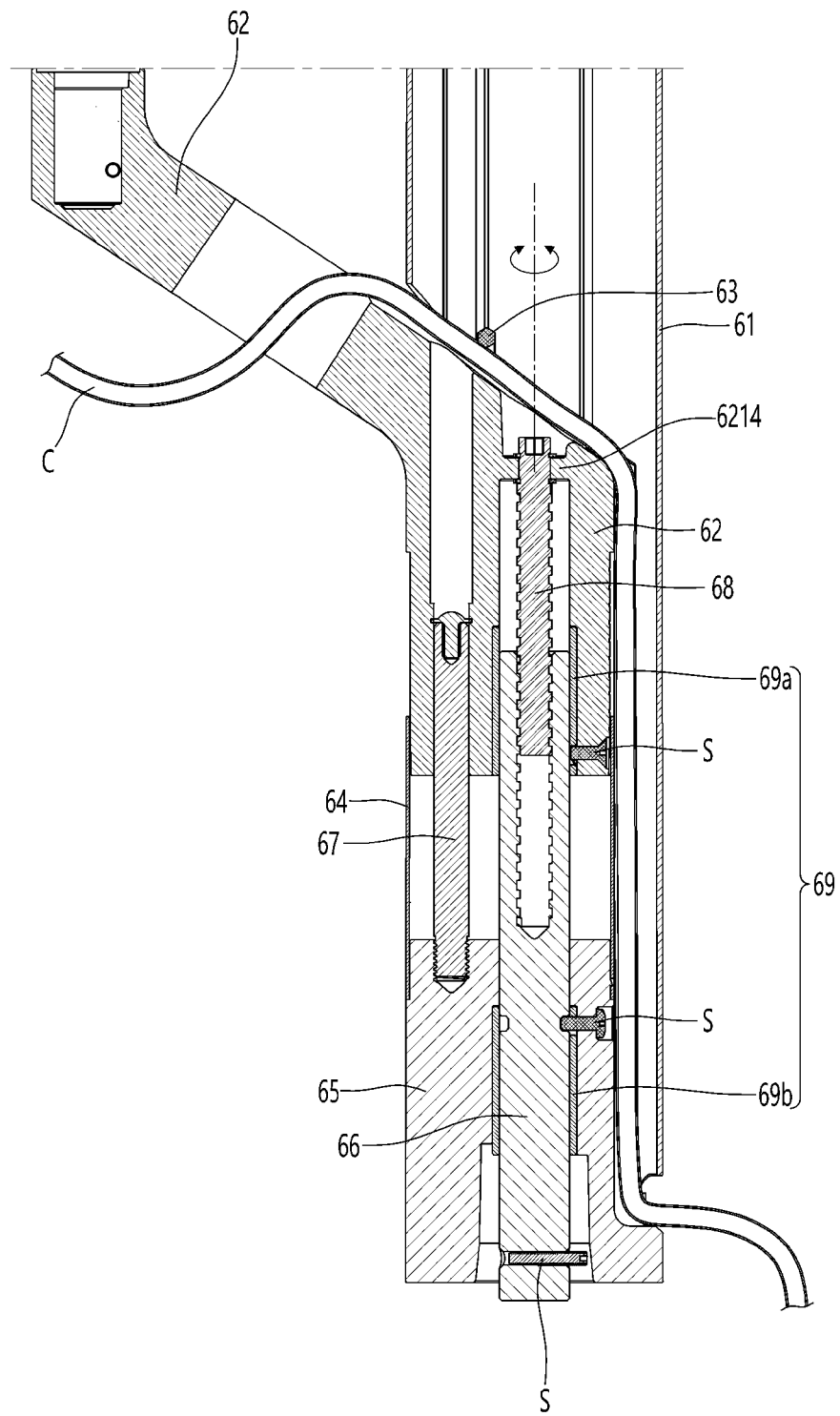
FIG. 46 is a longitudinal cross-sectional view of the pillar unit illustrating a state of adjusting the height of the upper pillar.

FIG. 46 is a longitudinal cross-sectional view of the pillar unit illustrating a state of adjusting the height of the upper pillar.

Referring to FIG. 46, in order for the user to adjust the height of the display panel D, the wrench 73 is fitted to the head of the height adjustment screw 68 to rotate the height adjustment screw 68 in one direction.

Then, while the upper pillar 62 ascends or descends together with the height adjustment screw 68, the lower end of the upper pillar 62 moves away from the upper end of the lower pillar or gets closer to the upper end of the lower pillar 65.

At this time, the upper bushing 69*a* ascends or descends along the center shaft 66 together with the upper pillar 62. On the other hand, the lower pillar 65 and the lower bushing 69*b* remain state of being fixed to the center shaft 66.

Meanwhile, since threads are formed only on the outer circumferential surface of the lower end portion of the rotation prevention shaft 67 and no threads are formed on the other outer circumferential surfaces, when the upper pillar 62 ascends or descends, the rotation prevention shaft 67 remains a state of being fixed to the upper surface of the lower pillar 65.

Figure 47:
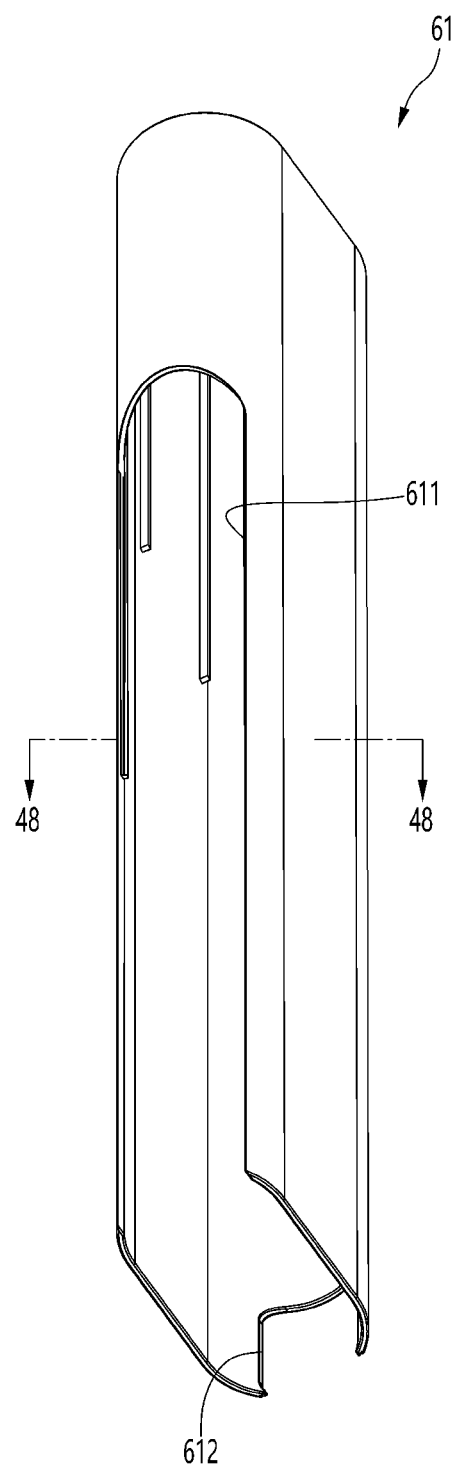
FIG. 47 is a perspective view illustrating a housing cover constituting a pillar unit according to an embodiment of the present disclosure.
Figure 48:
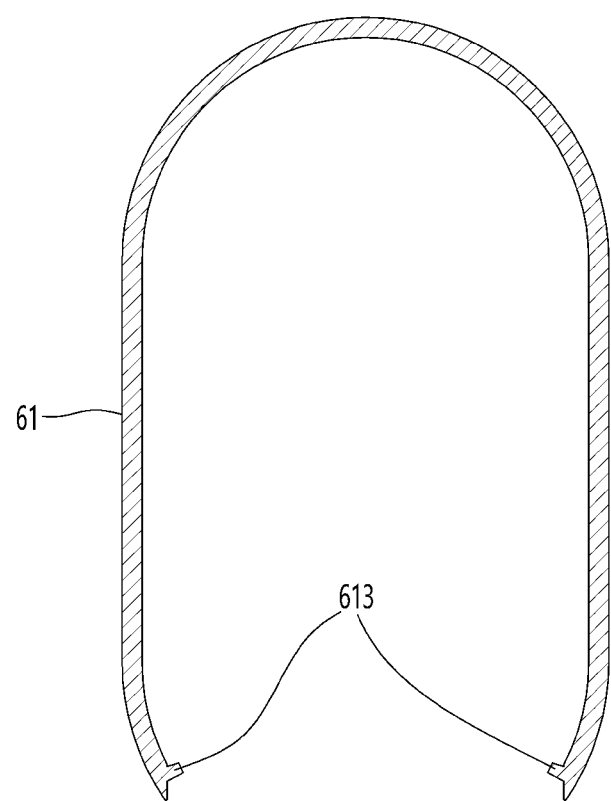
FIG. 48 is a cross-sectional view illustrating the housing cover taken along line 48-48 of FIG. 47.

FIG. 47 is a perspective view illustrating a housing cover constituting a pillar unit according to an embodiment of the present disclosure, and FIG. 48 is a cross-sectional view illustrating the housing cover taken along line 48-48 of FIG. 47.

Referring to FIGS. 47 and 48, the housing cover 61 according to the present disclosure performs a function of covering the vertical portion 621 of the upper pillar 61, the pillar cover 64, and the lower pillar 65 to block external exposure thereof.

In detail, a cutout 611 is formed on the front surface of the housing cover 61 so that the upper pillar 62 does not interfere with the front surface of the housing cover 61 when the upper pillar 62 ascends.

An avoidance groove 612 is formed at the lower end of the rear surface of the housing cover 61, and the protrusion portion 653 protruding from the lower end of the rear surface of the lower pillar 65 is fitted to the avoidance groove 612. Due to the coupling of the protrusion portion 653 and the avoidance groove 612, the housing cover 61 singularly rotates with the lower pillar 65.

Guide ribs 613 may protrude from both edges of the cutout 611. The guide rib 613 may extend from an upper end to a lower end of the cutout 611.

When the housing cover 61 is fitted to the outer circumferential surface of the upper pillar 62, the guide rib 613 is fitted to the guide groove 6210 formed in the vertical portion 621 of the upper pillar 62. Guide grooves 6210 may also be formed at front ends of side surfaces of the pillar cover 64 and the lower pillar 65.

With this structure, the housing cover 61 can be mounted by sliding down along the outer circumferential surfaces of the upper pillar 62 and the lower pillar 65 without shaking and can be separated by sliding up.

[Clamp Unit]

Figure 49:
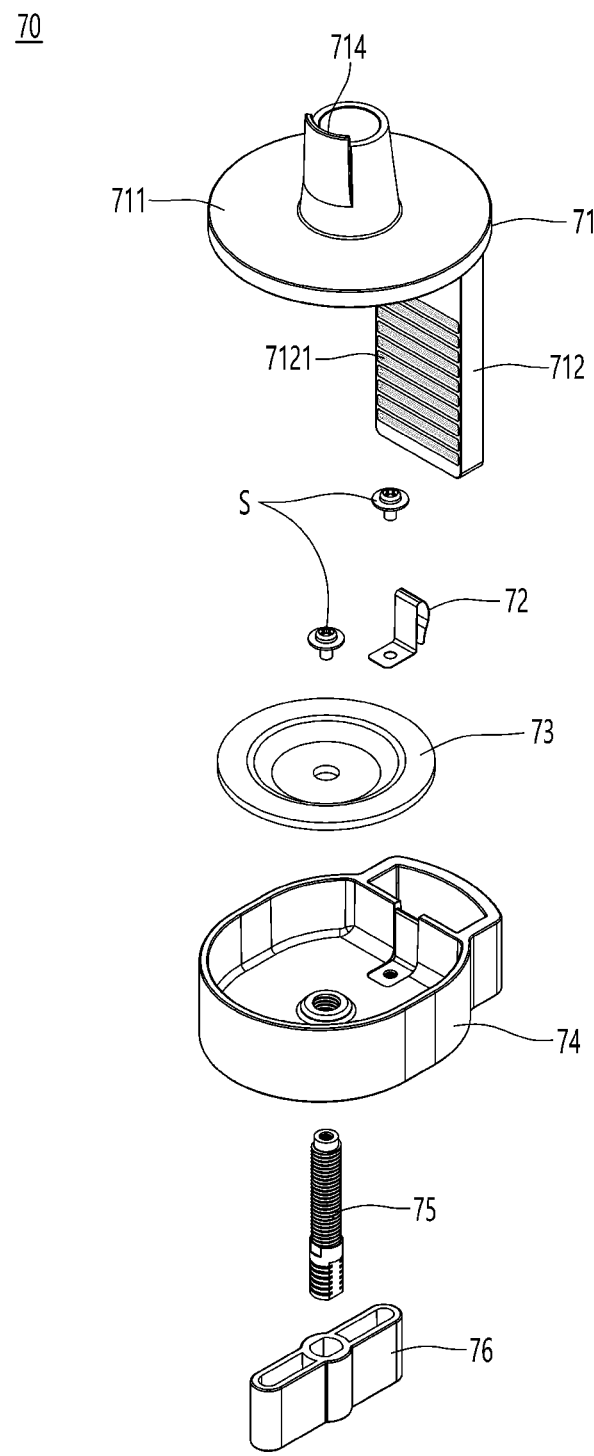
FIG. 49 is an exploded perspective view illustrating a clamp unit constituting a display supporting apparatus according to an embodiment of the present disclosure.
Figure 50:
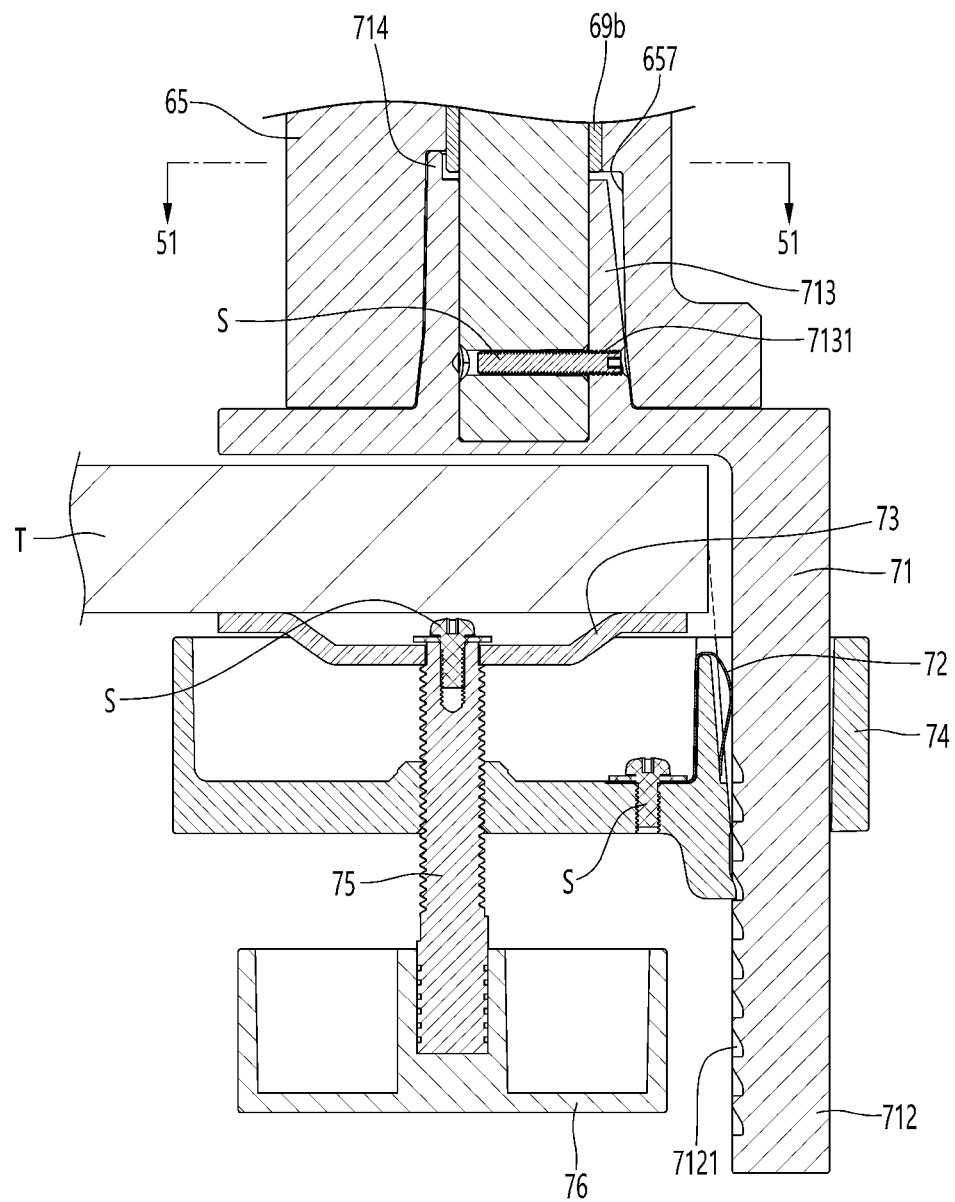
FIG. 50 is a coupled cross-sectional view illustrating the clamp unit taken along line 50-50 in FIG. 1.
Figure 51:
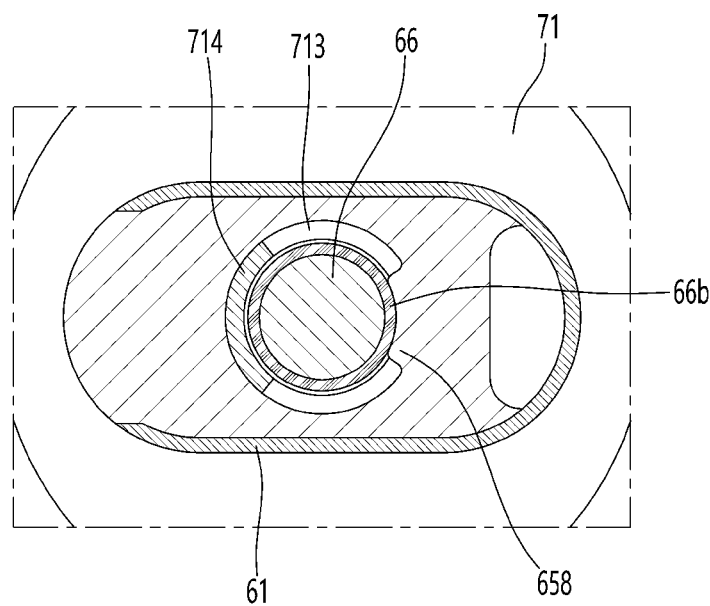
FIG. 51 is a cross-sectional view illustrating the display supporting apparatus taken along line 51-51 of FIG. 50.

FIG. 49 is an exploded perspective view illustrating a clamp unit constituting a display supporting apparatus according to an embodiment of the present disclosure, FIG. 50 is a coupled cross-sectional view illustrating the clamp unit taken along line 50-50 in FIG. 1, and FIG. 51 is a cross-sectional view illustrating the display supporting apparatus taken along line 51-51 of FIG. 50.

Referring to FIGS. 49 to 51, the clamp unit 70 constituting the display supporting apparatus 10 according to the embodiment of the present disclosure may include a clamp body 71 placed on the upper edge of the table T, a clamp cover 74 fitted to the clamp body 71 at the lower side of table T, a fixing screw 75 passing through the bottom of the clamp cover 74, a pressure plate 73 coupled to the upper end of the fixing screw 75 by the fastening member S, a gripping portion 76 coupled to the lower outer circumferential surface of the fixing screw 75, and a pressure spring 72 fixed to the side of the clamp cover 74 by the fastening member S.

In detail, the clamp body 71 may include a base plate 711 seated on the upper surface of the table T, a support boss 713 extending upward from the center of the upper surface of the base plate 711, and an extension end 712 extending downward from the bottom edge of the base plate 711.

The support boss 713 may be formed in the shape of a truncated cone whose diameter decreases toward the upper side. A rotation limiting protrusion 714 may protrude from an upper end of the support boss 713.

The support boss 713 is fitted to the support boss seating surface 657 formed inside the lower pillar 65. The inner space formed by the support boss seating surface 657 may be understood as a support boss accommodation portion for accommodating the support boss 713. In other words, it may be understood that the support boss 713 is inserted into the support boss accommodation portion that is recessed upward from the lower end of the lower pillar 65.

A fastening hole 7131 is formed in the support boss 713, and the fastening member S inserted into the fastening hole 7131 is inserted into a fastening hole 664 (see FIG. 43) formed at the lower end of the center shaft 66, so that the support boss 713 and the center shaft 66 are singularly coupled.

As illustrated in FIG. 51, a rotation limiting protrusion 658 protrudes from an inner circumferential surface of the lower pillar 65 corresponding to an upper end of the support boss seating surface 657. When the lower pillar 65 rotates about the support boss 713, the rotation limiting protrusion 658 interferes with the rotation limiting protrusion 714 of the support boss 713, and thus rotation of the lower pillar 65 is limited.

In other words, the pillar unit 60 can rotate from a point where the rotation limiting protrusion 658 contacts one side surface of the rotation limiting protrusion 714 to a point where it contacts the other side surface of the rotation limiting protrusion 714.

One of the rotation limiting protrusion 714 and the rotation limiting protrusion 658 may be defined as a first rotation limiting protrusion, and the other may be defined as a second rotation limiting protrusion.

Meanwhile, on the inner surface of the extension end 712, a plurality of catching grooves 7121 are continuously disposed in the vertical direction. The function of the plurality of catching grooves 7121 will be described below along with the description of the clamp cover 74.

In addition, when the gripping portion 76 connected to the lower end of the fixing screw is rotated, while the fixing screw 75 ascends from the bottom of the clamp cover 74 the pressure plate 73 is in close contact with the bottom surface of the table T. When the pressure plate 73 is in close contact with the bottom surface of the table T, the clamp unit 7 stably supports the pillar unit 60.

Figure 52:
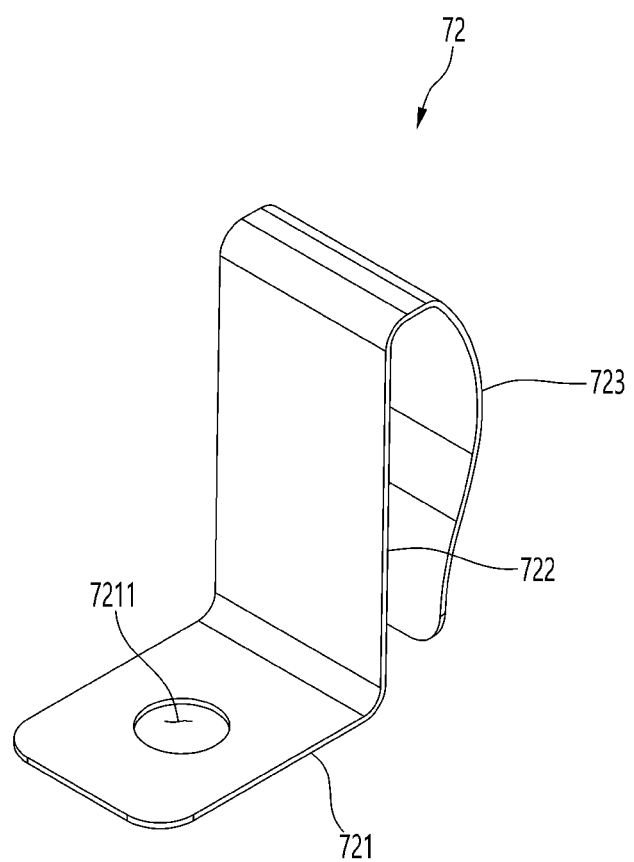
FIG. 52 is a perspective view illustrating a pressure spring constituting a clamp unit according to an embodiment of the present disclosure.

FIG. 52 is a perspective view illustrating a pressure spring constituting a clamp unit according to an embodiment of the present disclosure.

Referring to FIG. 52, the pressure spring 72 include a horizontal portion 721, a vertical portion 722 extending upward from one end portion of the horizontal portion 721, and a bent portion 723 that is bent in an upper end of the vertical portion 722 and extends downward.

The horizontal portion 721 is in close contact with the inner bottom of the clamp cover 74, and the vertical portion 722 is in close contact with the inner side surface of the clamp cover 74.

A fastening hole 7211 is formed in the horizontal portion 721, and the fastening member S passes through the fastening hole 7211 and is inserted into the bottom of the clamp cover 74.

The bent portion 723 is convexly rounded in a direction away from the vertical portion 722 as it goes downward, and may generate elastic force.

The pressure spring 72 may be made of a metal material having a predetermined modulus of elasticity.

Figure 53:
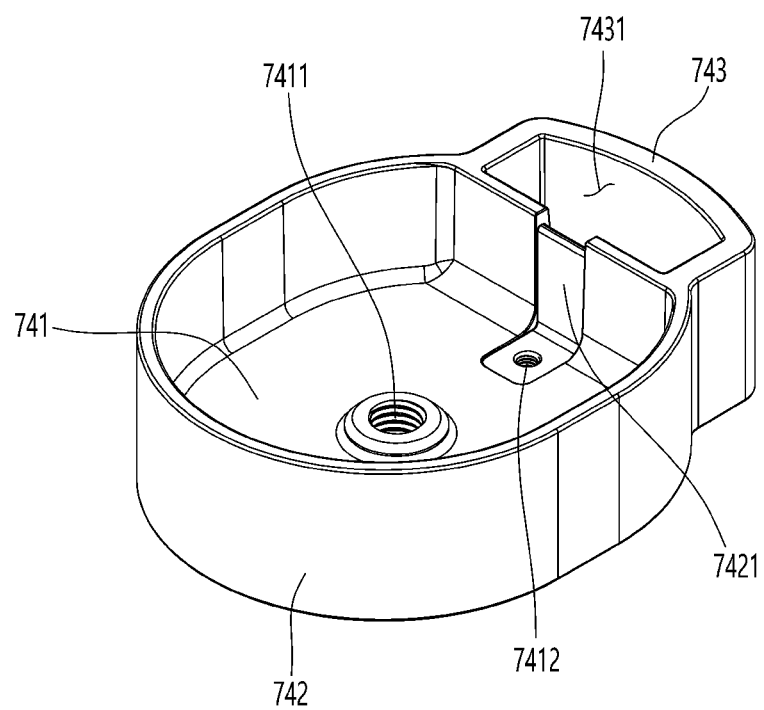
FIG. 53 is a front perspective view illustrating a clamp cover constituting a clamp unit according to an embodiment of the present disclosure.
Figure 54:
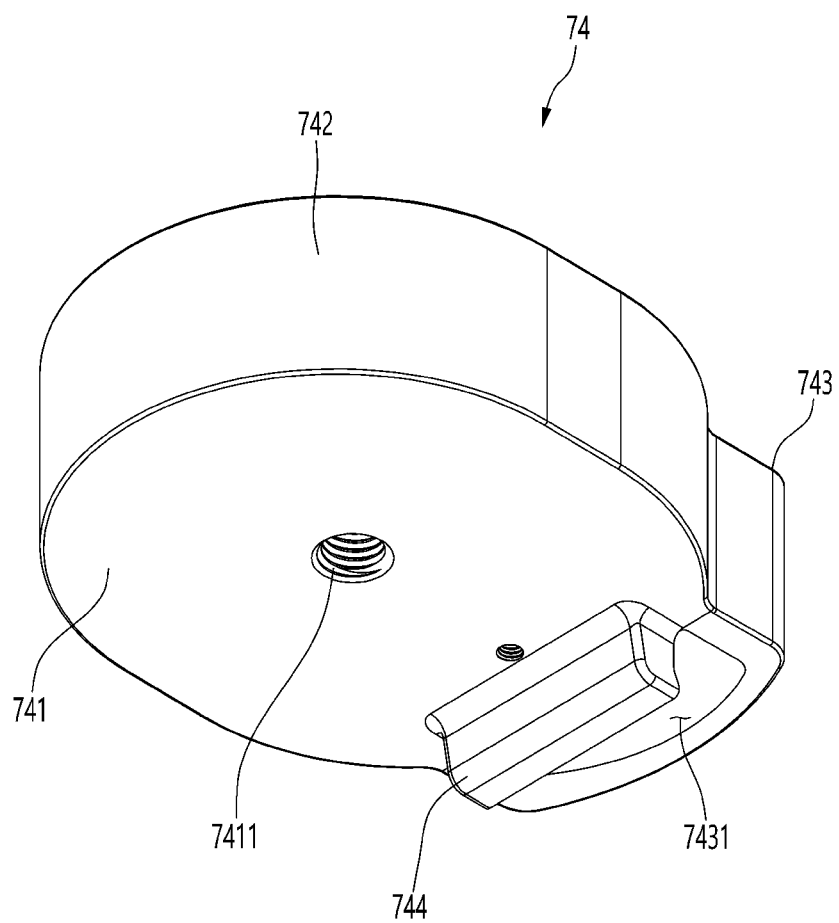
FIG. 54 is a bottom perspective view illustrating the clamp cover.

FIG. 53 is a front perspective view illustrating a clamp cover constituting a clamp unit according to an embodiment of the present disclosure, and FIG. 54 is a bottom perspective view illustrating the clamp cover.

Referring to FIGS. 53 and 54 together with FIG. 50, the clamp cover 74 according to the embodiment of the present disclosure may include a bottom portion 741, a side portion 742 extending upward from the edge of the bottom portion 741 by a predetermined length, and an extension end insertion portion 743 protruding from the side portion 742 and having an extension end insertion hole 7431 formed therein.

In detail, a fixing screw through-hole 7411 through which the fixing screw 75 passes is formed at the center of the bottom portion 741, and a screw thread is formed on an inner circumferential surface of the fixing screw through-hole 7411.

A pressure spring mounting portion 7421 is stepped across the side portion 742 and the bottom portion 741 forming one surface of the extended end insertion portion 743.

The horizontal portion 721 of the pressure spring 72 is seated on a portion formed on the bottom portion 741 of the pressure spring seating portion 7421, and the vertical portion 722 of the pressure spring 72 is in close contact with the pressure spring mounting portion 7421 formed on the side portion 742. In addition, the bent portion 723 of the pressure spring 72 is located in the insertion hole 7431 of the extension end. In addition, an end portion of the bent portion 723 is in contact with the outer circumferential surface of the side portion 742 defining one surface of the extension end insertion hole 7431.

A fastening hole 7412 is formed in a portion of the pressure spring mounting portion 7421 formed in the bottom portion 741. Then, the fastening member S passes through the fastening hole 7211 of the pressure spring 72 and is inserted into the fastening hole 7412 so that the pressure spring 72 is fixed to the clamp cover 74.

The extended end 712 of the clamp body 71 is inserted into the extension end insertion hole 7431, and the bent portion 723 of the pressure spring 72 is elastically deformed to press the extension end 712. Due to the pressing force acting on the extended end 712, the bottom portion 741 of the clamp cover 74 is slightly inclined downward from the horizontal state.

The extension end insertion hole 7431 has a circumferential width and a radial width of the clamp cover 74. The radial width of the clamp cover 74 is designed to be greater than the thickness of the extension end 712, so that, in a state where the extension end 712 is inserted into the extension end insertion hole 7431, the clamp cover 74 can swing in the up and down direction.

Meanwhile, a catching end 744 extends downward at the edge of the bottom portion 741 adjacent to the extension end insertion portion 743, and the lower end of the catching end 744 may be bent outward in the direction of the bottom portion 741. In addition, an end portion of the bent catching end 744 is caught in the catching groove 712 formed in the extension end 712.

In a state where the base plate 711 is seated on the upper surface of the table T, the extension end 712 is inserted into the extension end insertion hole 7431. Then, the clamp cover 74 is pushed up until the upper end of the side portion 742 of the clamp cover 74 is in close contact with the bottom surface of the table T.

Then, since the upper ends of the side portions 742 of the base plate 711 and the clamp cover 74 are in close contact with the upper and lower surfaces of the table T, the clamp unit 70 can be more stably coupled to the table T without shaking, compared to the case where only the pressure plate 73 is in close contact with the lower surface of the table T.

In other words, in addition to fixing the clamp unit 70 by rotating the fixing screw 75 so that the pressure plate 73 comes into close contact with the lower surface of the table T, since the upper surface of the clamp cover 74 is in contact with the lower surface of the table T and thus the clamp unit 70 is additionally fixed to the table T, the clamp unit 70 can be stably fixed.

In addition, by the elastic force of the pressure spring 72, in a state where the bottom portion of the clamp cover 74 is inclined slightly downward from the horizontal state, the catching end 744 is the catching groove 7121 of the extension end 712 is firmly inserted. As a result, in a state where the clamp unit 70 is fixed to the table T, shaking caused by the load of the display supporting apparatus 10 excluding the display panel D and the clamp unit 70 can be minimized.

Here, in order to push the clamp cover 74 up along the extension end 712, the clamp cover 74 is pushed up with a horizontal force applied so that the bottom surface of the clamp cover 74 is in a horizontal state. Then, when the upper end of the clamp cover 74 is in contact with the lower surface of the installation surface such as the table T, the horizontal direction force and the pushing force are removed. Then, while the clamp cover 74 slightly droops downward due to the restoring force of the pressure spring 72, the catching end 744 is caught in the catching groove 7121.

Meanwhile, as illustrated in FIG. 51, the rotation limiting protrusion 714 formed on the clamp body 71 interferes with the rotation limiting protrusion 658 protruding from the inside of the lower pillar 65, and thus the angle at which the pillar unit 60 can rotate about a vertical axis is limited.

In other words, the pillar unit 60 may rotate in the clockwise direction or in the counterclockwise direction about a vertical axis only up to a point where the rotation limiting protrusion 658 touches the rotation limiting protrusion 714.

Figure 55:
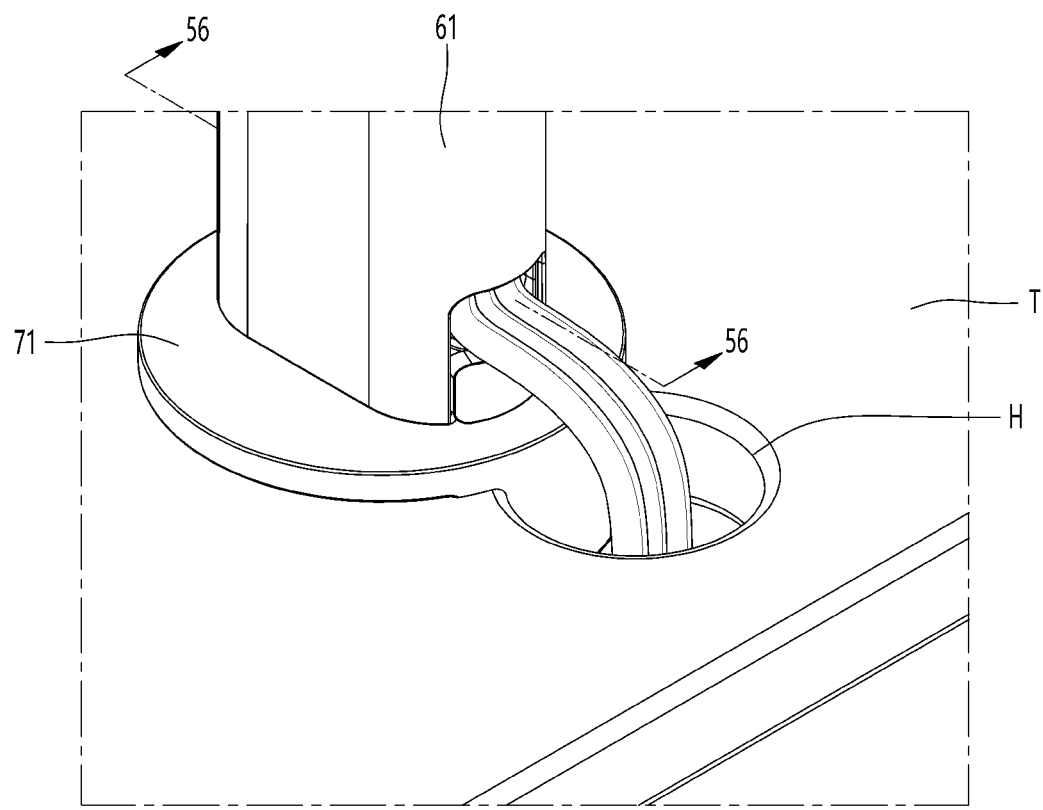
FIG. 55 is a partial perspective view illustrating a method for installing a clamp unit according to another embodiment of the present disclosure.
Figure 56:
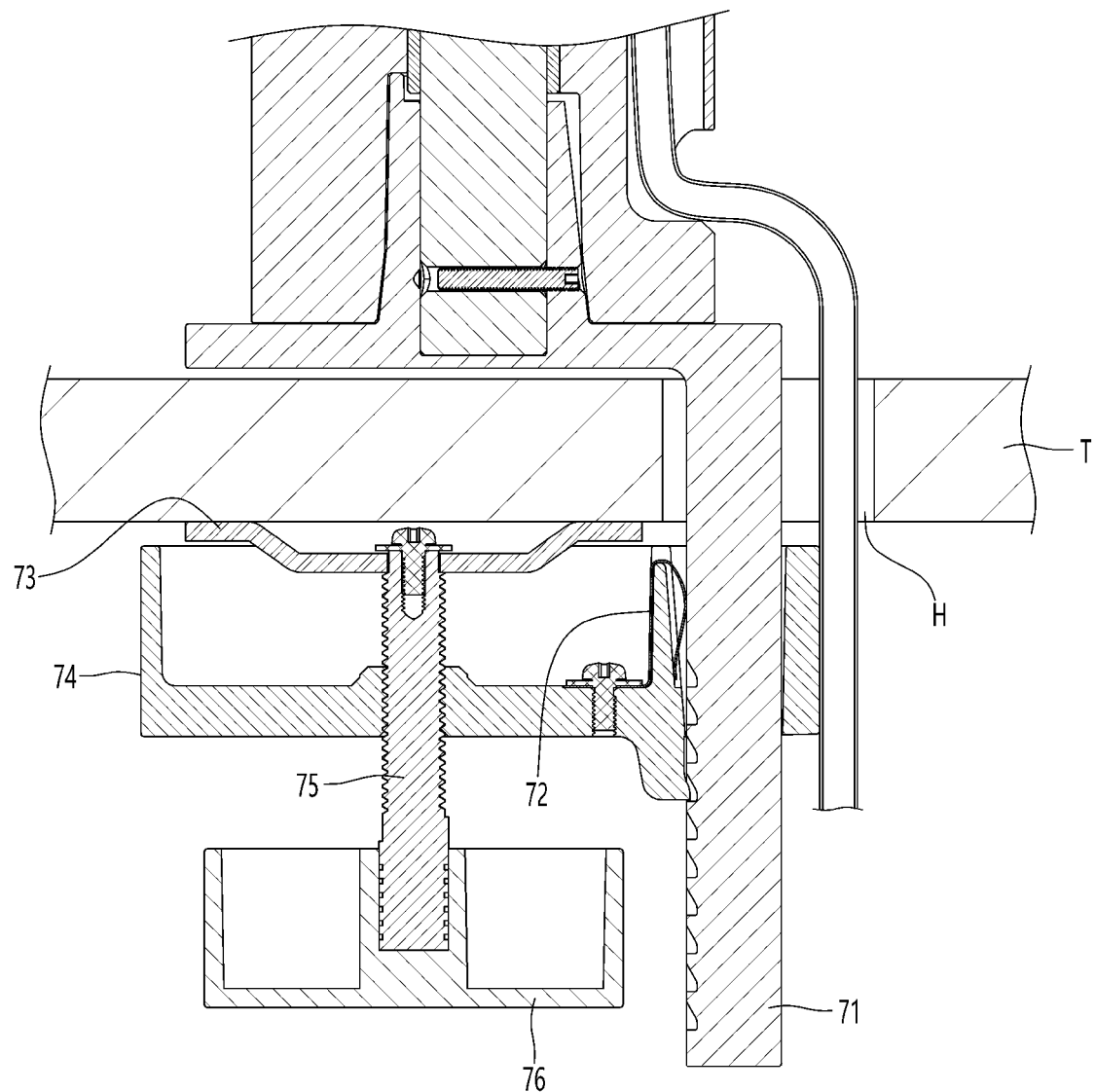
FIG. 56 is a longitudinal cross-sectional view illustrating the clamp unit taken along line 56-56 of FIG. 55.

FIG. 55 is a partial perspective view illustrating a method for installing a clamp unit according to another embodiment of the present disclosure, and FIG. 56 is a longitudinal cross-sectional view illustrating the clamp unit taken along line 56-56 of FIG. 55.

In this embodiment, since the clamp unit 70 is the same as the clamp unit 70 described above, redundant description of the clamp unit 70 will be omitted.

Referring to FIGS. 55 and 56, the clamp unit 70 according to the embodiment of the present disclosure, in addition to the conventional coupling method in which the extended end 712 of the clamp body 71 is in close contact with the side surface of the table T, there is an advantage that the extended end 712 of the clamp body 71 can be mounted by being fitted to the cable through-hole (H) formed in the table (T).

In detail, the extended end 712 of the clamp body 71 is designed to have a smaller width than the diameter of the cable through-hole H formed in the table T, so that the extended end 712 is inserted into the cable through-hole H.

In this state, as described above, the clamp cover 74 and the pressure plate 73 can be tightly fixed to the lower surface of the table T. Therefore, even when the table T is installed at the corner of the room and two surfaces of the side surfaces of the table T adjacent to the through-hole H and intersecting each other are in close contact with the room wall, there is an advantage of being able to install the display supporting apparatus 10 on the position close to the room wall.

The invention claimed is:

1. A display supporting apparatus comprising: a clamp unit fixed to an installation surface; a pillar unit connected to the clamp unit to rotate about a vertical axis; a neck unit connected to an end portion of the pillar unit to rotate about the vertical axis; an arm unit connected to an end portion of the neck unit to rotate about a first horizontal axis; a connection unit connected to an end portion of the arm unit to rotate about the first horizontal axis; and a display supporting unit connected to the connection unit, having a display unit mounted on a front surface thereof, and rotatable about the first horizontal axis, a second horizontal axis, and the vertical axis, wherein the arm unit includes a case; a link assembly accommodated in the case, having a rear end rotatably connected to the neck unit and a front end connected to the connection unit; a spring supporting bracket fixed to the case at a point corresponding to the inner front of the case; and an elastic adjustment body having a front end portion connected to the spring supporting bracket and a rear end portion inserted into a rear surface of the case, and wherein the elastic adjustment body includes: a spring shaft having one end connected to the spring supporting bracket and the other end connected to the rear surface of the case; an elastic body fitted to an outer circumferential surface of the spring shaft; a spring supporter screwed to an outer circumferential surface of the spring shaft to support a front end portion of the elastic body; and a spring pusher movably fitted to the outer circumferential surface of the spring shaft and supporting the rear end portion of the elastic body, wherein as the spring shaft rotates in one direction, the spring supporter moves forward or backward along the spring shaft to vary the spring force of the elastic body.

2. The display supporting apparatus of claim 1, wherein the spring force increases when the spring supporter moves backward and thus the elastic body is compressed more than the original length thereof, and wherein a spring force decreases when the spring supporter moves forward and thus the elastic body extends close to the original length thereof.

3. The display supporting apparatus of claim 2, wherein the spring supporter includes:
a supporter body in which a shaft hole for the spring shaft to pass through is formed in a center thereof;
a guide protrusion protruding from the upper surface of the supporter body,
wherein a guide hole configured to accommodate the guide protrusion is formed on an upper surface of the case, and
wherein a spring force display portion indicating a compression degree of the elastic body is provided on an edge of the guide hole.

4. The display supporting apparatus of claim 2, wherein the link assembly includes
a main link having one end rotatably connected to the connection unit and the other end rotatably connected to the neck unit; and
an auxiliary link having one end connected to the spring pusher and the other end connected to the neck unit, and
wherein the spring pusher moves forward or backward along the spring shaft when the arm unit rotates about the first horizontal axis in an up and down direction.

5. The display supporting apparatus of claim 1, wherein the connection unit includes: a swivel head receiver rotatably connected to the front end of the arm unit; a swivel shaft that is vertically inserted into the swivel head receiver and serves as a rotational center for rotating the display supporting unit about the vertical axis; a tilting shaft that passes through the case and the swivel head receiver horizontally and serves as a rotational center for rotating the swivel head about the first axis; an upper tilting stopper passing through the swivel head receiver in parallel with the tilting shaft at an upper side of the tilting shaft, and a lower tilting stopper passing through the swivel head receiver in parallel with the tilting shaft at a lower side of the tilting shaft.

6. The display supporting apparatus of claim 5, wherein the lower tilting stopper passes through both side surfaces of the front end portion of a main link and thus the front end portion of the main link is connected to the swivel head receiver to be relatively rotatable.

7. The display supporting apparatus of claim 5, wherein the case includes:
an outer cover,
an inner cover placed inside the outer cover, and
a base cover coupled to bottom surfaces of the inner cover and the outer cover,
wherein a hole or groove is formed in a side of a front end portion of the inner cover to avoid interference with the upper tilting stopper and the lower tilting stopper, respectively.

8. The display supporting apparatus of claim 7, wherein the neck unit includes:
a link coupler to which a rear end of the inner cover is rotatably coupled and a rear end of the spring shaft passes through;
a swivel shaft inserted into the link coupler and serving as a rotational center for rotating the link coupler about the vertical axis;
a swivel bushing inserted into the outer circumferential surface of the swivel shaft and connected to the swivel shaft by a fastening pin; and
a swivel bushing pin connecting the swivel shaft and the swivel bushing.

9. The display supporting apparatus of claim 8, wherein the pillar unit includes:
- an upper pillar having an upper end to which the neck unit is rotatably connected about the vertical axis;
- a lower pillar having an upper end on which the lower end of the upper pillar is placed;
- an rotation prevention shaft perpendicularly passing through the upper pillar and inserted into an upper surface of the lower pillar to prevent the upper pillar from rotating relative to the lower pillar;
- a center shaft that perpendicularly passes through the upper pillar and the lower pillar and serves as a rotational center for the pillar unit to rotate about the vertical axis; and
- a height adjustment screw inserted into the center shaft through the upper pillar.

10. The display supporting apparatus of claim 9, wherein a head portion of the height adjustment screw is singularly connected to the upper pillar to ascend or descend together with the upper pillar.

11. The display supporting apparatus of claim 10, wherein, when the height adjustment screw rotates in one direction to adjust the height of the pillar unit, the upper pillar ascends in a direction away from the lower pillar along the center shaft and the rotation prevention shaft, or descends in a direction closer to the lower pillar.

12. The display supporting apparatus of claim 11, wherein the clamp unit includes:
- a clamp cover including a base plate seated on an installation surface, a support boss extending upward from a center of an upper surface of the base plate, and an extension end extending downward from an edge of the base plate;
- a clamp body fitted to the extension end to move up and down;
- a fixing screw configured to pass through the bottom of the clamp cover;
- a pressure plate connected to an upper end of the fixing screw and in close contact with the lower surface of the installation surface;
- a gripping portion connected to a lower end of the fixing screw; and
- a pressure spring mounted on a side surface of the clamp cover to pressurize the extension end.

13. The display supporting apparatus of claim 12, wherein the support boss is inserted into a lower portion of the lower pillar,
- wherein a lower end of the center shaft is inserted into the support boss,
- wherein the center shaft is fixedly coupled to the support boss by a fastening member.

14. The display supporting apparatus of claim 12, further comprising:
- a first rotation limiting protrusion protruding upward from an upper end of the support boss; and
- a second rotation limiting protrusion protruding horizontally from an inside of the lower pillar to be caught on the first rotation limiting protrusion;
- wherein the pillar unit is rotatable until the second rotation limiting protrusion catches on the first rotation limiting protrusion.

15. The display supporting apparatus of claim 12, wherein an extension end insertion portion into which the extension end is inserted is formed on a side surface of the clamp cover,
- wherein a catching end extends from the bottom surface of the clamp cover adjacent to the extension end insertion portion,
- wherein a plurality of catching grooves are arranged in a vertical direction on one surface of the catching end,
- wherein the end portion of the catching end is caught in any one of the plurality of catching grooves.

16. The display supporting apparatus of claim 10, wherein the pillar unit further includes:
- an upper bushing fitted to the outer circumferential surface of the center shaft and placed inside the upper pillar;
- a lower bushing fitted to the outer circumferential surface of the center shaft and placed inside the lower pillar;
- a pillar cover configured to shield a connection portion between the upper pillar and the lower pillar and to guide a stable ascending and descending of the upper pillar, and
- a housing cover configured to surround the upper pillar and the lower pillar.

17. The display supporting apparatus of claim 16, wherein a rotation guide groove is formed on an outer circumferential surface of the center shaft in a circumferential direction of the center shaft, wherein an end portion of a fastening member passing through the lower pillar and the lower bushing is accommodated in the rotation guide groove, and wherein the lower pillar is rotatable about the center shaft in a connected state to the center shaft.

18. The display supporting apparatus of claim 5, wherein the display supporting unit includes
- a supporting plate having a front surface on which the display panel is mounted;
- a back cover coupled to a rear surface of the supporting plate; and
- a swivel module accommodated inside the back cover.

19. The display supporting apparatus of claim 18, wherein the swivel module includes:
- a pivot bracket including:
  - a front portion in close contact with the rear surface of the supporting plate and
  - a pair of side portions extending backward from both ends of the front portion;
- a pivot shaft passing through the center of the supporting plate to be inserted into the front portion and configured to serve as a rotational center for rotating the display panel about a second horizontal axis perpendicular to the first horizontal axis;
- a module body having both sides with which side portions of the pivot bracket are in close contact;
- a torsion spring provided inside the module body;
- a tilt shaft passing through the side portion of the pivot bracket, both side surfaces of the module body, and the coil spring to serve as a rotational center for rotating the display panel about the first horizontal axis; and
- a module cover accommodating a portion of the module body.

20. The display supporting apparatus of claim 19, wherein the module body includes
- a swivel body in which the torsion spring is accommodated;
- a connecting rod extending from a rear surface of the swivel body, and
- a swivel head formed at an end portion of the connecting rod and rotatably connected to the connection unit through a rear surface of the module cover.

21. The display supporting apparatus of claim 20, wherein a swivel head accommodation groove configured to accommodate the swivel head is formed in the swivel head receiver, and
   wherein the swivel shaft vertically passes through the swivel head receiver and the swivel head in a state where the swivel head is inserted into the swivel head accommodation groove.

22. The display supporting apparatus of claim 19, further comprising:
   a limiting slit extending a predetermined length in an arc shape on the supporting plate; and
   a pivot limiter protruding forward from an upper end of the front portion and inserted into the limiting slit.

23. The display supporting apparatus of claim 19, further comprising:
   a tilt limiter partially inserted into both sides of the module body; and
   a tilt limiting groove recessed at a lower end of the pair of side portions to accommodate the tilt limiter.

\* \* \* \* \*